United States Patent [19]

Dohta et al.

[11] Patent Number: 5,784,879
[45] Date of Patent: Jul. 28, 1998

[54] AIR-FUEL RATIO CONTROL SYSTEM FOR INTERNAL COMBUSTION ENGINE

[75] Inventors: Hisayo Dohta, Kariya; Katsuhiko Kawai, Nagoya; Shigenori Isomura, Kariya, all of Japan

[73] Assignee: Nippondenso Co., Ltd., Kariya, Japan

[21] Appl. No.: 673,123

[22] Filed: Jul. 1, 1996

[30] Foreign Application Priority Data

| Jun. 30, 1995 | [JP] | Japan | 7-165247 |
| Dec. 20, 1995 | [JP] | Japan | 7-331334 |
| May 13, 1996 | [JP] | Japan | 8-117290 |

[51] Int. Cl.$^6$ .............................. F01N 3/10; F01N 3/28
[52] U.S. Cl. ............................................ 60/276; 60/285
[58] Field of Search ........................................ 60/276, 285

[56] References Cited

U.S. PATENT DOCUMENTS

| 5,090,199 | 2/1992 | Ikuta et al. | 60/276 |
| 5,311,737 | 5/1994 | Komatsu et al. | 60/276 |
| 5,390,489 | 2/1995 | Kawai et al. | 60/276 |
| 5,423,181 | 6/1995 | Katoh et al. | 60/276 |
| 5,473,887 | 12/1995 | Takeshima et al. | 60/276 |
| 5,491,975 | 2/1996 | Yamashita et al. | 60/276 |
| 5,579,637 | 12/1996 | Yamashita et al. | 60/276 |
| 5,715,679 | 2/1998 | Asanuma et al. | 60/276 |

FOREIGN PATENT DOCUMENTS

| 2-238147 | 9/1990 | Japan . |
| 3-185244 | 8/1991 | Japan . |
| 5-142174 | 6/1993 | Japan . |
| 6-74072 | 3/1994 | Japan . |
| 6-129283 | 5/1994 | Japan . |

*Primary Examiner*—Willis R. Wolfe
*Attorney, Agent, or Firm*—Cushman Darby & Cushman IP Group of Pillsbury Madison & Sutro LLP

[57] ABSTRACT

An air-fuel ratio control apparatus for an internal combustion engine is provided which includes an air-fuel ratio determining circuit which determines an air-fuel ratio of exhaust gases flowing upstream of a catalytic converter for controlling the air-fuel ratio of the exhaust gases so as to agree with a target air-fuel ratio under feedback control, a sorbed substance amount determining circuit for determining the amount of substances sorbed in the catalytic converter, and a target air-fuel ratio determining circuit for determining said target air-fuel ratio so that the amount of substances determined by said sorbed substance amount determining means falls within a given range. The sorbed substance amount determining circuit determines the amount of substances sorbed in the catalytic converter based on the air-fuel ratio determined by said air-fuel ratio determining circuit using a catalytic converter model established using parameters indicating adsorption reaction of exhaust gas components entering the catalytic converter, oxidation-reducing reaction of the substances sorbed in the catalytic converter with the exhaust gas components, desorption reaction of the substances sorbed in the catalytic converter, and a non-reacted portion of the exhaust gas components.

17 Claims, 44 Drawing Sheets

FIG. 2

DETERMINATION OF THE NUMBER OF MOLES

91 — MONITOR A/F

92 — DETERMINE THE MOLAR CONCENTRATION OF $O_2$, $H_2$, CO, $CO_2$

O2INMC
H2INMC
COINMC
CO2INMC (vs A/F)

93 —
$$H2OINMC \leftarrow \frac{2 \cdot 3.4 \cdot COINMC \cdot (CO2INMC \times COINMC)}{2/(3.4 \cdot CO2INMC + COINMC)}$$

94 — $KKKBUMBO \leftarrow COINMC + 2 \cdot CO2INMC + 2 \cdot O2INMC + H2OINMC$

95 — $Tpg = Tp \cdot INJSIZE \cdot \rho$

96 —
$$OFIN = \frac{A/F \cdot 0.2 \cdot 32}{0.2 \cdot 32 + 0.8 \cdot 28}$$

$$OMOL = 2 \cdot \frac{Tpg}{14} / (32/14/OFIN)$$

97 —
$$O2INM \leftarrow O2INMC \cdot \frac{OFIN}{KKKBUNBO} \cdot Tpg \cdot \frac{2}{32}$$

$$H2INM \leftarrow H2INMC \cdot \frac{OFIN}{KKKBUNBO} \cdot Tpg \cdot \frac{2}{32}$$

$$COINM \leftarrow COINMC \cdot \frac{OFIN}{KKKBUNBO} \cdot Tpg \cdot \frac{2}{32}$$

$$CO2INM \leftarrow CO2INMC \cdot \frac{OFIN}{KKKBUNBO} \cdot Tpg \cdot \frac{2}{32}$$

$$H2OINM \leftarrow H2OINMC \cdot \frac{OFIN}{KKKBUNBO} \cdot Tpg \cdot \frac{2}{32}$$

RETURN

FIG. 29(a) A/F
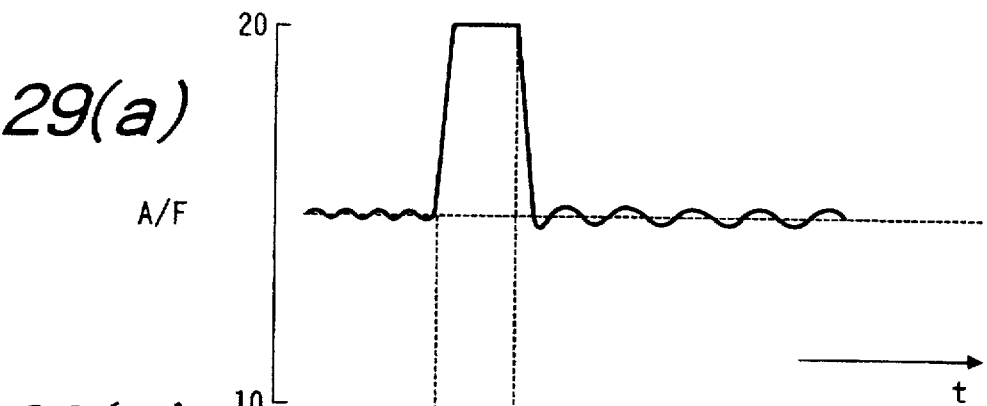
FIG. 29(b) FUEL CUT SIGNAL FFC
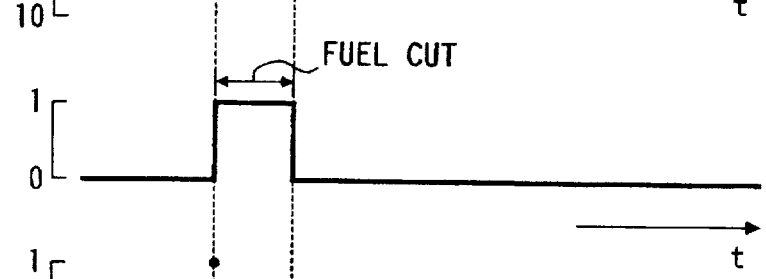
FIG. 29(c) DFFC
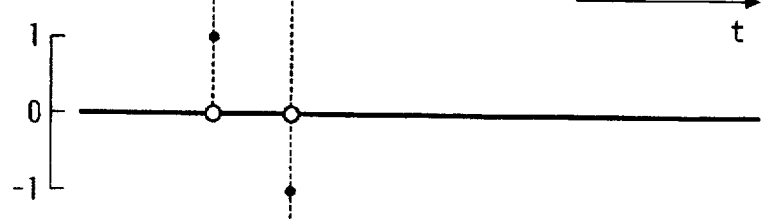
FIG. 29(d) OUTPUT OF O₂ SENSOR
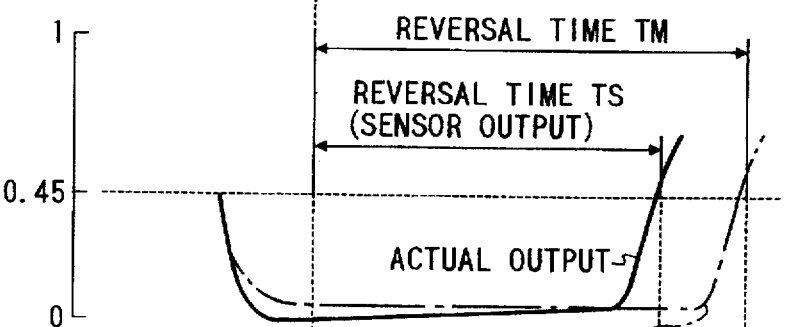
FIG. 29(e) CS
FIG. 29(f) CM
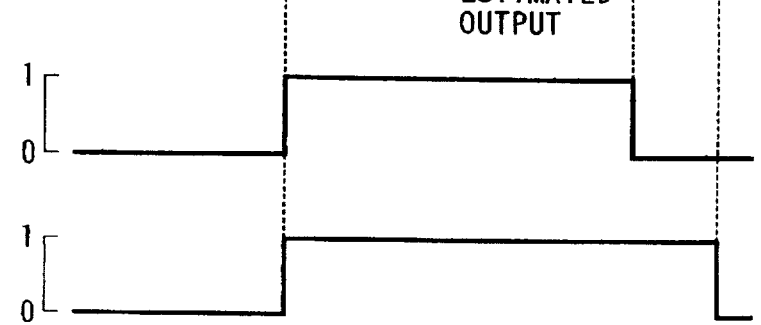

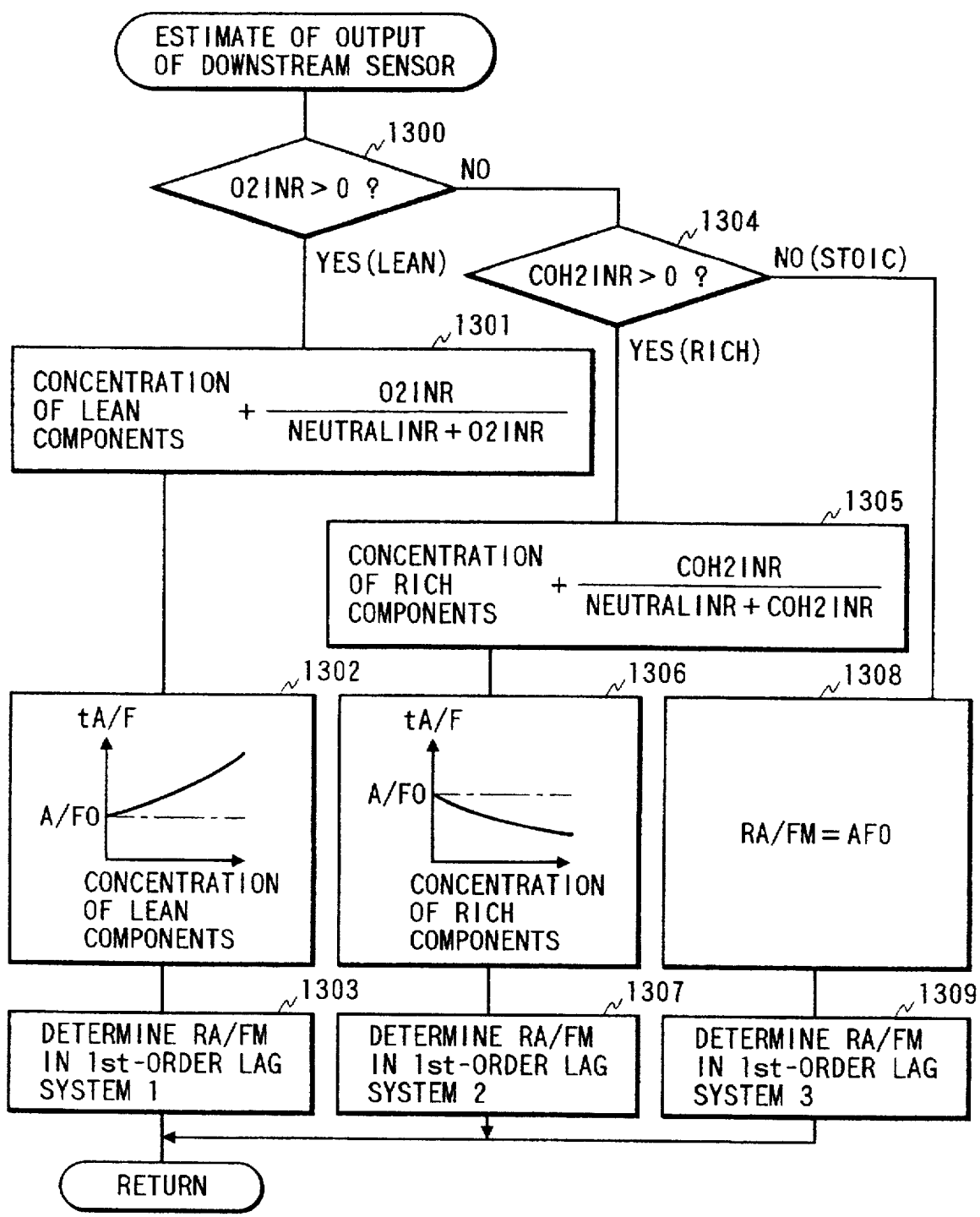

AIR-FUEL RATIO CONTROL SYSTEM FOR INTERNAL COMBUSTION ENGINE

BACKGROUND OF THE INVENTION

1. Technical Field

The present invention relates generally to an air-fuel ratio control system for an internal combustion engine which is designed to control an air-fuel ratio of a mixture supplied to an engine under feedback control based on an output of an air-fuel ratio sensor measuring an air-fuel ratio of exhaust emissions.

2. Background of Related Art

Japanese Patent First Publication No. 6-74072 teaches an air-fuel ration control system for an internal combustion engine which controls an air-fuel ratio of exhaust emissions flowing upstream of a catalytic converter disposed in an exhaust passage of the engine, measured by an air-fuel ratio sensor so as to agree with a target air-fuel ratio and which corrects the target air-fuel ratio based on an output from an oxygen sensor indicating whether exhaust emissions flowing downstream of the catalytic converter are rich or lean.

Usually, a catalytic converter reacts on gas components such as $CO$, $HC$, $NO_x$, and $H_2$ of exhaust emissions entering the catalytic converter as follows:

(1) Adsorption Reaction of Gas Components entering Catalytic converter

The part of the gas components is sorbed in the catalytic converter.

(2) Oxidation-Reduction Reaction of Substances sorbed in Catalytic converter with Gas components entering the Catalytic converter For example, when substances sorbed in the catalytic converter are lean components (i.e., oxidizing components such as $NO_x$ and $O_2$), these lean components oxidize and reduce with rich components (i.e., reducing components such as $HC$, $CO$, and $H_2$) of gas components entering the catalytic converter to produce harmless neutral gas components (i.e., $CO_2$, $H_2$, $O$, and $N_2$) which are, in turn, discharged from the catalytic converter.

(3) Desorption Reaction of Substances sorbed in Catalytic converter

The part of the substances sorbed in the catalytic converter is discharged without being subjected to the oxidation-reduction reaction in the catalytic converter.

(4) Part of Gas Components not reacted in Catalytic converter

The part of the gas components entering the catalytic converter is discharged without being subjected to the adsorption reaction and the oxidation-reduction reaction in the catalytic converter.

Therefore, in order to improving the capability of purging exhaust gases through a catalytic converter, it is necessary to promote the adsorption reaction and oxidation-reduction reaction, as described (1) and (2), to reduce the adsorption reaction, as described (3), and to decrease the amount of the gas components, as described (4), discharged from the catalytic converter without being subjected to the adsorption reaction and the oxidation-reduction reaction. These conditions are changed greatly according to the amount of substance sorbed in the catalytic converter, thereby causing the purging capability of the catalytic converter to be changed. For example, as the amount of lean components sorbed in the catalytic converter is increased, the adsorption reaction of the lean components is reduced, and the amount of the lean components discharged from the catalytic converter without being subjected to the adsorption reaction and the oxidation-reduction reaction, is increased. However, as a ratio of rich components to lean components in the exhaust gases is increased, the oxidation-reduction reaction is improved, resulting in a decrease in the amount of substances sorbed in the catalytic converter.

Because of the above characteristics of the catalytic converter, it is advisable that an air-fuel ratio of a mixture supplied to an engine be controlled according to the amount of substances sorbed in the catalytic converter. It is, however, impossible for the conventional air-fuel ratio control system to control the air-fuel ratio based on the amount of substances sorbed in the catalytic converter since it controls, as described above, the target air-fuel ratio only based on the output of the oxygen sensor.

SUMMARY OF THE INVENTION

It is therefore a principal object of the present invention to avoid the disadvantages of the prior art.

It is another object of the present invention to provide an air-fuel ratio control system designed to control an air-fuel ratio of a mixture supplied to an engine based on the amount of substances sorbed in a catalytic converter for improving the capability of purging exhaust emissions.

According to one aspect of the present invention, there is provided an air-fuel ratio control apparatus for an internal combustion engine which comprises (a) an air-fuel ratio determining means for determining an air-fuel ratio of exhaust gases flowing upstream of a catalytic converter; (b) an air-fuel ratio controlling means for controlling the air-fuel ratio determined by the air-fuel ratio determining means so as to agree with a target air-fuel ratio under feedback control; (c) a sorbed substance amount determining means for determining the amount of substances sorbed in the catalytic converter based on the air-fuel ratio determined by the air-fuel ratio determining means using a catalytic converter model established using parameters indicating adsorption reaction of exhaust gas components entering the catalytic converter, oxidation-reducing reaction of the substances sorbed in the catalytic converter with the exhaust gas components, desorption reaction of the substances sorbed in the catalytic converter, and a non-reacted portion of the exhaust gas components; and (d) a target air-fuel ratio determining means for determining the target air-fuel ratio so that the amount of substances determined by the sorbed substance amount determining means falls within a given range.

In the preferred mode of the invention, the target air-fuel ratio determining means determines the target air-fuel ratio based on the amount of substances determined by the sorbed substance amount determining means.

The target air-fuel ratio determining means determines the target air-fuel ratio based on the amount of substances determined by the sorbed substance amount determining means when the amount of substances falls within the given range and based on the amount of air in a cylinder of the engine when the amount of substances is out of the given range.

The sorbed substance amount determining means corrects the determined amount of substances sorbed in the catalytic converter to read a value smaller than or equal to a maximum amount of substances the catalytic converter can adsorb when the determined amount of substances is greater than the maximum amount of substances.

A downstream air-fuel ratio sensor is further provided which is disposed downstream of a catalytic converter, monitoring a given component of exhaust gases flowing downstream of the catalytic converter to output a sensor signal indicative thereof. The downstream air-fuel ratio sensor is designed to cause adsorption reaction of exhaust gas components entering the downstream air-fuel ratio sensor, oxidation-reducing reaction of substances sorbed in the downstream air-fuel ratio sensor with the exhaust gas components, desorption reaction of the substances sorbed in the downstream air-fuel ratio sensor, and a portion of the exhaust gas components not reacted in the downstream air-fuel ratio sensor. A sensor output estimating means is provided for estimating an output of the downstream air-fuel ratio sensor based on the concentrations of lean components and rich components of the exhaust gases flowing downstream of the catalytic converter determined by using a sensor reaction model established using parameters indicating the adsorption reaction, the oxidation-reducing reaction, the desorption reaction, and the portion of the non-reacted exhaust gas components caused by the downstream air-fuel ratio sensor. A model parameter correcting means is provided for correcting a given parameter of the catalytic converter model based on a comparison between the output of the downstream air-fuel ratio sensor estimated by the downstream air-fuel ratio sensor output estimating means and the sensor signal outputted by the downstream air-fuel ratio sensor.

The sensor output estimating means estimates the output of the downstream air-fuel ratio sensor without use of the parameter indicating the non-reacted exhaust gas components.

The sensor output estimating means may estimates the output of the downstream air-fuel ratio sensor by processing through a first-order lag system the amount of the exhaust gas components flowing downstream of the catalytic converter determined by the catalytic converter model. A maximum catalytic converter capacity determining means is provided for determining a maximum capacity of the catalytic converter based on the output of the downstream air-fuel ratio estimated by the sensor output estimating means and the sensor signal outputted by the downstream air-fuel ratio sensor. The model parameter correcting means corrects the given parameter of the catalytic converter model based on the maximum capacity of the catalytic converter determined by the maximum catalytic converter capacity determining means.

The sensor output estimating means may estimate the output of the downstream air-fuel ratio sensor by changing a time constant of the first-order lag system according to the amount of the exhaust gas components flowing downstream of the catalytic converter.

The downstream air-fuel ratio sensor may be designed to operate in a first operation mode and a second operation mode. The first operation mode is such that the sensor signal of the downstream air-fuel ratio sensor is changed linearly according to an air-fuel ratio of the exhaust gases flowing downstream of the catalytic converter. The second operation mode is such that the sensor signal of the downstream air-fuel ratio sensor is reversed in level upon reversal of the air-fuel ratio of the exhaust gases between rich and lean sides. A sensor operation mode switching means is provided for switching an operation mode of the downstream air-fuel ratio sensor between the first operation mode and the second operation mode. The sensor operation mode switching means selects the second operation mode when the amount of substances sorbed in the catalytic converter determined by the sorbed substance amount determining means lies within a given range and the first operation mode when the amount of substances determined by the sorbed substance amount determining means is out of the given range.

A first air-fuel ratio controlling means and a second air-fuel ratio controlling means are provided. The first air-fuel ratio controlling means performs first air-fuel ratio control by controlling the downstream air-fuel ratio sensor to operate in the second operation mode when the amount of substances sorbed in the catalytic converter determined by the sorbed substance amount determining means lies within the given range. The second air-fuel ratio controlling means performs second air-fuel ratio control by controlling the downstream air-fuel ratio sensor to operate in the first operation mode when the amount of substances sorbed in the catalytic converter determined by the sorbed substance amount determining means is out of the given range.

The maximum catalytic converter capacity determining means and the model parameter correcting means are activated when the amount of substances sorbed in the catalytic converter determined by the sorbed substance amount determining means is out of the given range.

According to another aspect of the present invention, there is provided an air-fuel ratio control apparatus for an internal combustion engine which comprises: (a) a fuel injection means for injecting fuel into the engine; (b) a catalytic converter disposed in an exhaust passage of the engine for purging exhaust gases; (c) a downstream air-fuel ratio determining means for determining an air-fuel ratio of exhaust gases flowing downstream of the catalytic converter; and (d) a fuel injection amount determining means for determining a fuel injection amount of the fuel injection means to control the air-fuel ratio determined by the downstream air-fuel ratio determining means to agree with a target air-fuel ratio under feedback control using a controlled model approximated to a system ranging from the fuel injection means to the downstream air-fuel ratio determining means with state variables defined by inputs to and outputs from the controlled model in a previous feedback control cycle and a current feedback control cycle.

The fuel injection amount determining means establishes a catalytic converter model in the controlled mode using parameters indicating adsorption reaction of exhaust gas components entering the catalytic converter, oxidation-reducing reaction of the substances sorbed in the catalytic converter with the exhaust gas components, desorption reaction of the substances sorbed in the catalytic converter, and a non-reacted portion of the exhaust gas components.

In the preferred mode of the invention, the fuel injection amount determining means determines the fuel injection amount of the fuel injection means using the state variables defined by the inputs to and outputs from the controlled model associated with the air-fuel ratio determined by the downstream air-fuel ratio determining means.

The fuel injection amount determining means determines the fuel injection amount through the catalytic converter model which uses parameters indicating with positive or negative values whether the amount of exhaust gas components flowing into the catalytic converter, the amount of exhaust gas components flowing out of the catalytic converter, the amount of substances desorbing from the catalytic converter, and the amount of the non-reacted portion of the exhaust gas components are rich or lean side, respectively.

A reaction type determining means and a parameter changing means are provided. The reaction type determining means determines a type of reaction occurring in the catalytic converter based on whether the exhaust gas components flowing into the catalytic converter and the substances sorbed in the catalytic converter are rich or lean. The parameter changing means changes the parameters used in the catalytic converter model according to the type of the reaction determined by the reaction type determining means.

A feedback gain changing means is provided for changing a feedback gain of the feedback control according to the type of reaction determined by the reaction type determining means or upon the changing of the parameters by the parameter changing means.

According to a further aspect of the invention, there is provided an air-fuel ratio control apparatus for an internal combustion engine which comprises: (a) a downstream air-fuel ratio sensor disposed downstream of a catalytic converter, monitoring a given component of exhaust gases flowing downstream of the catalytic converter to output a sensor signal indicative thereof, the downstream air-fuel ratio sensor being designed to cause adsorption reaction of exhaust gas components entering the downstream air-fuel ratio sensor, oxidation-reducing reaction of substances sorbed in the downstream air-fuel ratio sensor with the exhaust gas components, desorption reaction of the substances sorbed in the downstream air-fuel ratio sensor, and a portion of the exhaust gas components not reacted in the downstream air-fuel ratio sensor; (b) a sensor output estimating means for estimating an output of the downstream air-fuel ratio sensor based on the concentrations of lean components and rich components of the exhaust gases flowing downstream of the catalytic converter determined by using a sensor reaction model established using parameters indicating the adsorption reaction, the oxidation-reducing reaction, the desorption reaction, and the portion of the non-reacted exhaust gas components caused by the downstream air-fuel ratio sensor; (c) a maximum adsorption amount determining means for determining a maximum adsorption amount of substances the catalytic converter can adsorb based on a time required for the sensor signal of the downstream air-fuel ratio sensor to change from a value indicating the exhaust gases on a lean side to a value indicating the exhaust gases on a rich side after completion of a fuel cut the engine undergoes and a time required for the output of the downstream air-fuel ratio sensor estimated by the sensor output estimating means to change a value indicating the exhaust gases on the lean side to a value indicating the exhaust gases on the rich side after completion of the fuel cut; and (d) a deterioration determining means for determining deterioration of the catalytic converter based on a comparison between a maximum adsorption amount of substances a new catalytic converter can adsorb and the maximum adsorption amount determined by the maximum adsorption amount determining means.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only. po In the drawings:

FIG. 2 is a flowchart of a program for determining the number of moles of each of given components of exhaust gases;

FIGS. 29(a) to 29(f) are time charts showing variations in air-fuel ratio A/F of exhaust gases, fuel cut signal FFC, difference DFFC between a current value and a previous value of a fuel cut flag, output of an oxygen sensor, and time count flags CS and CM, respectively;

FIG. 37 is a flowchart of a program for estimating an output of an air-fuel ratio sensor disposed downstream of a catalytic converter;

DESCRIPTION OF THE PREFERRED EMBODIMENT

Figure 1:
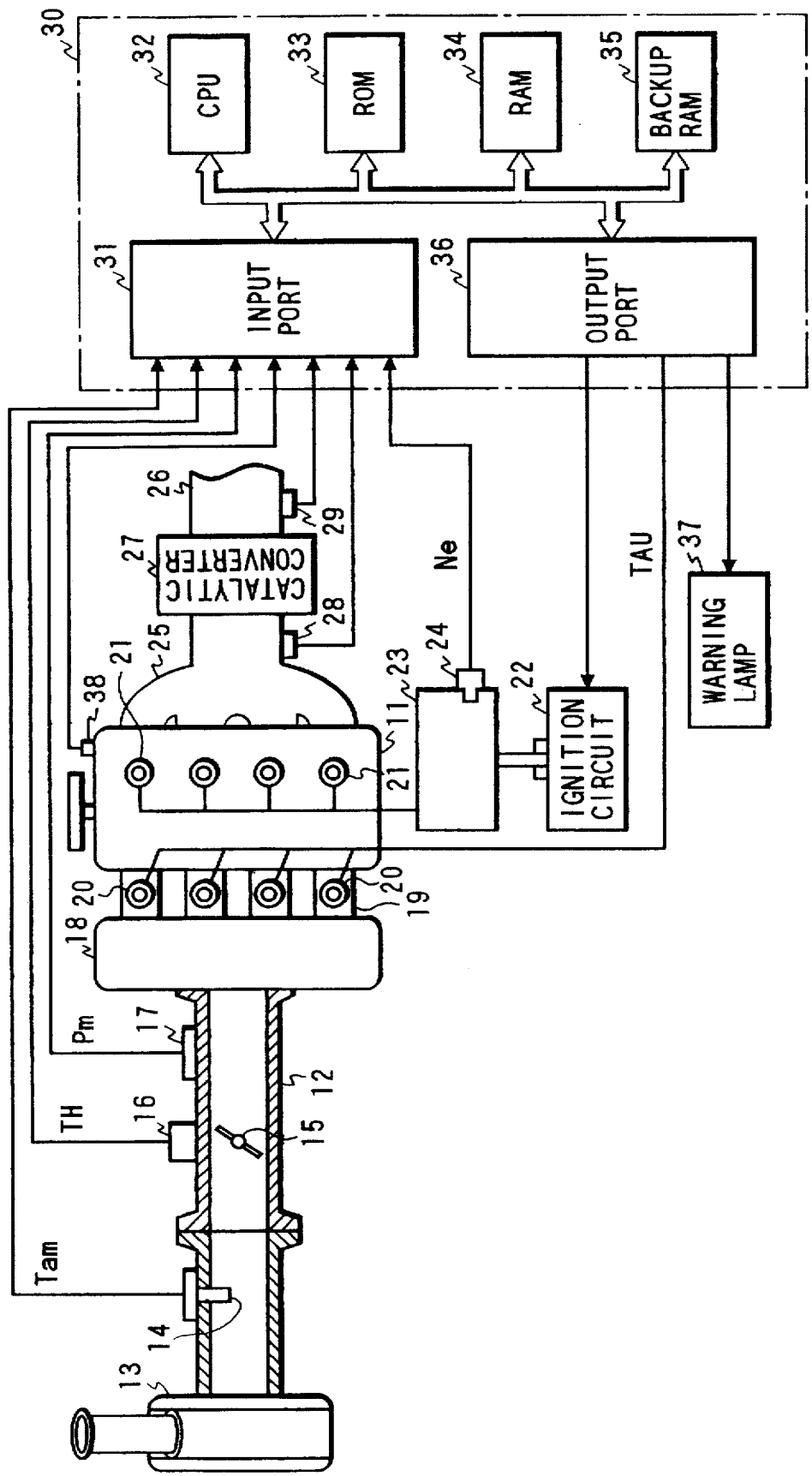
FIG. 1 is a block diagram which shows an air-fuel ratio control system according to the present invention.

Referring now to the drawings, particularly to FIG. 1, there is shown an air-fuel ratio control system for an internal combustion engine according to the present invention.

An air cleaner 13 is mounted upstream of an intake pipe 12 of an internal combustion engine 11. An inlet air temperature sensor 14 is disposed downstream of the air cleaner 13 which measures an inlet air temperature Tam. A throttle valve 15 and a throttle sensor 16 are disposed downstream of the inlet air temperature sensor 14. The throttle sensor 16 measures the degree of an opening (hereinafter, referred to as a throttle opening degree TH) of the throttle valve 15. An intake pipe pressure sensor 17 is disposed downstream of the throttle valve 15 which measures the pressure Pm in the intake pipe 12. A surge tank 18 is disposed downstream of the intake pipe pressure sensor 17. To the surge tank 18, an intake manifold 19 is connected to supply air into each cylinder of the engine 11. Injectors 20 are mounted on branches of the intake manifold 19 for injecting fuel into the engine cylinders, respectively. po In the engine 11, spark plugs 21 are mounted one for each cylinder. An ignition circuit 22 provides a high voltage current to each of the spark plugs 21 through a distributor 23. The distributor 23 has disposed thereon a crank angle sensor 24 which outputs, for example, 24 pulses during every two turns of a crank shaft (i.e., 720° CA). An engine speed Ne is determined based on intervals of the pulses outputted from the crank angle sensor 24. The engine 11 has also mounted thereon a water temperature sensor 38 which measures the temperature Thw of the coolant circulating in the engine 11.

To an exhaust port (not shown) of the engine 11, an exhaust pipe 26 is connected through an exhaust manifold 25. In the middle of the exhaust pipe 26, a three way catalytic converter 27 is disposed which reduces levels of harmful emissions such as CO, HC, and NOx. Located upstream of the catalytic converter 27 is an air-fuel ratio sensor 28 (an upstream air-fuel ratio sensor) which outputs a linear sensor signal in proportion to an air-fuel ratio of a mixture contained in exhaust emissions. Located downstream of the catalytic converter 27 is an oxygen sensor 29 (a downstream air-fuel ratio sensor) is disposed which outputs a sensor signal reversing in level when the air-fuel ratio of the exhaust emissions is switched between rich and lean sides.

Outputs of the above described sensors are fed to an electronic control circuit 30 through an input port 31. The electronic control circuit 30 includes a microcomputer consisting of a CPU 32, a ROM 33, a RAM 34, and a backup RAM 35. The microcomputer determines the amount of fuel TAU to be injected into the engine 11 and an ignition timing Ig based on engine operating condition parameters derived by the outputs of the sensors and outputs through an output port 36 control signals to the injectors 20 and the ignition circuit 22 and a warning signal to a warning lamp 37 if the deterioration of an exhaust system is detected.

The electronic control circuit 30 also serves a sorbed substance amount determination function and a target air-fuel ratio determination function. The sorbed substance amount determination function is to determine the amount of substances sorbed by the catalytic converter 27 (hereinafter, referred to as a sorbed substance amount) based on an output of the air-fuel ratio sensor 28 using catalytic reaction models designed according to forms of reactions such as an adsorption reaction of gases entering the catalytic converter 27, an oxidation-reduction reaction of the converter-entering gases (hereinafter, referred to as incoming gases) with the substances sorbed in the catalytic converter 27, and a desorption reaction of the sorbed substances, and the existence of non-reacted part of the entering gases. The target air-fuel ratio determination function is to determine a target air-fuel ratio so as to control the sorbed substance amount to fall within a given range. These functions will be described below in detail.

Determination of The Number of Moles of Incoming Gas

FIG. 2 shows a flowchart of a program or sequence of logical steps performed by the electronic control circuit 30 for determining the number of moles of each component of exhaust gases entering the catalytic converter 27. This program is carried out cyclically at every given crank angle or every given time interval.

Figure 3:
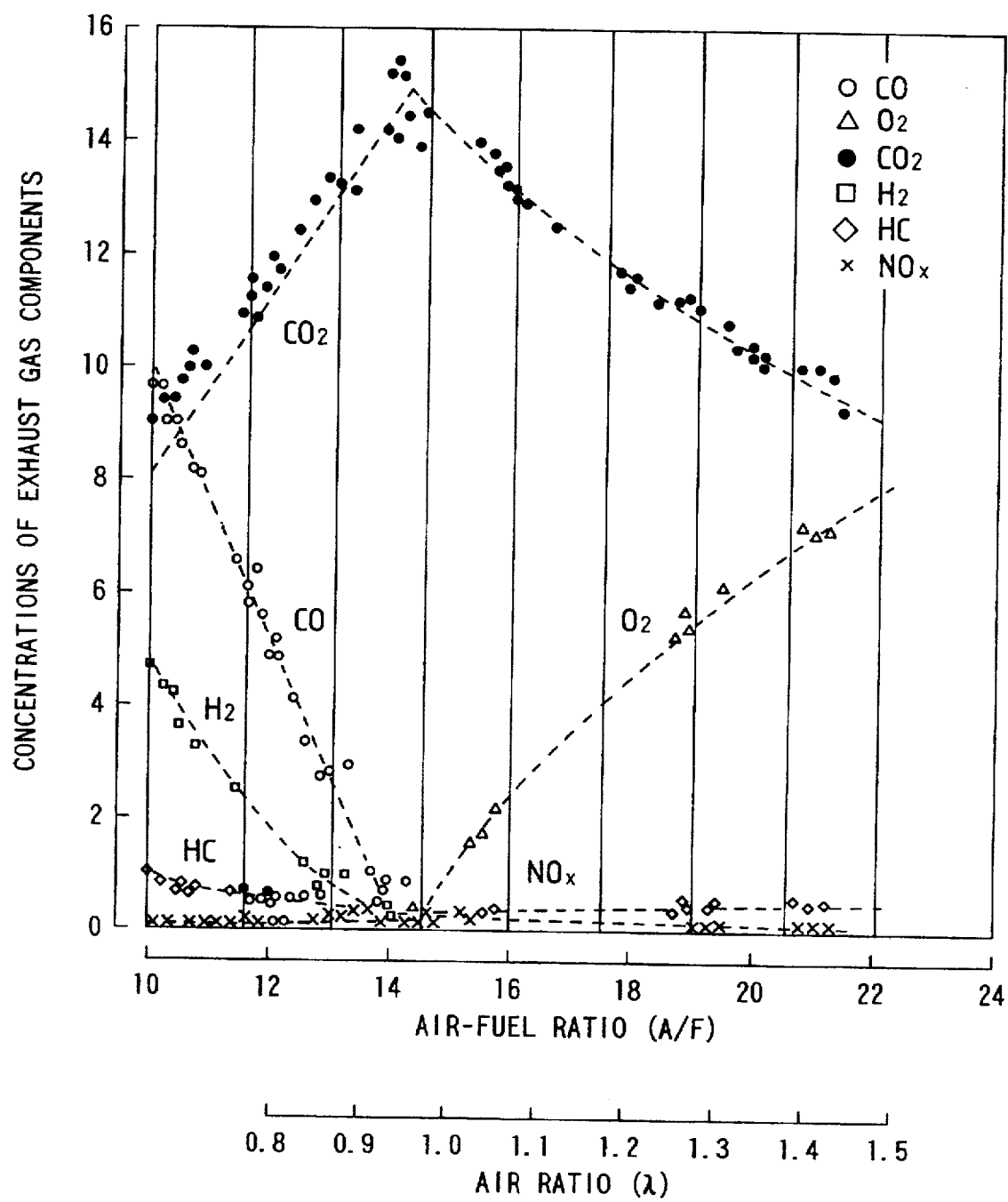
FIG. 3 is a graph which shows the relations between exhaust gas components and an air-fuel ratio of exhaust gases.

After entering the program, the routine proceeds to step 91 wherein an air-fuel (A/F) ratio of exhaust gases entering the catalytic converter 27 is determined based on an output of the air-fuel ratio sensor 28. The routine then proceeds to step 92 wherein the molar concentration (also called molarity) CO2INMC of $O_2$, the molar concentration H2INMC of $H_2$, the molar concentration COINMC of CO, and the molar concentration CO2INMC of $CO_2$ of the exhaust gasses are determined by look-up using mapped data, as shown in FIG. 3. These molar concentrations may alternatively be determined according to a known theoretical formula.

The routine then proceeds to step 93 wherein the molar concentration H2OINMC of $H_2O$ is determined based on the molar concentrations determined in step 92 according to the following equation.

$$H2OINMC \leftarrow \frac{2 \cdot 3.4 \cdot COINMC \cdot (CO2INMC + COIMMC)}{2/(3.4 \cdot CO2INMC + COINMC)}$$

The routine then proceeds to step 94 wherein a denominator KKKBUNBO of a fractional expression used in a subsequent step 97 is determined according to the following equation.

$$KKKBUNBO \leftarrow COINMC + 2 \cdot CO2INMC + 2 \cdot O2INMC + H2OINMC$$

The routine then proceeds to step 95 wherein a basic fuel injection amount Tpg (expressed in terms of gram) is determined according to the following equation using the basic injection time Tp, the injector size INJSIZE, and the fuel specific gravity ρ.

$$Tpg = Tp \cdot INJSIZE \cdot \rho$$

The routine then proceeds to step 96 wherein variables OFIN and OMOL used in subsequent step 97 are determined according to the following relations.

$$OFIN = \frac{A/F \cdot 0.2 \cdot 32}{0.2 \cdot 32 + 0.8 \cdot 28}$$

-continued
$$OMOL = 2 \cdot \frac{Tpg}{14} /(32/14/OFIN)$$

The routine then proceeds to step 97 wherein the number of moles O2INM of $O_2$, the number of moles H2INM of $H_2$, the number of moles COINM of CO, the number of moles CO2INM of $CO_2$, and the number of moles H2OINM of $H_2O$ are determined using the variables derived in step 96 according to the following equations.

$$O2INM \leftarrow O2IINMC \cdot \frac{OFIN}{KKKBUNBO} \cdot Tpg \cdot \frac{2}{32}$$

$$H2INM \leftarrow H2IINMC \cdot \frac{OFIN}{KKKBUNBO} \cdot Tpg \cdot \frac{2}{32}$$

$$COINM \leftarrow COINMC \cdot \frac{OFIN}{KKKBUNBO} \cdot Tpg \cdot \frac{2}{32}$$

$$CO2INM \leftarrow CO2INMC \cdot \frac{OFIN}{KKKBUNBO} \cdot Tpg \cdot \frac{2}{32}$$

$$H2OINM \leftarrow H2OINMC \cdot \frac{OFIN}{KKKBUNBO} \cdot Tpg \cdot \frac{2}{32}$$

Catalytic Reaction Model

Figure 4:
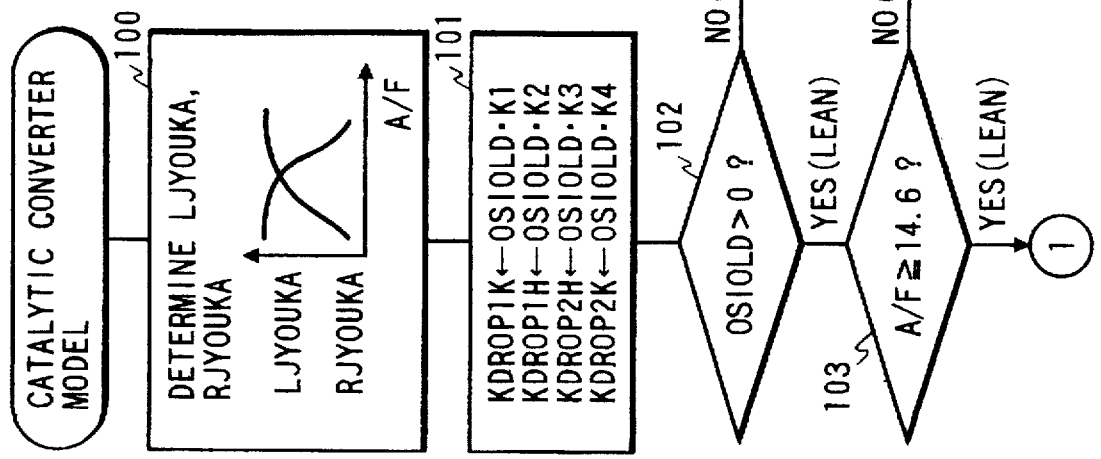
FIGS. 4, 5, and 6 show a flowchart of a program for determining the amount of substance sorbed in a catalytic converter using a catalytic converter model.
Figure 5:
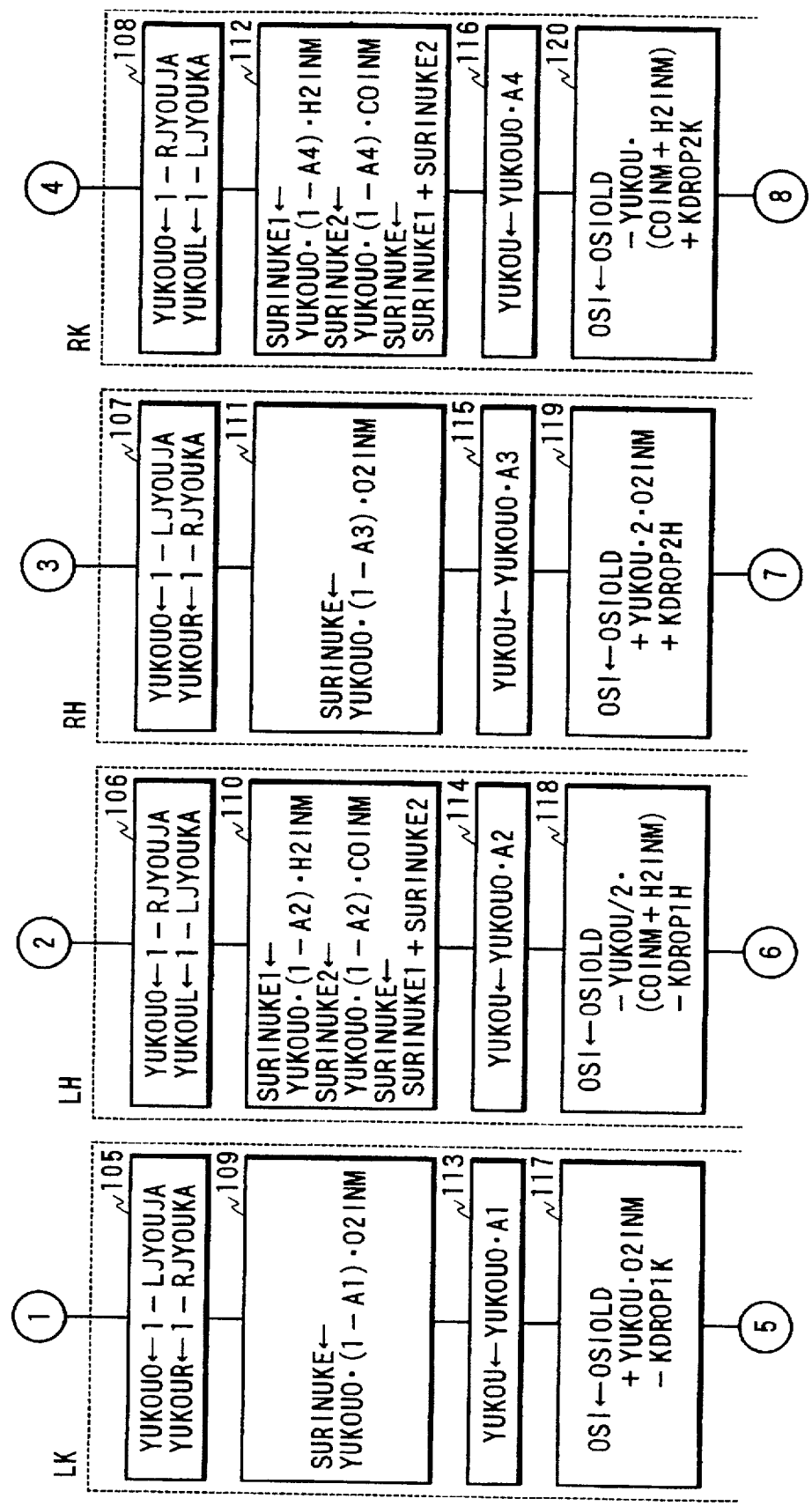
Figure 6:
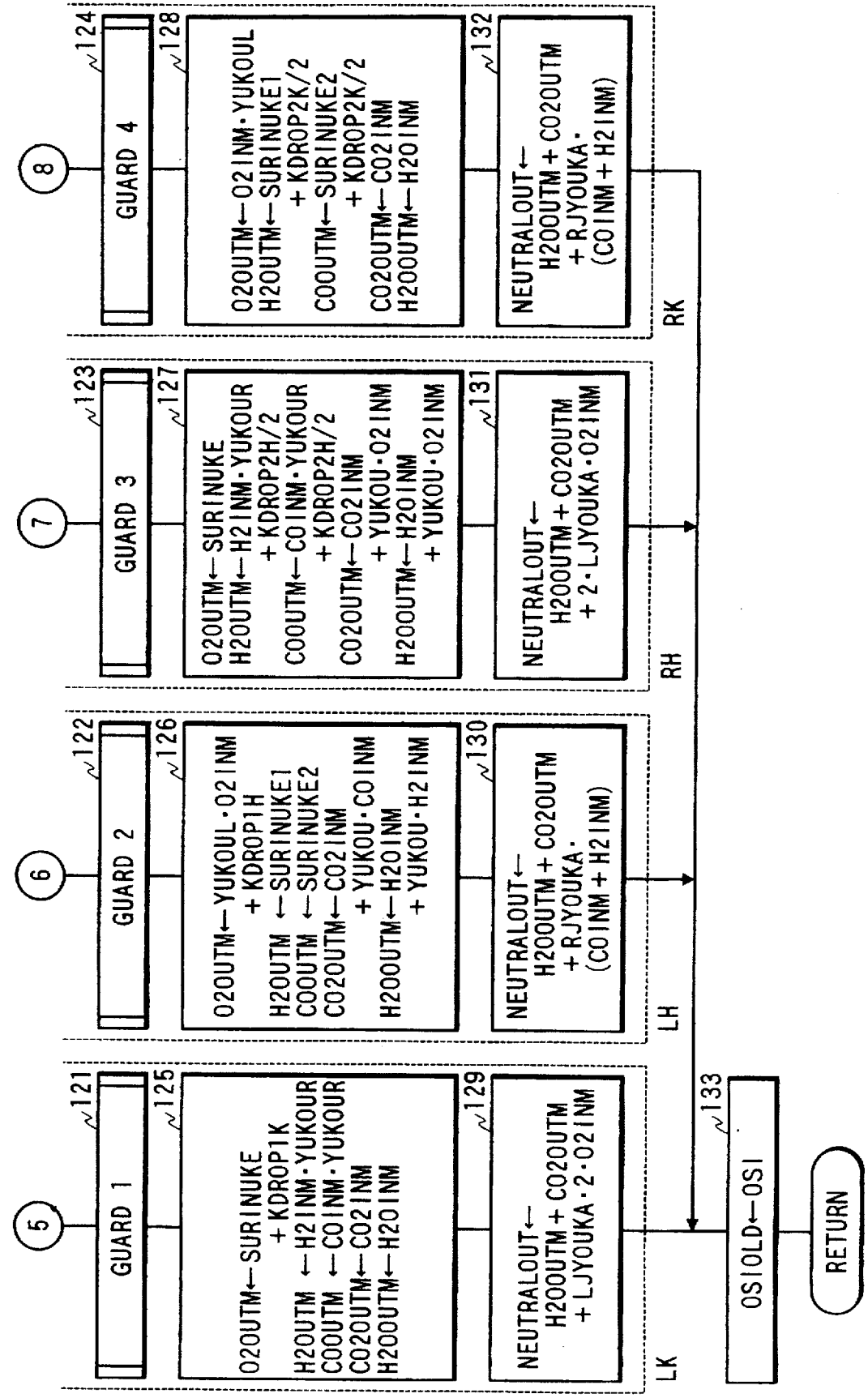

FIGS. 4 to 6 show a flowchart of a program for determining the sorbed substance amount OSI using a given catalytic reaction model.

Figure 7:
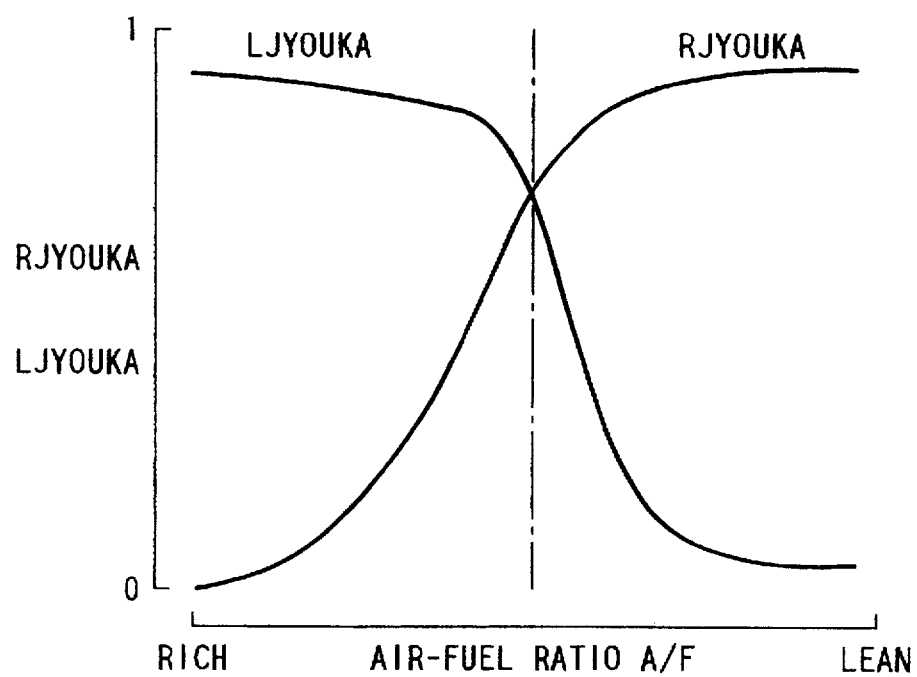
FIG. 7 is a graph which shows the relations between an air-fuel ratio of exhaust gases and a purging rate of rich components and between the air-fuel ratio of the exhaust gases and a purging rate of lean components.

First, in step 100, purging rates RJOUKA and LJOUKA of rich components (i.e., reducing components such as HC, CO, and $H_2$) and lean components (i.e., oxidizing components such as $NO_x$ and $O_2$) in terms of the air-fuel ratio A/F are determined, respectively, by look-up using a map, as shown in FIG. 7.

The routine then proceeds to step 101 wherein the amounts KDROP1K, KDROP1H, KDROP2H, and KDROP2K (the number of moles) of substances desorbing from the catalytic converter 27 are determined by multiplying the sorbed substance amount OSIOLD derived one program cycle earlier by coefficients K1, K2, K3, and K4, respectively.

The amount KDROPLK represents the amount of part of lean components desorbing downstream of the catalytic converter 27 during the adsorption reaction of the lean components in the catalytic converter 27. The amount KDROPLH represents the amount of part of lean components desorbing downstream of the catalytic converter 27 without being subjected to reaction in the catalytic converter 27 during reaction of the lean components sorbed in the catalytic converter 27 with rich components of the incoming gases. The amount KDROP2H represents the amount of part of rich components desorbing downstream of the catalytic converter 27 without being subjected to reaction in the catalytic converter 27 during reaction of the rich components sorbed in the catalytic converter 27 with lean components of the incoming gases. The amount KDROP2K represents the amount of part of rich components desorbing downstream of the catalytic converter 27 during the adsorption reaction of the rich components in the catalytic converter 27.

After step 101, the routine proceeds to step 102 wherein it is determined whether the substances sorbed in the catalytic converter 27 are the rich components (+) or the lean components (−) based on the sign (±) of the sorbed substance amount OSIOLD. If a YES answer is obtained meaning that the sorbed substance are the lean components, then the routine proceeds to step 103 wherein it is determined whether the air-fuel ratio A/F is greater than or equal to 14.6 (i.e., stoichiometric air-fuel ratio) or not for determining whether the incoming gases are rich or lean. Similarly, if a NO answer is obtained in step 102 meaning that the sorbed substance are the rich components, then the routine proceeds to step 104 wherein it is determined whether the air-fuel ratio A/F is greater than or equal to 14.6 or not.

The reaction in the catalytic converter 27 is classified through steps 102 to 104 into the following four types LK, LH, RH, and RK to determine the sorbed substance amounts OSI for the four types.

TABLE 1

|  |  | substances sorbed in a catalytic converter | |
|---|---|---|---|
|  |  | lean components | rich components |
| incoming gas | lean | [LK] adsorption reaction of lean components | [RH] oxidation reaction of rich components in a catalytic converter with lean components of incoming gas |
|  | rich | [LH] reduction reaction of lean components in a catalytic converter with rich components of incoming gas | [RK] adsorption reaction of rich components |

After step 103 or 104, the routine proceeds to step 105, 106, 107, or 108 wherein the ratios of components YUKOUO and YUKOUR or YUKOUL not purged in the catalytic converter 27 are determined using the purging rates RJOUKA and LJOURKA derived in step 100.

The routine then proceeds to step 109, 110, 111, or 112 wherein the amount of non-reacted components SURINUKE of the incoming gases which are discharged from the catalytic converter 27 without experiencing the adsorption reaction and the oxidation-reduction reaction is determined. Specifically, in step 109, since the adsorption reaction of the lean components is taking place in the catalytic converter 27, the amount of non-reacted $O_2$ flowing downstream of the catalytic converter 27 without experiencing the adsorption reaction and the oxidation-reduction reaction is determined. Similarly, in step 110, since the reaction is taking place wherein the lean components sorbed in the catalytic converter 27 is reduced with rich components in the incoming gases, the sum of the amounts of non-reacted $H_2$ and CO is determined. In step 111, since the reaction is taking place wherein the rich components sorbed in the catalytic converter 27 is oxidized with the lean components of the incoming gases, the amount of non-reacted $O_2$ is determined. In step 112, since the adsorption reaction of the rich components is taking place in the catalytic converter 27, the sum of the amounts of non-reacted $H_2$ and CO is determined. Note that A1 to A4 used in steps 109 to 112 are given coefficients.

The routine then proceeds to step 113, 114, 115, or 116 wherein an effective adsorption ratio YUKOU is determined. The routine then proceeds to step 117, 118, 119, or 120 wherein the sorbed substance amount OSI is determined according to one of the types of reactions LK, LH, RH, and RK occurring now. The routine then proceeds to step 121, 122, 123, or 124 wherein the sorbed substance amount OSI is subjected to guard processing, as will be discussed later in detail. The routine then proceeds to step 125, 126, 127, or 128 wherein the number of moles O2OUTM of $O_2$, the number of moles H2OUTM of $H_2$, the number of moles COOUTM of CO, the number of moles CO2OUTM of $CO_2$, and the number of moles H2OOUTM of $H_2O$ in exhaust gasses discharged from the catalytic converter 27 are determined according to one the types of reactions LK, LH, RH, and RK occurring now. The routine then proceeds to step 129, 130, 131, or 132 wherein the sum NUETRALOUT of the numbers of moles of harmless neutral components (i.e., $H_2O$, $CO_2$, and $O_2$) in the exhaust gasses discharged from the catalytic converter 27 is determined. After step 129, 130, 131, or 132, the routine proceeds to step 133 wherein the sorbed substance amount OSI is stored in the RAM 34 as the sorbed substance amount OSIOLD for use in a subsequent program cycle.

Guard Processing

FIGS. 8 to 11 show flowcharts of subroutines performed in steps 121 to 124 which correct the sorbed substance amount OSI so as to meet the relation of MINOSI≦OSI≦MAXOSI. Note that rich components of the sorbed substance amount OSI represent a negative value, while lean components thereof represent a positive value, therefore, MINOSI represents a maximum amount of rich components the catalytic converter 27 can adsorb, while MAXOSI represents a maximum amount of lean components the catalytic converter 27 can adsorb.

Figure 8:
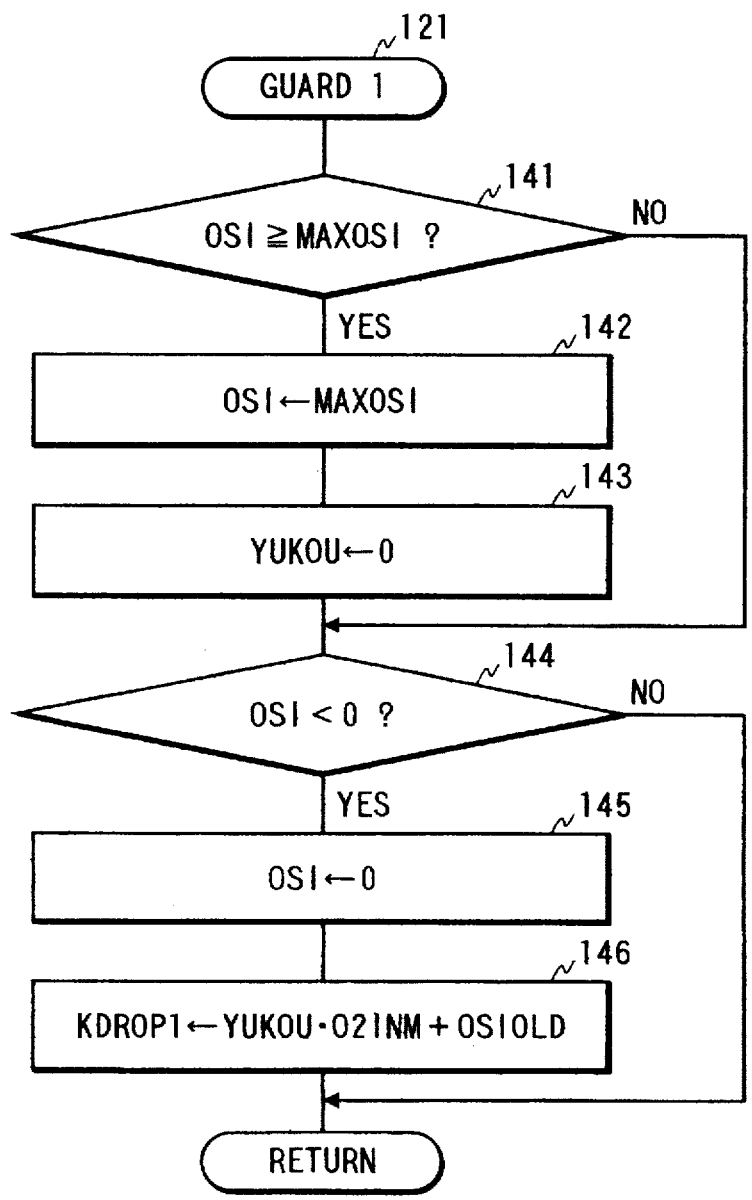
FIG. 8 is a flowchart of guard processing 1 performed in step 121 of FIG. 6.

The guard processing 1 performed in the reaction LK (OSIOLD>0 and A/F≧14.6) is shown in FIG. 8.

First, in step 141, it is determined whether the sorbed substance amount OSI is greater than or equal to MAXOSI or not. If a NO answer is obtained, then the routine proceeds directly to step 144. Alternatively, if a YES answer is obtained, then the routine proceeds to step 142 wherein the sorbed substance amount OSI is set to MAXOSI (i.e., OSI=MAXOSI). The routine then proceeds to step 143 wherein the effective adsorption ratio YUKOU is set to zero (0).

The routine then proceeds to step 144 wherein it is determined whether the sorbed substance amount OSI is smaller than zero (0) or not. If a YES answer is obtained meaning that the sorbed substance amount OSI indicates rich components, then the routine proceeds to step 145 wherein the sorbed substance amount OSI is set to zero (0). The routine then proceeds to step 146 wherein the amount KDROP1K of part of lean components desorbing downstream of the catalytic converter 27 during the adsorption reaction of the lean components in the catalytic converter 27 is determined.

If NO answers are obtained both in steps 141 and 144 (0≦OSI<MAXOSI), the subroutine in FIG. 8 is not carried out, maintaining the sorbed substance amount OSI as is.

Figure 9:
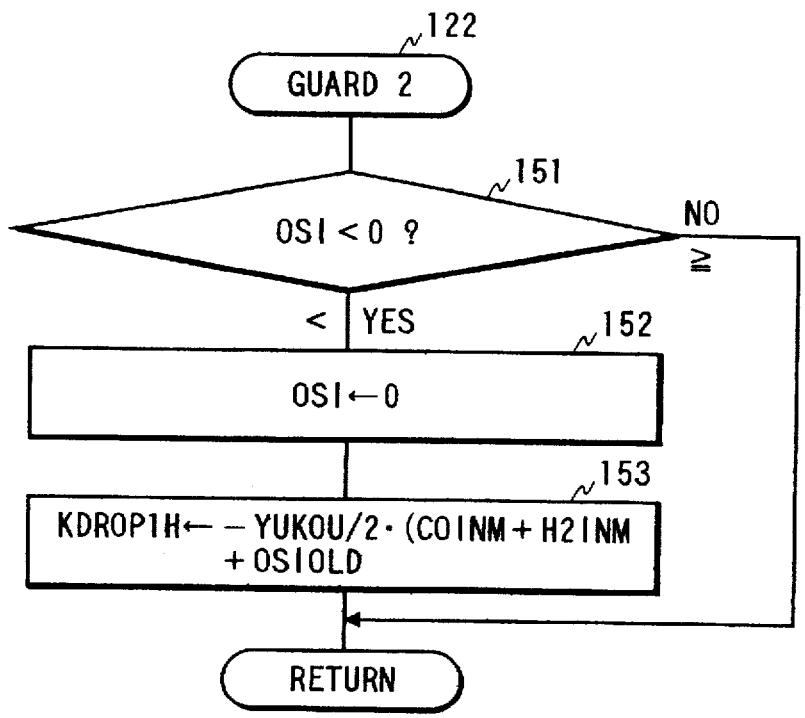
FIG. 9 is a flowchart of guard processing 2 performed in step 122 of FIG. 6.

The guard processing 2 performed in the reaction LH (OSIOLD>0 and A/F<14.6) is shown in FIG. 9.

First, in step 151, it is determined whether the sorbed substance amount OSI is smaller than zero (0) or not. If a NO answer is obtained, then the routine terminates. Alternatively, if a YES answer is obtained meaning that the sorbed substance amount OSI indicates rich components, then the routine proceeds to step 152 wherein the sorbed substance amount OSI is set to zero (0). The routine then proceeds to step 153 wherein the amount KDROP1H of part of lean components desorbing downstream of the catalytic converter 27 without reacting with rich components in the inflow gases during reaction of the lean components sorbed in the catalytic converter 27 with the rich components in the incoming gases is determined.

Figure 10:
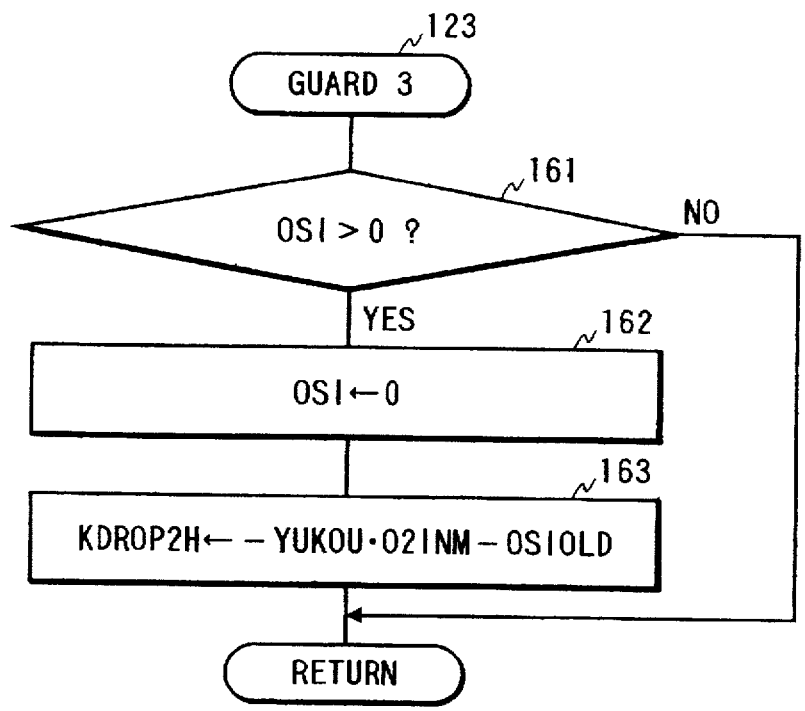
FIG. 10 is a flowchart of guard processing 3 performed in step 123 of FIG. 6.

The guard processing 3 performed in the reaction RH (OSIOLD≦0 and A/F≧14.6) is shown in FIG. 10.

First, in step 161, it is determined whether the sorbed substance amount OSI is greater than zero (0) or not. If a NO answer is obtained, then the routine terminates. Alternatively, if a YES answer is obtained meaning that the sorbed substance amount OSI indicates lean components, then the routine proceeds to step 162 wherein the sorbed substance amount OSI is set to zero (0). The routine then proceeds to step 163 wherein the amount KDROP2H of part of rich components desorbing downstream of the catalytic converter 27 without reacting with lean components in the incoming gases during reaction of the rich components sorbed in the catalytic converter 27 with the lean components in the incoming gases is determined.

Figure 11:
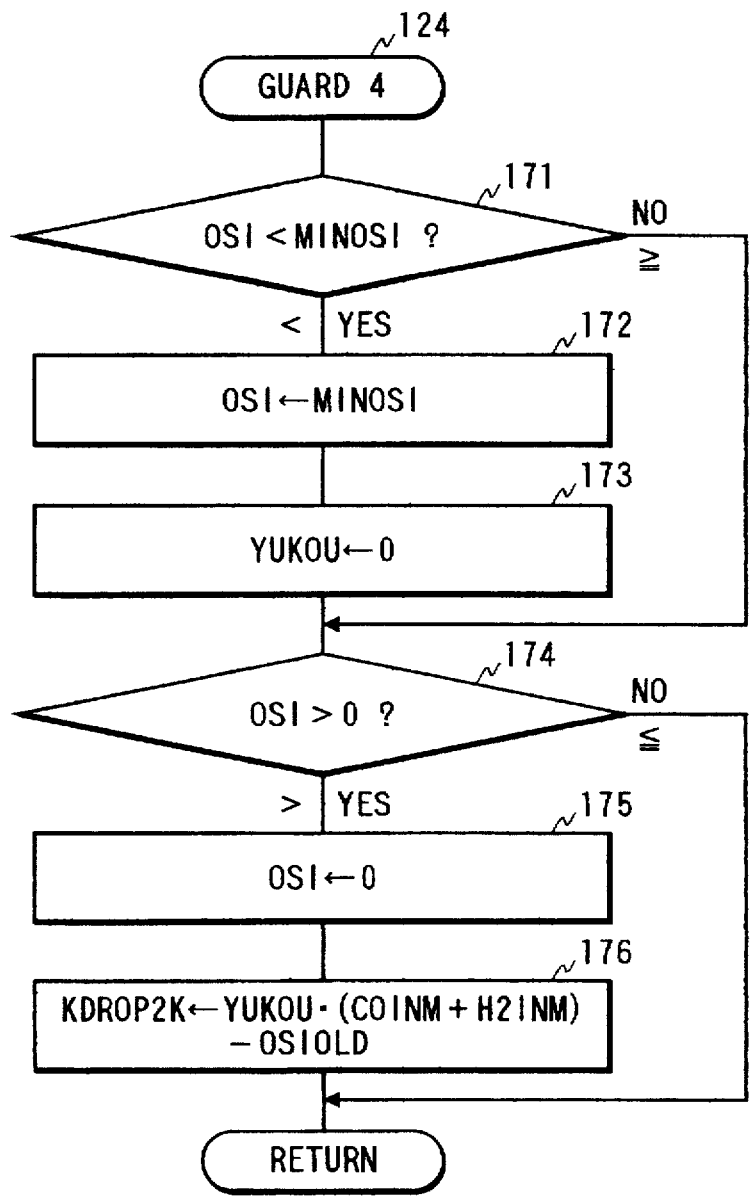
FIG. 11 is a flowchart of guard processing 4 performed in step 124 of FIG. 6.

The guard processing 4 performed in the reaction RK (OSIOLD≦0 and A/F<14.6) is shown in FIG. 11.

First, in step 171, it is determined whether the sorbed substance amount OSI is smaller than or equal to MINOSI or not. If a NO answer is obtained, then the routine proceeds directly to step 174. Alternatively, if a YES answer is obtained, then the routine proceeds to step 172 wherein the sorbed substance amount OSI is set to MINOSI (i.e., OSI= MINOSI). The routine then proceeds to step 173 wherein the effective adsorption ratio YUKOU is set to zero (0).

The routine then proceeds to step 174 wherein it is determined whether the sorbed substance amount OSI is greater than zero (0) or not. If a YES answer is obtained meaning that the sorbed substance amount OSI indicates lean components, then the routine proceeds to step 175 wherein the sorbed substance amount OSI is set to zero (0). The routine then proceeds to step 176 wherein the amount KDROP2K of part of rich components desorbing downstream of the catalytic converter 27 during the adsorption reaction of the rich components in the catalytic converter 27 is determined.

If NO answers are obtained both in steps 171 and 174 (MINOSI≦OSI<0), this subroutine is not carried out, maintaining the sorbed substance amount OSI as is.

Determination of Gas Components Flowing into Oxygen Sensor

Figure 12:
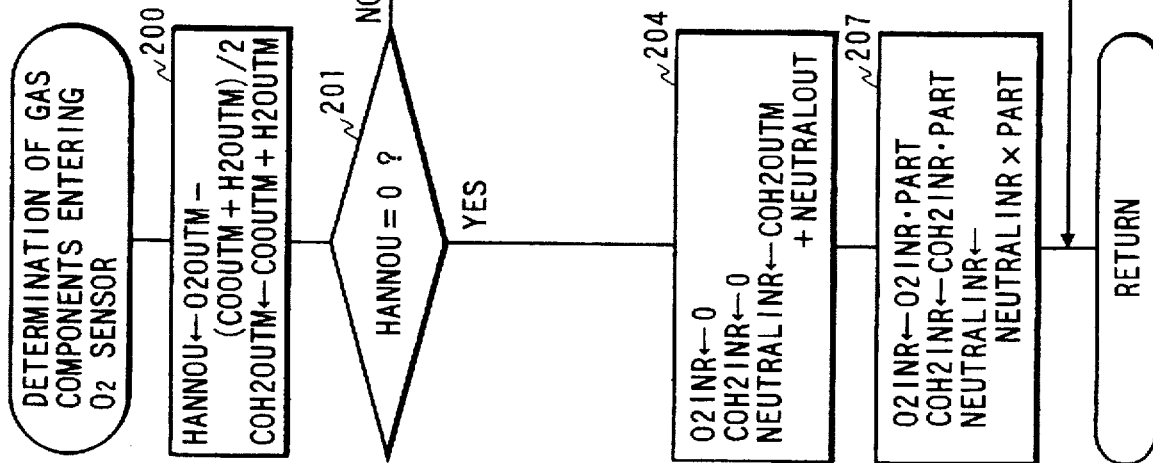
FIG. 12 is a flowchart of a program for determining the number of moles of each of exhaust gas components entering an oxygen sensor.

FIG. 12 shows a flowchart of a program for determining gas components flowing into the oxygen sensor 29 located downstream of the catalytic converter 27.

First, in step 200, the number of excess moles HANNOU of lean and rich components of exhaust gases entering the oxygen sensor 29 and the number of moles COH2OUTM of the rich components are determined for determining the balance between rich components and the lean components.

In steps 201, 202, and 203, the balance between the rich and lean components of the gases flowing into the oxygen sensor 29 is determined based on the number of excess moles HANNOU. If a YES answer is obtained in step 201 (HANNOU=0) meaning that the rich components balance with the lean components, then the routine proceeds to step 204 and 207 wherein the number of moles NEUTRALINR of neutral gas components is determined. If a YES answer is obtained in step 202 (NANNOU>0) meaning that the lean components are in excess of the rich components, then the routine proceeds to step 205 and 208 wherein the number of moles O2INR of $O_2$ and the number of moles NEUTRALINER of the neutral gas components are determined. If a YES answer is obtained in step 203 (NANNOU<0) meaning that the rich components are in excess of the lean components, then the routine proceeds to steps 206 and 209 wherein the number of moles COH2INR of the rich components and the number of moles NEUTRALINER of the neutral gas components are determined. Note that PART used in steps 207 to 209 is a constant indicating a ratio of gases discharged from the catalytic converter 27 to gasses entering the oxygen sensor 29.

Sensor Reaction Model

The oxygen sensor 29 disposed downstream of the catalytic converter 27 is designed to have rich components of incoming exhaust gasses react with lean components ($O_2$) thereof under catalytic action of platinum electrodes to reduce the concentration of oxygen remaining in the incoming exhaust gasses for determining whether the incoming exhaust gasses are rich or lean based on the degree to which the concentration of oxygen is reduced. Specifically, the catalytic reaction similar to that of the catalytic converter 27 takes place in the oxygen sensor 29. If the incoming exhaust gases are rich, it will cause the residual $O_2$ concentration to be decreased greatly, while if the incoming exhaust gasses are lean, it will cause the residual $O_2$ concentration to be decreased slightly. Thus, the use of sensor reaction models similar to the catalytic reaction models as described above permits an output of the oxygen sensor 29 to be estimated.

Figure 13:
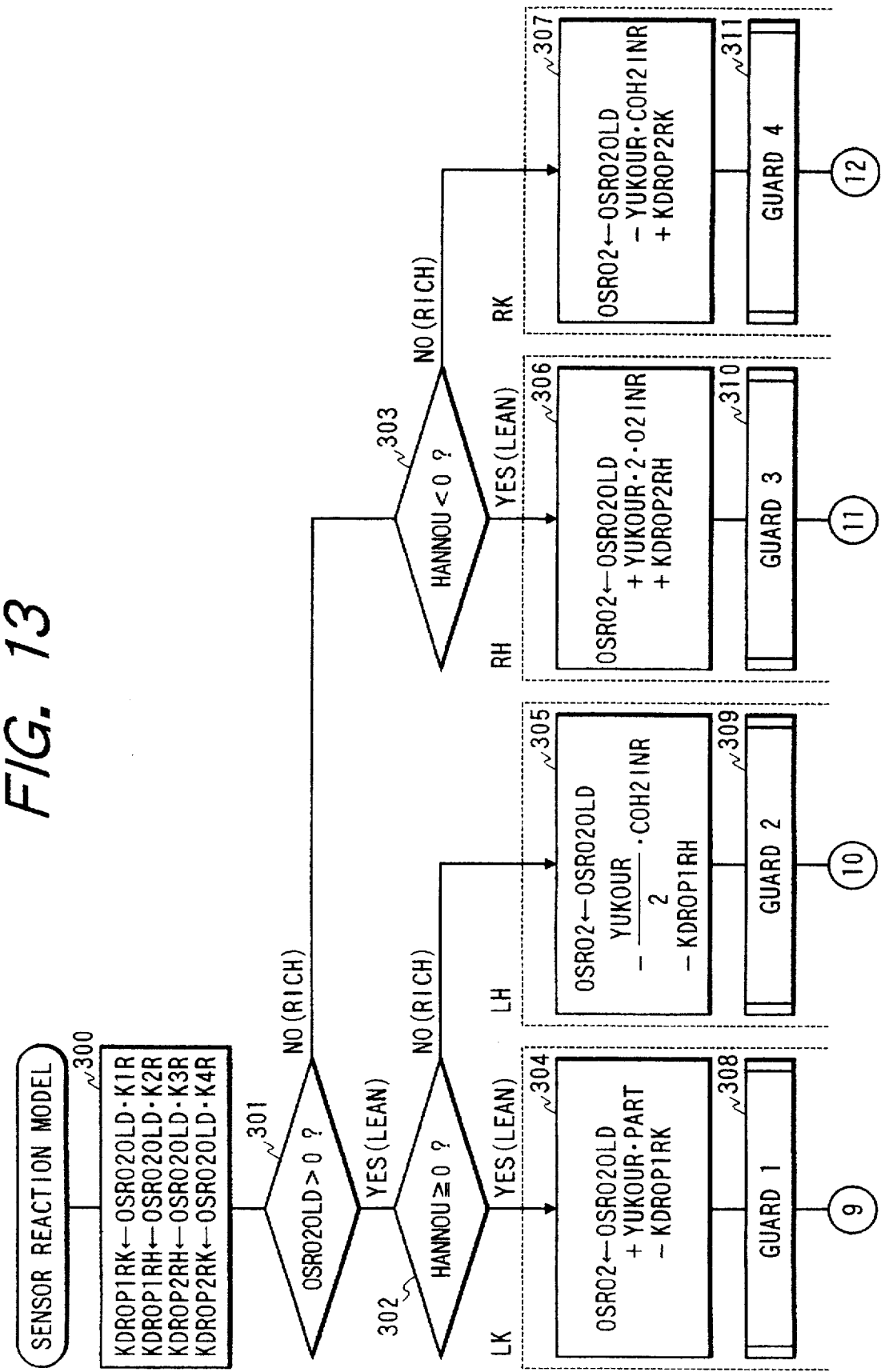
FIGS. 13 and 14 show a flowchart of a program for estimating an output of an oxygen sensor 29 using a sensor reaction models.
Figure 14:
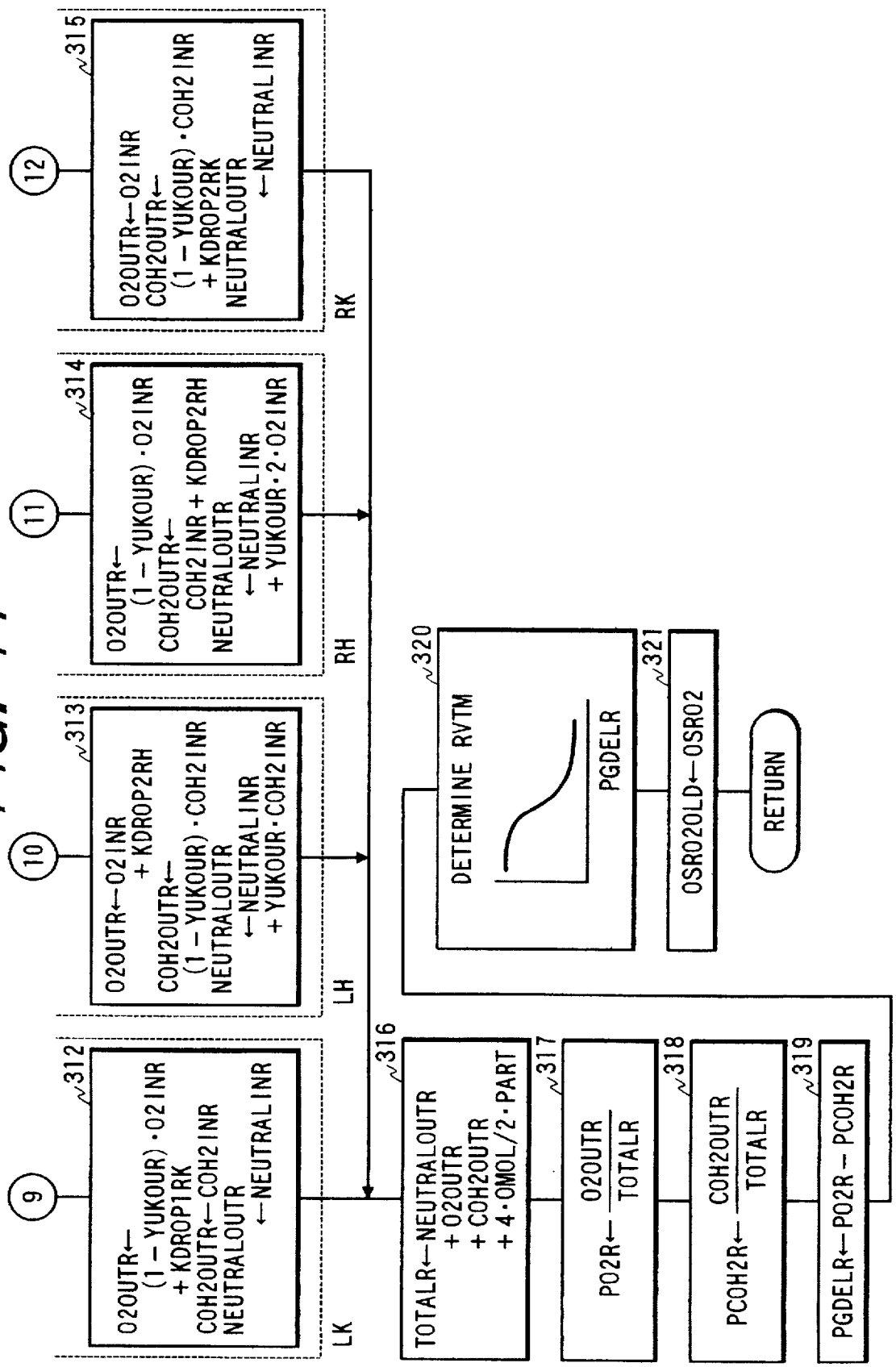

FIGS. 13 and 14 show a flowchart of a program for estimating an output of the oxygen sensor 29 using the sensor reaction model.

First, in step 300, the amounts KDROP1RK, KDROP1RH, KDROP2RH, and KDROP2RK (the number of moles) of substances desorbing from the oxygen sensor 29 are determined by multiplying the amount OSRO2OLD of substances sorbed in the oxygen sensor 29 (hereinafter, referred to as the sorbed substance amount) derived one program cycle earlier by coefficients K1R, K2R, K3R, and K4R, respectively.

The amount KDROP1RK represents the amount of part of lean components desorbing downstream of the oxygen sensor 29 during adsorption reaction of the lean components in the oxygen sensor 29. The amount KDROP1RH represents the amount of part of lean components desorbing downstream of the oxygen sensor 29 without reacting with rich components of the incoming exhaust gases during reaction of the lean components sorbed in the oxygen sensor 29 with the rich components of the incoming exhaust gases. The amount KDROP2RH represents the amount of part of rich components desorbing downstream of the oxygen sensor 29 without reacting with lean components of the incoming exhaust gasses during reaction of the rich components sorbed in the oxygen sensor 29 with the lean components of the incoming exhaust gases. The amount KDROP2RK represents the amount of part of rich components desorbing downstream of the oxygen sensor 29 during the adsorption reaction of the rich components in the oxygen sensor 29.

After step 300, the routine proceeds to step 301 wherein it is determined whether the substances sorbed in the oxygen sensor 29 are the rich components (+) or the lean components (−) based on the sign (±) of the sorbed substance amount OSRO2OLD. The routine then proceeds to step 302 or 303 wherein it is determined whether the incoming exhaust gases are rich or lean by finding the sign of the number of excess moles HANNOU derived in step 200 of FIG. 12.

The reaction in the oxygen sensor 29 is classified through steps 301 to 303 into the four types LK, LH, RH, and RK, as shown in the table 1, for determining the sorbed substance amounts OSI for the four types in steps 304 to 307.

The sensor reaction models are substantially identical with the catalytic reaction models (different only in size), however, it allows non-reacted components to be ignored (YOUKOUR=1). Therefore, steps 105 to 116 in FIG. 5 can be omitted in this program.

After the sorbed substance amount OSRO2 is determined in step 304, 305, 306, or 307 according to the type of reaction in the oxygen sensor 29, the routine proceeds to step 308, 309, 310, or 311 wherein the sorbed substance amount OSRO2 is subjected to guard processing, as will be discussed later in detail. The routine then proceeds to step 312, 313, 314, or 315 wherein the number of moles O2OUTR of $O_2$, the number of moles COH2OUTRM of rich components, and the number of moles NEUTRALOUTR of neutral gas components in exhaust gasses discharged from the oxygen sensor 29 are determined.

Figure 15:
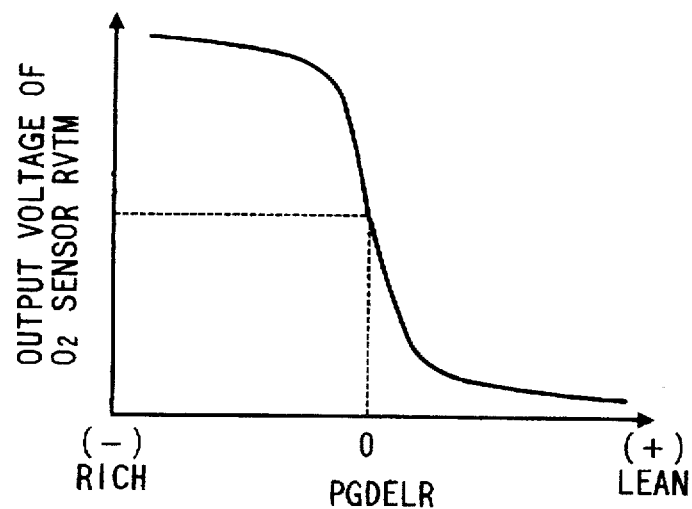
FIG. 15 is a graph which shows the relation between an estimate of output of an oxygen sensor and a difference between the concentration of $O_2$ of exhaust gases entering the oxygen sensor and the concentration of the exhaust gases.

After step 312, 313, 314, or 315, the routine proceeds to step 316 wherein the total number of moles TOTALR of all the gases discharged from the oxygen sensor 29 is determined. The routine then proceeds to step 317 wherein the $O_2$ concentration PO2R of the discharged gases is determined. The routine then proceeds to step 318 wherein the rich component concentration PCOH2R of the discharged gases is determined. The routine then proceeds to step 319 wherein the concentration difference PGDELR between the $O_2$ concentration PO2R and the rich component concentration PCOH2R is determined. The routine then proceeds to step 320 wherein an output voltage estimate RVTM of the oxygen sensor 29 is determined by look-up using a map, as shown in FIG. 15, based on the concentration difference PGDELR. The routine then proceeds to step 321 wherein the sorbed substance amount OSRO2 derived in this program cycle is stored in the RAM 34 as the sorbed substance amount OSRO2OLD for use in a subsequent program cycle.

Guard Processing

FIGS. 16 to 19 show flowcharts of subroutines performed in steps 308 to 311 which correct the sorbed substance amount OSRO2 so as to meet the relation of MINOSRO2≦OSRO2≦MAXOSRO2. Note that rich components of the sorbed substance amount OSRO2 represent a negative value, while lean components thereof represent a positive value, therefore, MINOSRO2 represents a maximum amount of rich components sorbed in the oxygen sensor 29, while MAXOSRO2 represents a maximum amount of lean components sorbed in the oxygen sensor 29.

Figure 16:
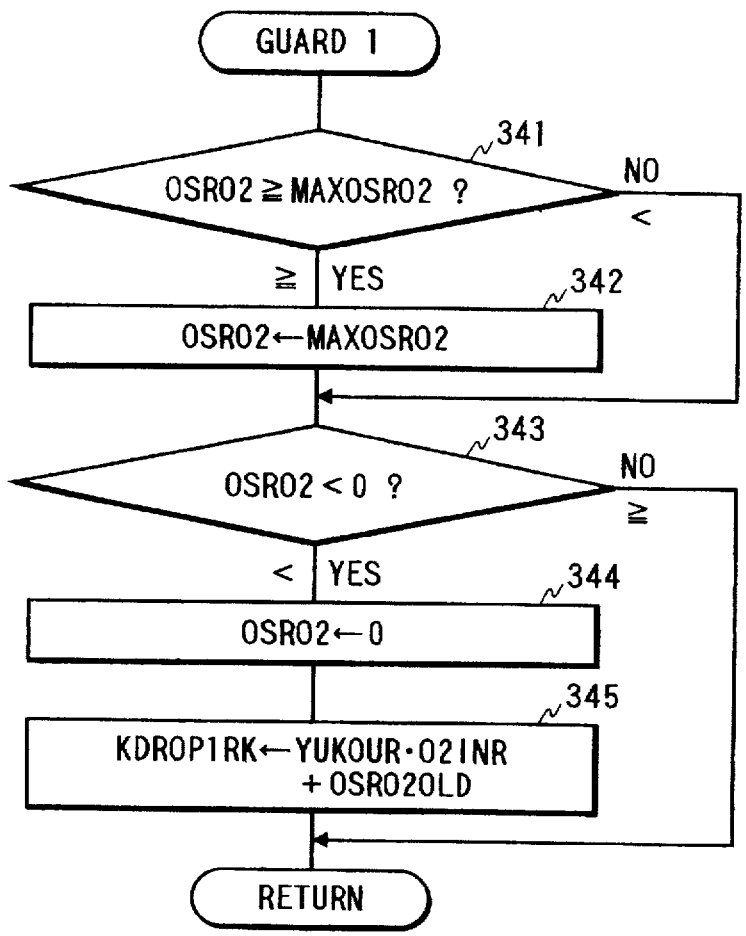
FIG. 16 is a flowchart of guard processing 1 performed in step 308 of FIG. 13.

The guard processing 1 performed in the reaction LK (OSRO2OLD>0 and HANNOU≧0) is shown in FIG. 16.

First, in step 341, it is determined whether the sorbed substance amount OSRO2 is greater than or equal to MAXOSRO2 or not. If a NO answer is obtained, then the routine proceeds directly to step 343. Alternatively, if a YES answer is obtained, then the routine proceeds to step 342 wherein the sorbed substance amount OSRO2 is set to MAXOSRO2 (i.e., OSRO2=MAXOSRO2). The routine then proceeds to step 343 wherein it is determined whether the sorbed substance amount OSRO2 is smaller than zero (0) or not. If a YES answer is obtained meaning that the sorbed substance amount OSRO2 indicates rich components, then the routine proceeds to step 344 wherein the sorbed substance amount OSRO2 is set to zero (0). The routine then proceeds to step 345 wherein the amount KDROP1RK of part of lean components desorbing downstream of the oxygen sensor 29 during the adsorption reaction of the lean components in the oxygen sensor 29 is determined.

If NO answers are obtained both in steps 341 and 343 (0<OSRO2<MAXOSRO2), this subroutine is not carried out, maintaining the sorbed substance amount OSRO2 as is.

Figure 17:
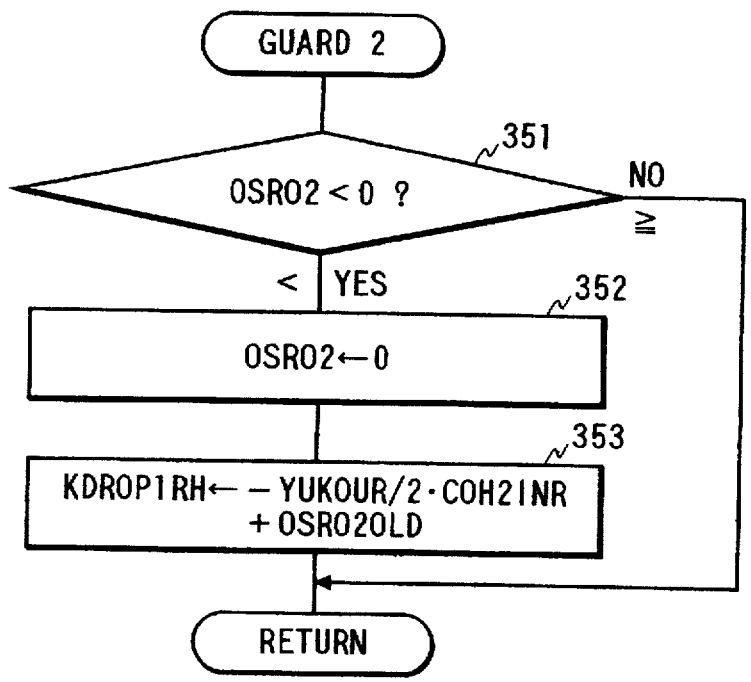
FIG. 17 is a flowchart of guard processing 2 performed in step 309 of FIG. 13.

The guard processing 2 performed in the reaction LH (OSRO2OLD>0 and HANNOU<0) is shown in FIG. 17.

First, in step 351, it is determined whether the sorbed substance amount OSRO2 is smaller than zero (0) or not. If a NO answer is obtained, then the routine terminates. Alternatively, if a YES answer is obtained meaning that the sorbed substance amount OSRO2 indicates rich components, then the routine proceeds to step 352 wherein the sorbed substance amount OSRO2 is set to zero (0). The routine then proceeds to step 353 wherein the amount KDROP1RH of part of lean components desorbing downstream of the oxygen sensor 29 without reacting with rich components in the incoming gases during reaction of the lean components sorbed in the oxygen sensor 29 with the rich components in the incoming gases is determined.

Figure 18:
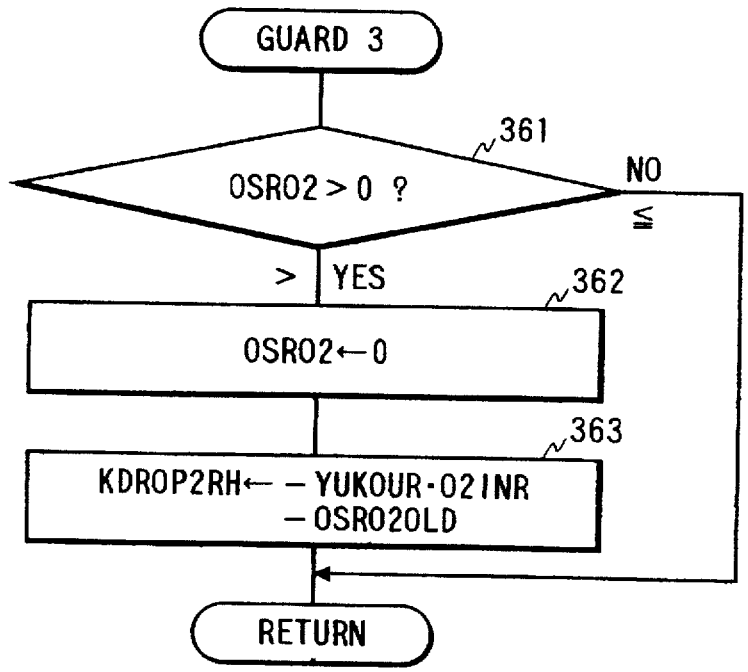
FIG. 18 is a flowchart of guard processing 3 performed in step 310 of FIG. 13.

The guard processing 3 performed in the reaction RH (OSRO2OLD≦0 and HANNOU≧0) is shown in FIG. 18.

First, in step 361, it is determined whether the sorbed substance amount OSRO2 is greater than zero (0) or not. If a NO answer is obtained, then the routine terminates. Alternatively, if a YES answer is obtained meaning that the sorbed substance amount OSRO2 indicates lean components, then the routine proceeds to step 362 wherein the sorbed substance amount OSRO2 is set to zero (0). The routine then proceeds to step 363 wherein the amount KDROP2RH of part of rich components desorbing downstream of the oxygen sensor 29 without reacting with lean components in the incoming gases during reaction of the rich components sorbed in the oxygen sensor 29 with the lean components in the incoming gases is determined.

Figure 19:
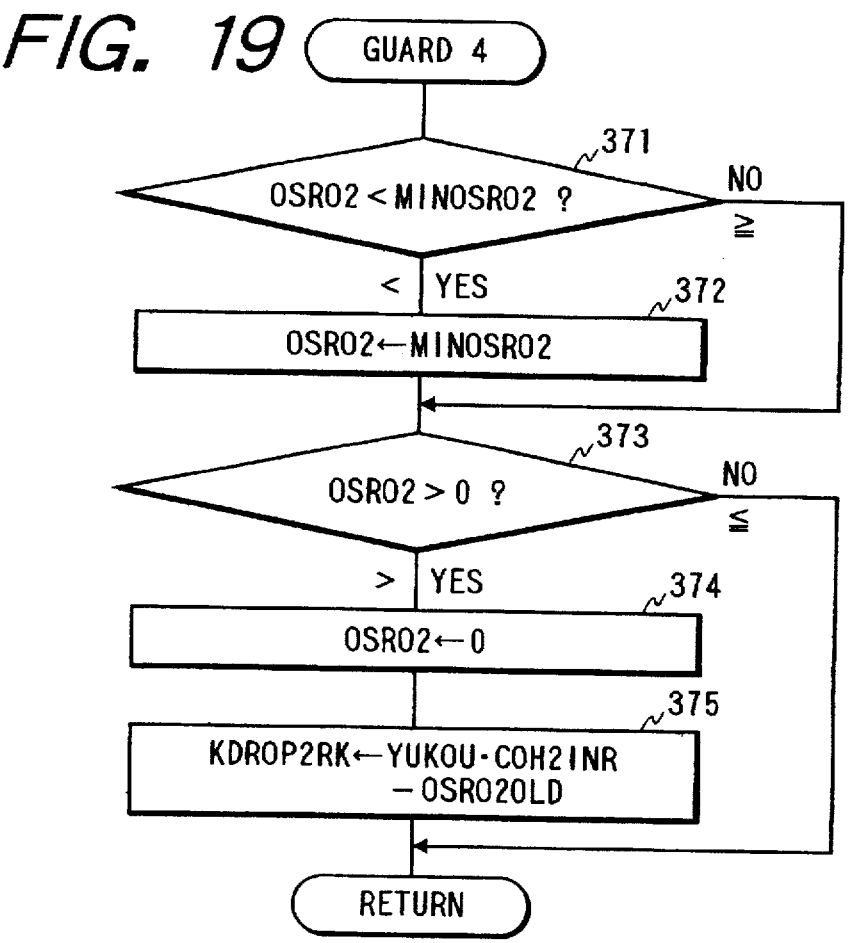
FIG. 19 is a flowchart of guard processing 4 performed in step 311 of FIG. 13.

The guard processing 4 performed in the reaction RK (OSRO2OLD≦0 and HANNOU<0) is shown in FIG. 19.

First, in step 371, it is determined whether the sorbed substance amount OSRO2 is smaller than MINOSRO2 or not. If a NO answer is obtained, then the routine proceeds directly to step 373. Alternatively, if a YES answer is obtained, then the routine proceeds to step 372 wherein the sorbed substance amount OSRO2 is set to MINOSRO2 (i.e., OSRO2=MINOSRO2). The routine then proceeds to step 373 wherein it is determined whether the sorbed substance amount OSRO2 is greater than zero (0) or not. If a YES answer is obtained meaning that the sorbed substance amount OSRO2 indicates lean components, then the routine proceeds to step 374 wherein the sorbed substance amount OSRO2 is set to zero (0). The routine then proceeds to step 375 wherein the amount KDROP2RK of part of rich components desorbing downstream of the oxygen sensor 29 during the adsorption reaction of the rich components in the oxygen sensor 29 is determined.

If NO answers are obtained both in steps 371 and 373 (MINOSRO2≦OSRO2≦0), this subroutine is not carried out, maintaining the sorbed substance amount OSRO2 as is.

Determination of Catalyst Condition

Figure 20:
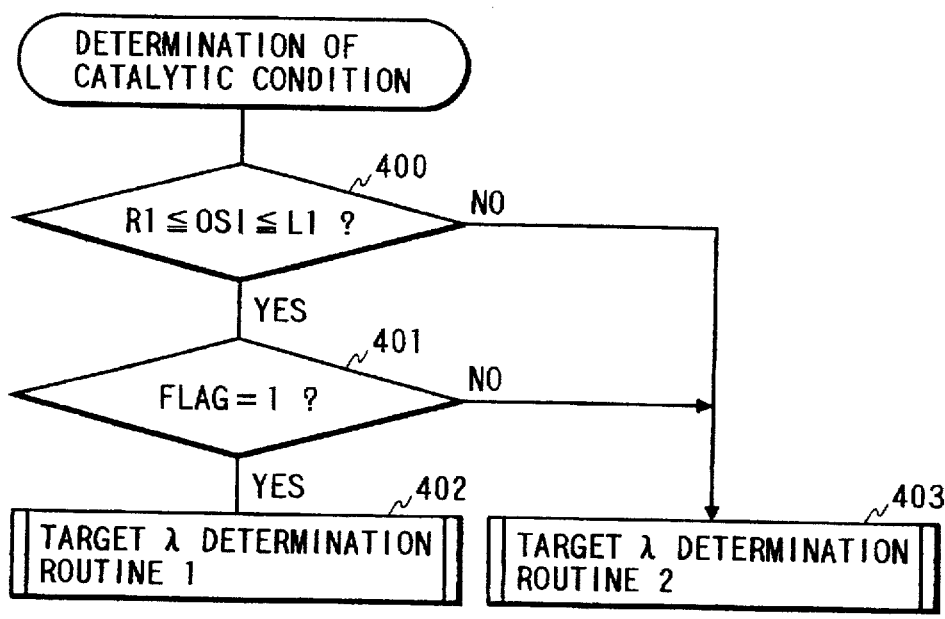
FIG. 20 is a flowchart of a program for determining a condition of a catalytic converter.

FIG. 20 shows a flowchart of a program for determining a condition of the catalytic converter 27.

First, in step 400, it is determined whether the sorbed substance amount OSI of the catalytic converter 27 lies within a first range (R1≦OSI≦L1) or not. Note that R1 is a limit (negative value) on the rich side, and L1 is a limit (positive value) on the lean side. If a NO answer is obtained meaning that the sorbed substance amount OSI is out of the first range, then the routine proceeds to step 403 wherein a target λ determination routine 2, as will be discussed later in detail, is carried out for decreasing the sorbed substance amount OSI quickly. Alternatively, if a YES answer is obtained in step 400, then the routine proceeds to step 401 wherein it is determined whether a target switch flag FLAG is one (1) or not. If a NO answer is obtained, then the routine proceeds to step 403. Alternatively, if a YES answer is obtained, then the routine proceeds to step 402 wherein a target λ determination routine 1, as will be discussed later in detail, is carried out. Note that the target λ represents a target air ratio which is given by the following relation.

Target λ=Target air-fuel ratio/Stoichiometric air-fuel ratio

Therefore, the target air-fuel ratio is also determined by determining the target λ.

Target λ Determination Routine 1

Figure 21:
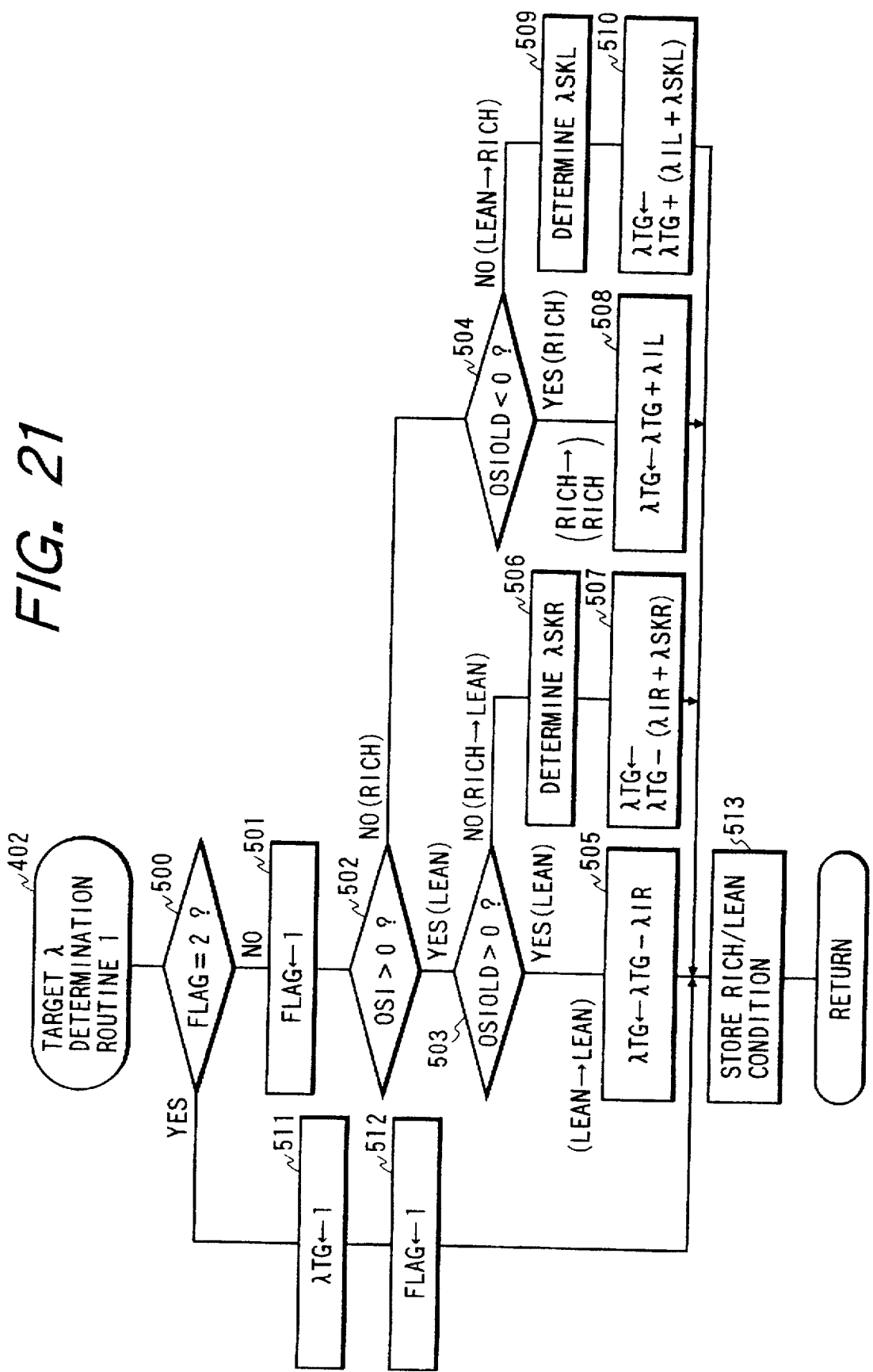
FIG. 21 is a flowchart of a program performed in step 402 in FIG. 20 for determining a target air-fuel ratio.

FIG. 21 shows a flowchart of the target λ determination routine 1 performed in step 402 of FIG. 20 which determines the target λ according to the sorbed substance amount OSI.

First, in step 500, it is determined whether the target switch flag FLAG is two (2) or not, that is, whether a target λTG was determined by the target λ determination routine 2 in a previous program cycle or not. If a YES answer is obtained, then the routine proceeds to step 511 wherein the target λTG is set to one (1). The routine then proceeds to step 512 wherein the target switch flag FLAG is set to one (1). The routine then proceeds to step 513 wherein a current rich/lean condition of the catalytic converter 27 is stored in a memory and terminates.

Figure 22A:
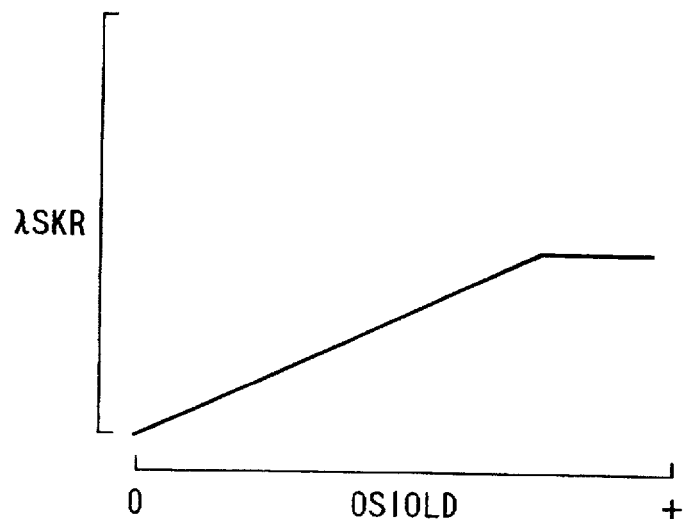
FIG. 22(a) is a graph which shows the relation between a rich skip amount for correcting a target air-fuel ratio and the amount of substance sorbed in a catalytic converter.

If a NO answer is obtained in step 500, then the routine proceeds to step 501 wherein the target switch flag FLAG is set to one (1). The routine then proceeds to step 502 wherein it is determined whether the sorbed substance amount OSI is a positive value (OSI>0) or not. If a YES answer is obtained meaning that the inside of the catalytic converter 27 is in a lean condition, then the routine proceeds to step 503 wherein it is determined whether the sorbed substance amount OSI-OLD derived one program cycle earlier is a positive value (OSIOLD>1) or not. If a YES answer is obtained meaning that the inside of the catalytic converter 27 is also in the lean condition in this program cycle, then the routine proceeds to step 505 wherein the target λTG is shifted to the rich side by a given value λIR every calculation time interval. Alternatively, if a NO answer is obtained in step 503 meaning that the inside of the catalytic converter 27 is switched from the rich condition to the lean condition, then the routine proceeds to step 506 wherein a rich skip amount λSKR is determined by look-up using a map, as shown in FIG. 22(a), according to the sorbed substance amount OSI-OLD derived one program cycle earlier. The routine then proceeds to step 507 wherein the target λTG is corrected to the rich side by subtracting the sum of λIR and λSKR therefrom. The routine then proceeds to step 513 wherein a current rich/lean condition of the catalytic converter 27 is stored in the RAM 34.

Figure 22B:
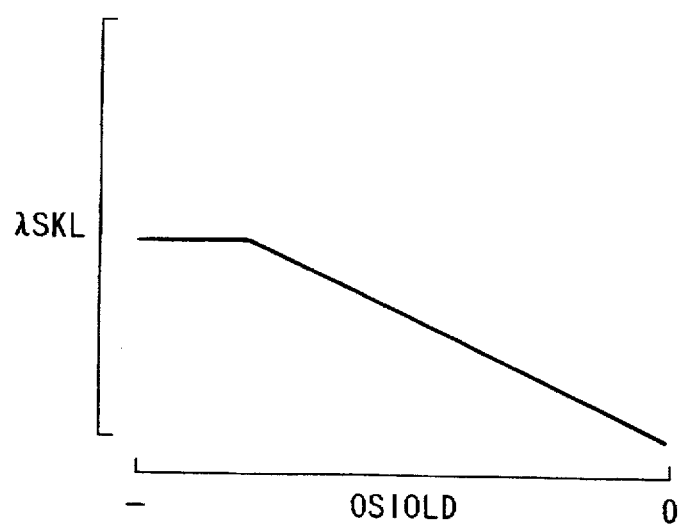
FIG. 22(b) is a graph which shows the relation between a lean skip amount for correcting a target air-fuel ratio and the amount of substance sorbed in a catalytic converter.

If a NO answer is obtained (OSI≦0) in step 502 meaning that the inside of the catalytic converter 27 is in the rich condition, then the routine proceeds to step 504 wherein it is determined whether the sorbed substance amount OSI-OLD is a negative value (OSIOLD<0) or not. If a YES answer is obtained meaning that the inside of the catalytic converter 27 is also in the rich condition in this program cycle, then the routine proceeds to step 508 wherein the target λTG is shifted to the lean side by a given value λIL every calculation time interval. Alternatively, if a NO answer is obtained in step 504 meaning that the inside of the catalytic converter 27 is switched from the lean condition to the rich condition, then the routine proceeds to step 509 wherein a lean skip amount λSKL is determined by look-up using a map, as shown in FIG. 22(b), according to the sorbed substance amount OSIOLD derived one program cycle earlier. The routine then proceeds to step 510 wherein the target λTG is corrected to the lean side by adding the sum of λIR and λSKR thereto. The routine then proceeds to step 513 wherein a current rich/lean condition of the catalytic converter 27 is stored in the RAM 34.

Figure 23A:
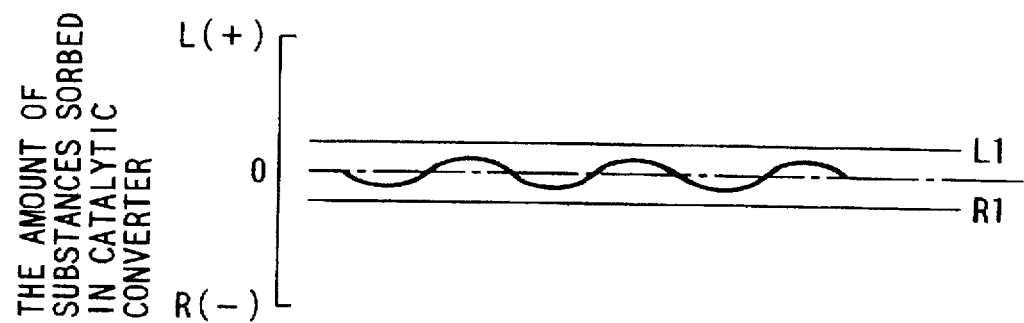
FIG. 23(a) is a time chart which shows variation in component of exhaust gases sorbed in a catalytic converter.
Figure 23B:
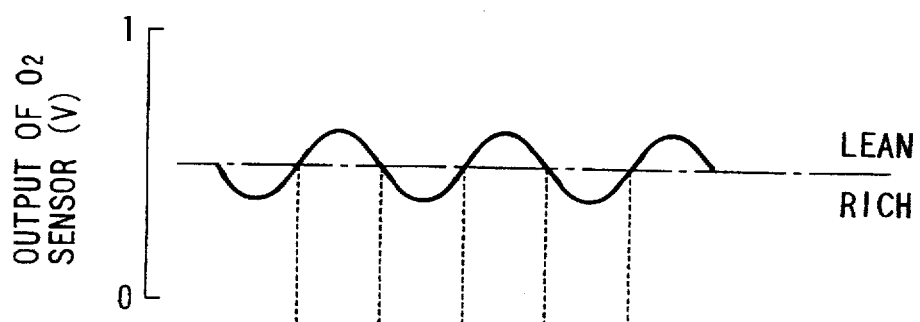
FIG. 23(b) is a time chart which shows variation in output from an oxygen sensor.
Figure 23C:
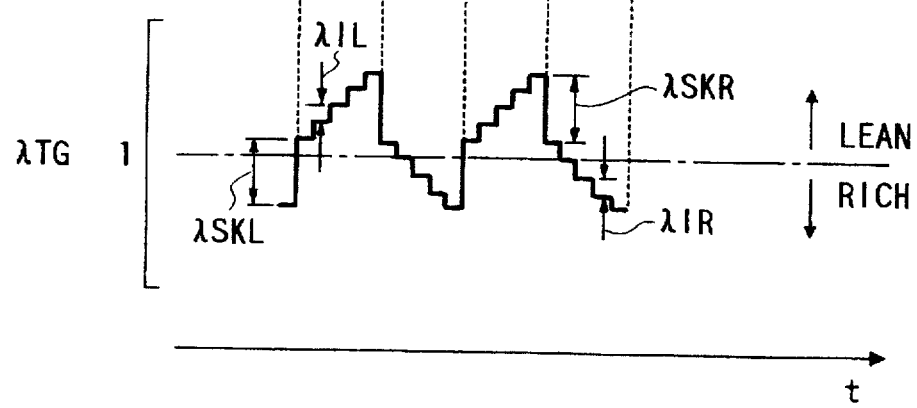
FIG. 23(c) is a time chart which shows variation in target air-fuel ratio between rich and lean side.

FIGS. 23(a) to 23(c) are time charts showing a variation in the sorbed substance amount OSI under control of the target λTG through the target λ determination routine 1, as described above, the output of the oxygen sensor 29, and the target λTG. As can be seen in the drawings, the target λTG is maintained near one (1) by changing the skip amounts λSKR and λSKL according to the sorbed substance amount OSIOLD one program cycle earlier upon reversal of the rich/lean condition.

While in steps 506 and 509, the skip amounts λSKR and λSKL are determined by look-up using the maps, they may alternately be determined according to the following relations.

$$\lambda SKR = C1 \times OSI$$

$$\lambda SKL = C2 \times (-OSI)$$

where C1 and C2 are constants.

Target λ Determination Routine 2

Figure 24:
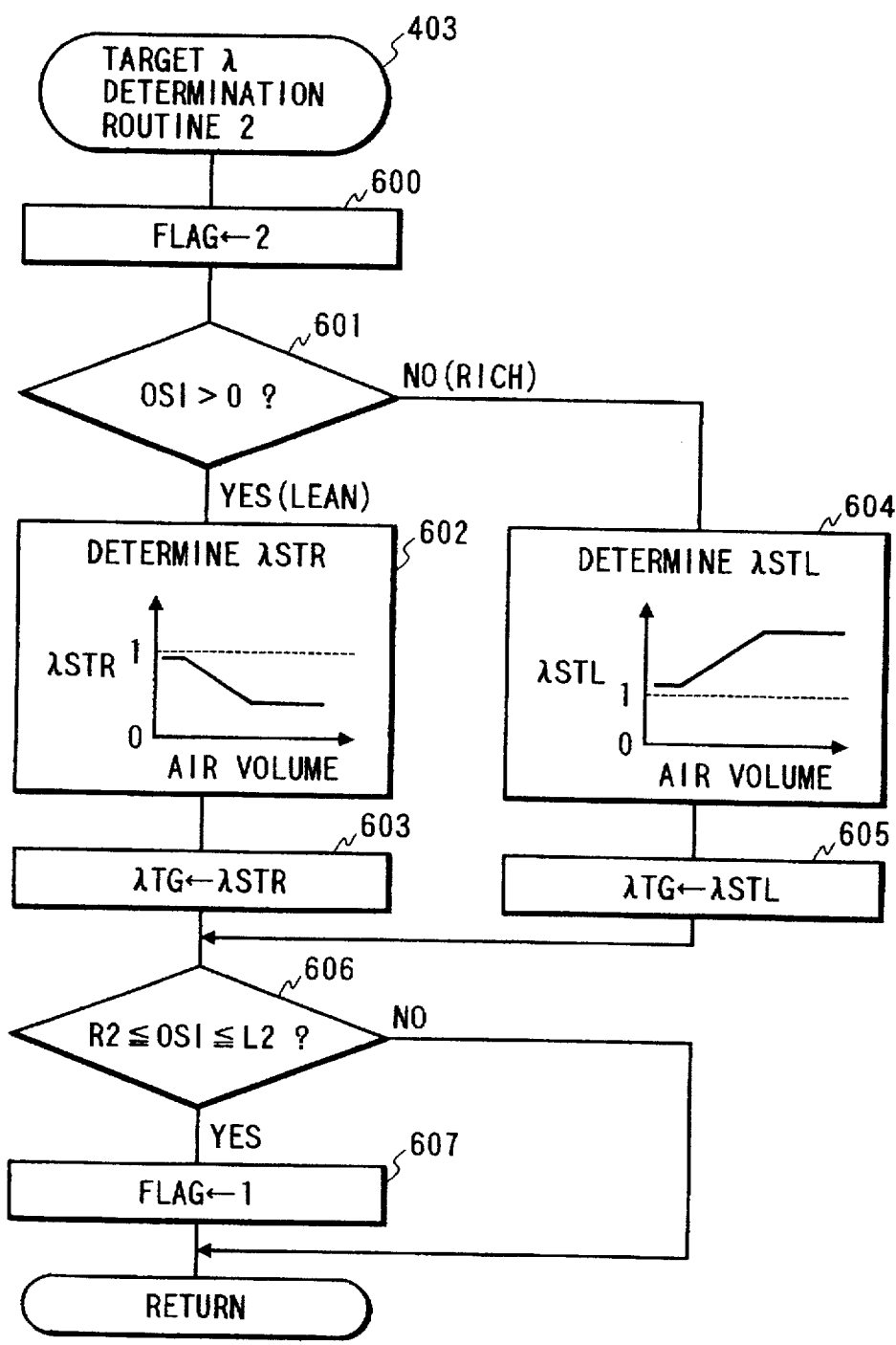
FIG. 24 is a flowchart of a program performed in step 403 of FIG. 20 for determining a target air-fuel ratio.

FIG. 24 shows a flowchart of the target λ determination routine 2 performed in step 403 of FIG. 20 when the sorbed substance amount OSI is out of the first range or when the target switch flag FLAG indicates a value other than one (1).

Figure 25A:
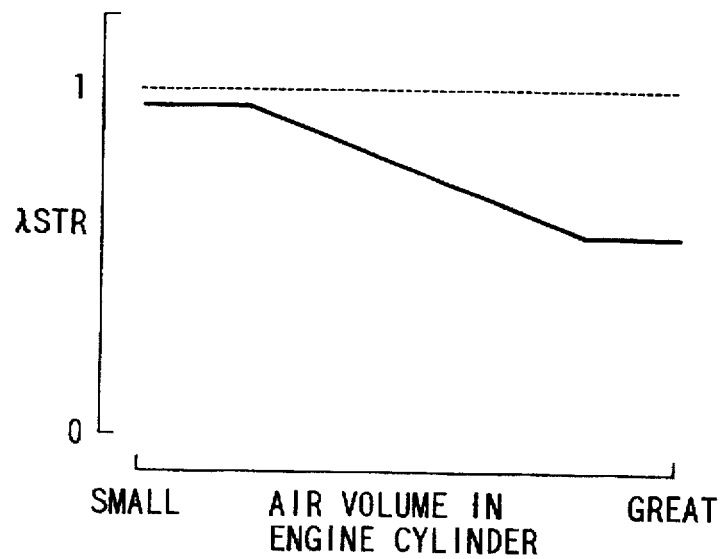
FIG. 25(a) is a graph which shows the relation between a rich skip amount for correcting a target air-fuel ratio and the amount of air in an engine cylinder.

First, in step 600, the target switch flag FLAG is set to two (2). The routine then proceeds to step 601 wherein it is determined whether the sorbed substance amount OSI is a positive value (OSI>0) or not. If a YES answer is obtained meaning that the inside of the catalytic converter 27 is in the lean condition, then the routine proceeds to step 602 wherein a value λSTR as the target λ is determined by look-up using a map, as shown in FIG. 25(a), based on an air volume in cylinders of the engine 11. The air volume in cylinders of the engine 11 may be determined in a known manner. For example, it may be determined by look-up using a given map based on the engine speed Ne and the pressure Pm in the intake pipe 12.

The routine then proceeds to step 603 wherein the value λSTR is set to the target λG. This allows gases containing rich components to flow into the catalytic converter 27 when the inside of the catalytic converter 27 is in the lean condition.

Figure 25B:
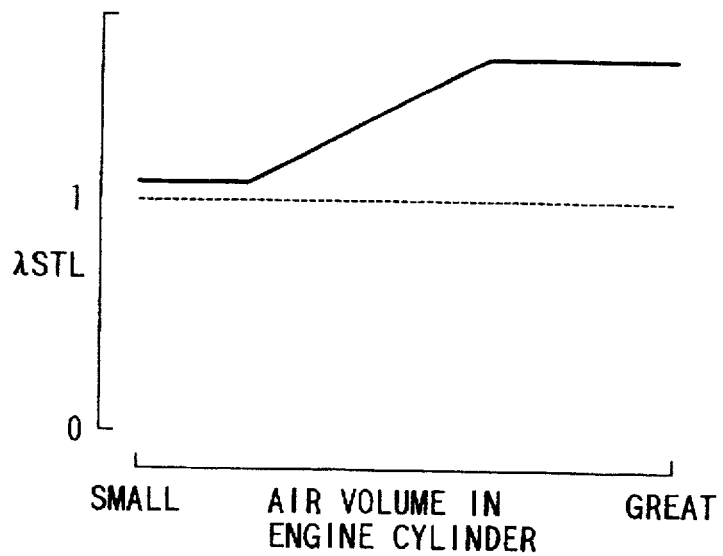
FIG. 25(b) is a graph which shows the relation between a leans skip amount for correcting a target air-fuel ratio and the amount of air in an engine cylinder.

If a NO answer is obtained (OSI≦0) in step 601 meaning that the inside of the catalytic converter 27 is in the rich condition, then the routine proceeds to step 604 wherein a value λSTL as the target λ is determined by look-up using a map, as shown in FIG. 25(b), based on an air volume in cylinders of the engine 11. The routine then proceeds to step 605 wherein the value λSTL is set to the target λTG. This allows gases containing lean components to flow into the catalytic converter 27 when the inside of the catalytic converter 27 is in the rich condition.

After step 603 or 605, the routine proceeds to step 606 wherein it is determined whether the sorbed substance amount OSI in the catalytic converter 27 lies within a second range (R2≦OSI≦L2) or not. The second range is defined for determining the timing with which the control returns to the target λ determination routine 1 from the target λ determination routine 2 and set narrower than the first range (R1 to L1) in step 400 of FIG. 22 so as to meet the relation of R1≦R2<0<L2≦L1. This provides the hysteresis upon switching between the target λ determination routine 1 and the target λ determination routine 2 for stability of the control. If a YES answer is obtained in step 606, then the routine proceeds to step 607 wherein the target switch flag FLAG is set to one (1) for performing the target λ determination routine 1 in a subsequent control cycle.

Figure 26A:
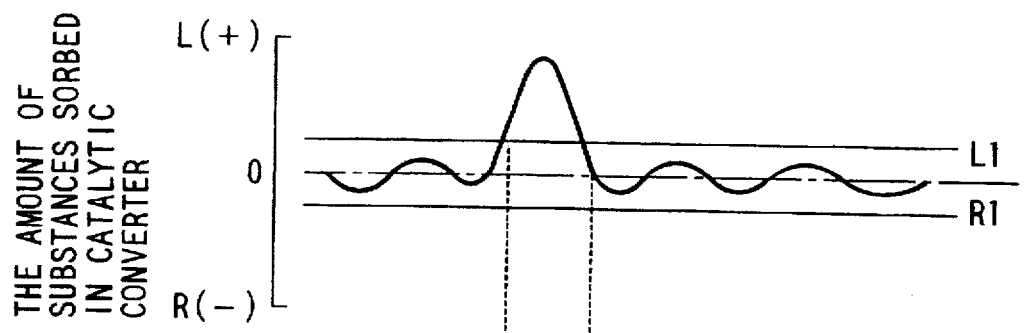
FIG. 26(a) is a time chart which shows variation in substances sorbed in a catalytic converter between rich and lean side.
Figure 26B:
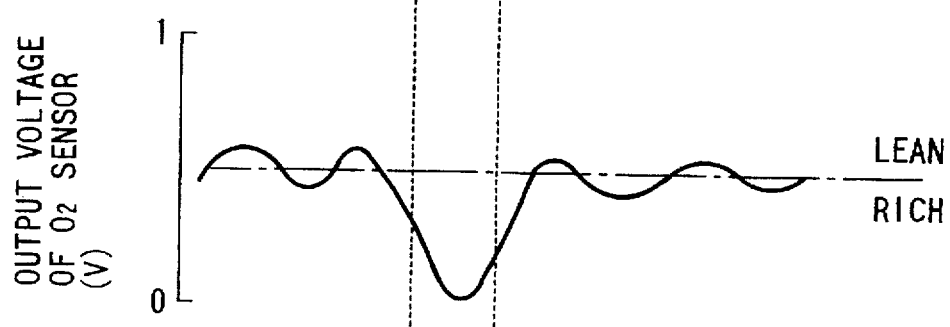
FIG. 26(b) is a time chart which shows variation in output from an oxygen sensor between rich and lean side.
Figure 26C:
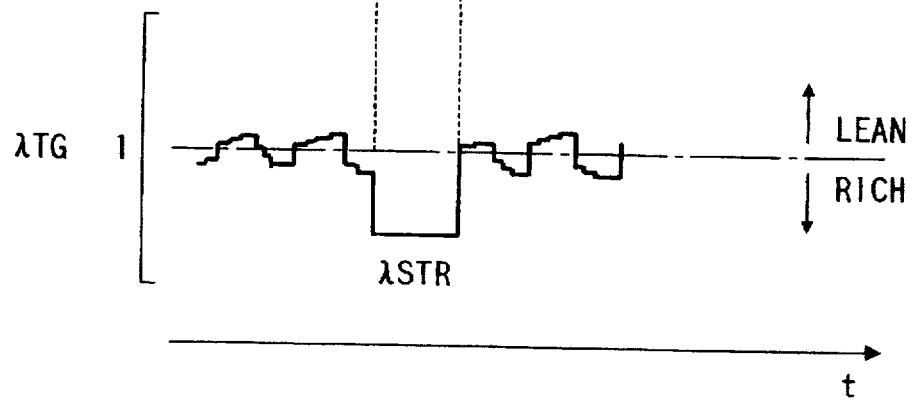
FIG. 26(c) is a time chart which shows variation in target air-fuel ratio between rich and lean side.

As can be seen from the above discussion, the determination of the target λTG based on the air volume in the cylinders of the engine 11 when the sorbed substance amount OSI in the catalytic converter 27 is out of the first range decreases the sorbed substance amount OSI quickly, as shown in FIGS. 26(a) to 26(c), thereby maintaining emission control capability well.

Estimate of Variation in Catalyst Capacity

Figure 27:
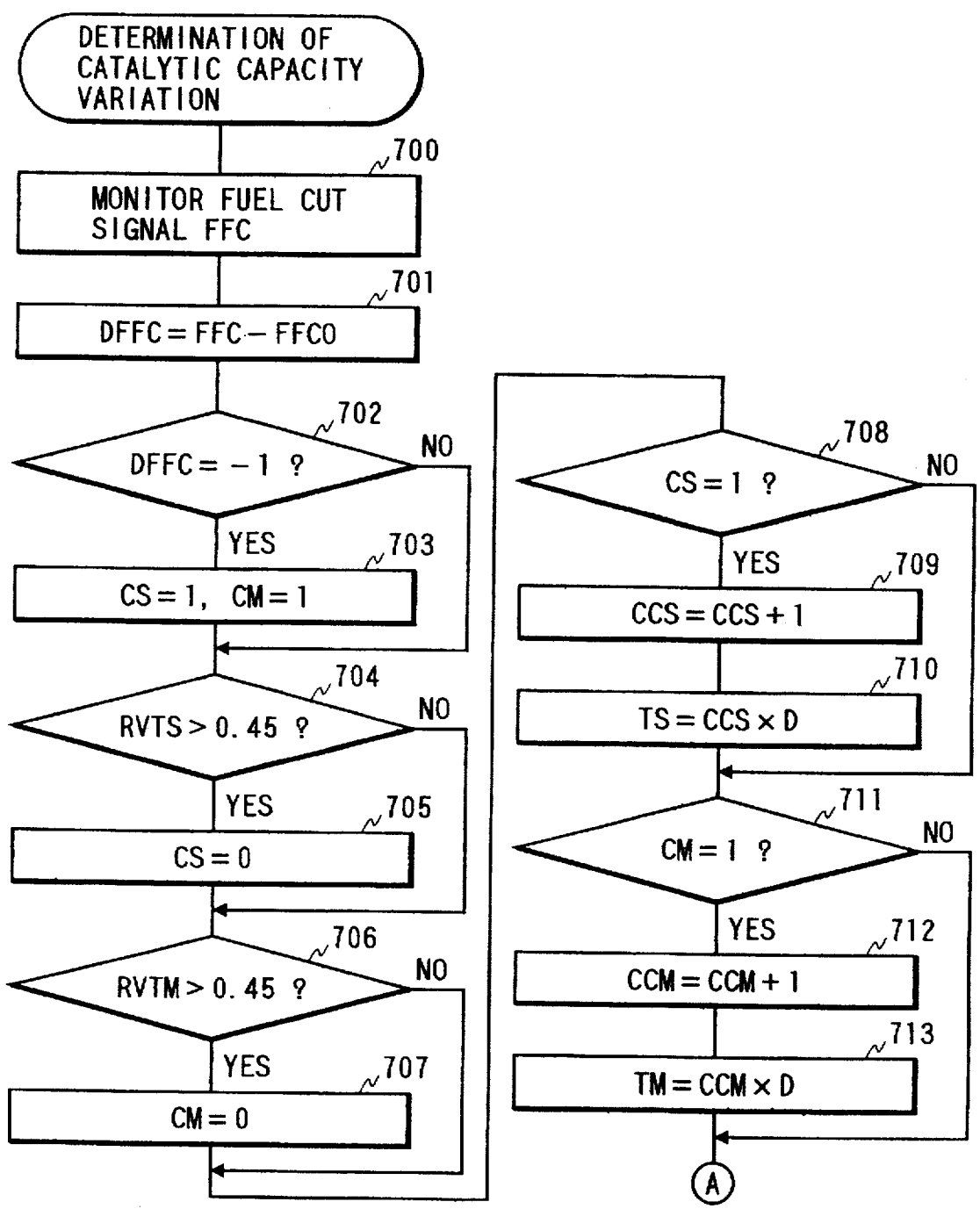
FIGS. 27 and 28 show a flowchart of a program for determining the capacity of a catalytic converter.
Figure 28:
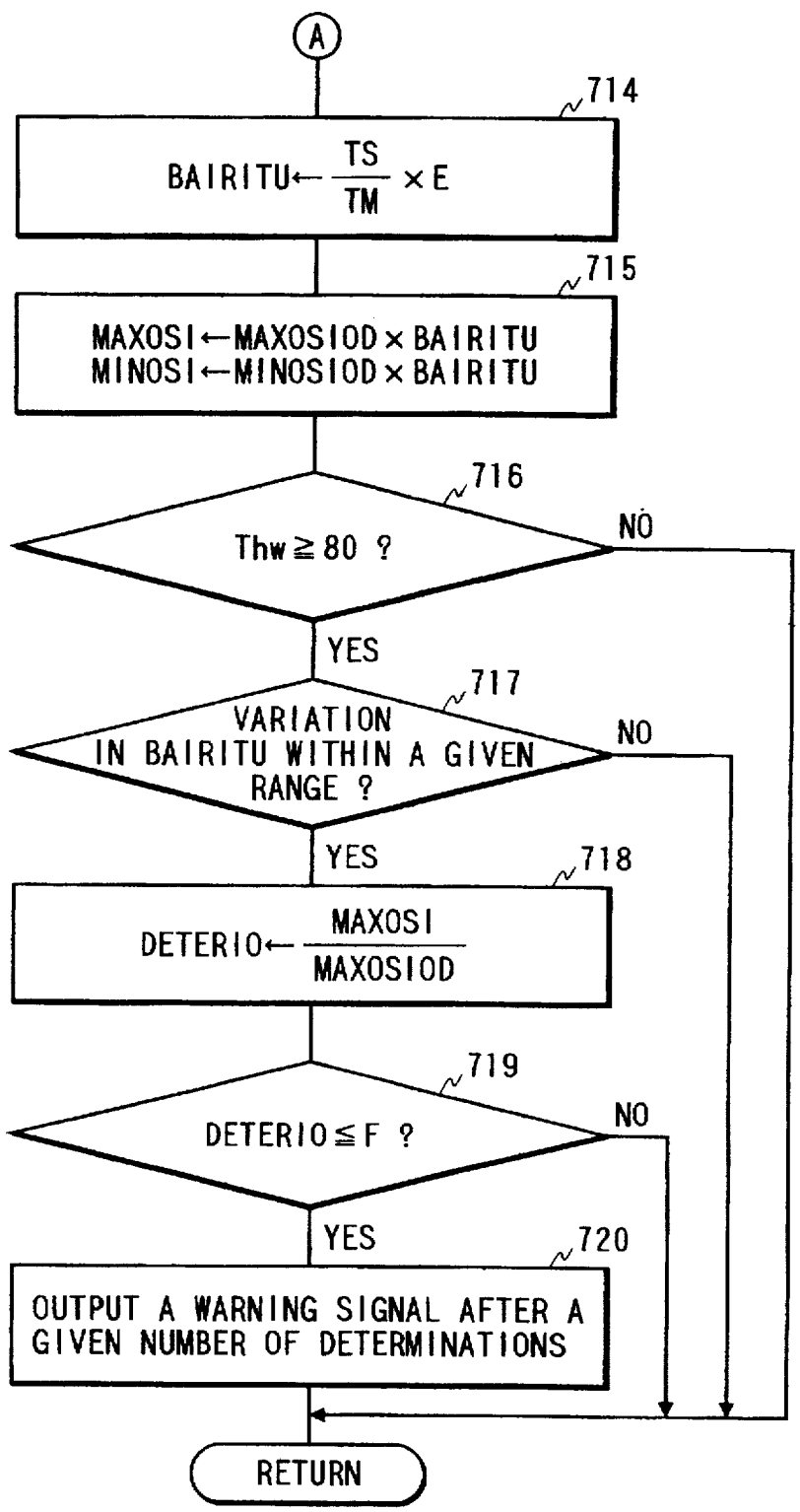

FIGS. 27 and 28 show a flowchart of a program for determining a variation in capacity of the catalytic converter 27 based on a ratio of time TS required for the output voltage estimate RVTM of the oxygen sensor 29 derived in step 320 of FIG. 14 to be reversed from the lean to rich condition to time TM required for an actual output RVTS of the oxygen sensor 29 to be switched from the lean to rich condition after the engine 11 undergoes a fuel cut (see FIGS. 29(a) to 29(f)).

First, in step 700, a fuel cut signal FFC is monitored. The routine then proceeds to step 701 wherein a difference DFFC between a current value FFC of a fuel cut flag and a last value FFCO of the fuel cur flag is determined. The routine then proceeds to step 702 wherein it is determined whether the difference DFFC is minus one (−1) or not for determining whether the fuel cut is completed or not. If a YES answer is obtained meaning that the fuel cut is completed, then the routine proceeds to step 703 wherein time count flags CS and CM are both set to one (1) indicating that the time is being counted. The routine then proceeds to step 704 wherein it is determined whether the actual output RVTS of the oxygen sensor 29 is greater than 0.45 (V) or not. If a YES answer is obtained meaning that the actual output RVTS has reached a reversal level, then the routine proceeds to step 705 wherein the time count flag CS is reset to zero (0).

The routine then proceeds to step 706 wherein it is determined whether the output voltage estimate RVTM of the oxygen sensor 29 derived in step 320 of FIG. 14 is greater than 0.45 (V) or not. If a YES answer is obtained meaning that the output voltage estimate RVTM has reached a reversal level, then the routine proceeds to step 707 wherein the time count flag CM is reset to zero (0). The routine then proceeds to step 708 wherein it is determined whether the time count flag CS is one (1) or not, that is, whether the time is being counted or not. If a YES answer is obtained, then the routine proceeds to step 709 wherein one is added to a time count value CCS to count the time TS required for the actual output RVTS to be reversed from the lean to rich condition after completion of the fuel cut. The routine then proceeds to step 710 wherein the time TS is determined by multiplying the time count value CCS by a constant D.

The routine then proceeds to step 711 wherein it is determined whether the time count flag CM is one (1) or not, that is, whether the time is being counted or not. If a YES answer is obtained, then the routine proceeds to step 712 wherein one is added to a time count value CCM to count the time TM required for the output voltage estimate RVTM to be reversed from the lean to rich condition after completion of the fuel cut. The routine then proceeds to step 713 wherein the time TM is determined by multiplying the time count value CCM by the constant D.

After step 713, the routine proceeds to step 714 in FIG. 28 wherein a capacity change rate BAIRITU of the catalytic converter 27 is determined according to the following relation.

$$BAIRITU = TS/TM \times E$$

where E is a constant.

The capacity change rate BAIRITU determined by the above equation represents a ratio of a current adsorption capacity to a maximum adsorption capacity of the catalytic converter 27.

Subsequently, the routine proceeds to step 715 wherein the maximum adsorption amount MAXOSI of the lean components is determined by multiplying a maximum adsorption amount MAXOSIOD by the capacity change rate BAIRITU, and the minimum adsorption amount MINOSI of the rich components is determined by multiplying a maximum adsorption amount MINOSIOD by the capacity change rate BAIRITU. The maximum adsorption amount MAXOSIOD is a maximum amount of lean components a new catalytic converter can adsorb after completion of warming up of engine operation, while the maximum adsorption amount MINOSIOD is a minimum amount of rich components a new catalytic converter can adsorb after completion of warming up of engine operation.

The routine then proceeds to step 716 wherein it is determined whether the coolant temperature Thw is greater than or equal to 80° C. or not, that is, whether the warming up of engine operation is completed or not. If a NO answer is obtained, then the routine terminates. Alternatively, if a YES answer is obtained, then the routine proceeds to step 717 wherein it is determined whether the capacity change rate BAIRITU falls within a given range or not. If a YES answer is obtained, then the routine proceeds to step 718 wherein a catalyst deterioration degree DETERIO is determined by the following relation.

$$DETERIO = MAXOSI/MAXOSIOD$$

The routine then proceeds to step 719 wherein it is determined whether the catalyst deterioration degree DETERIO is smaller than or equal to a deterioration criterion F or not. If a YES answer is obtained meaning that the catalytic converter 27 is deteriorated, then the routine proceeds to step 720 wherein the warning lamp 37 is turned on to inform a vehicle operator of the deterioration of the catalytic converter 27 after the condition of DETERIO≦F is met a given number of times.

Air-Fuel Ratio Control

Figure 30:
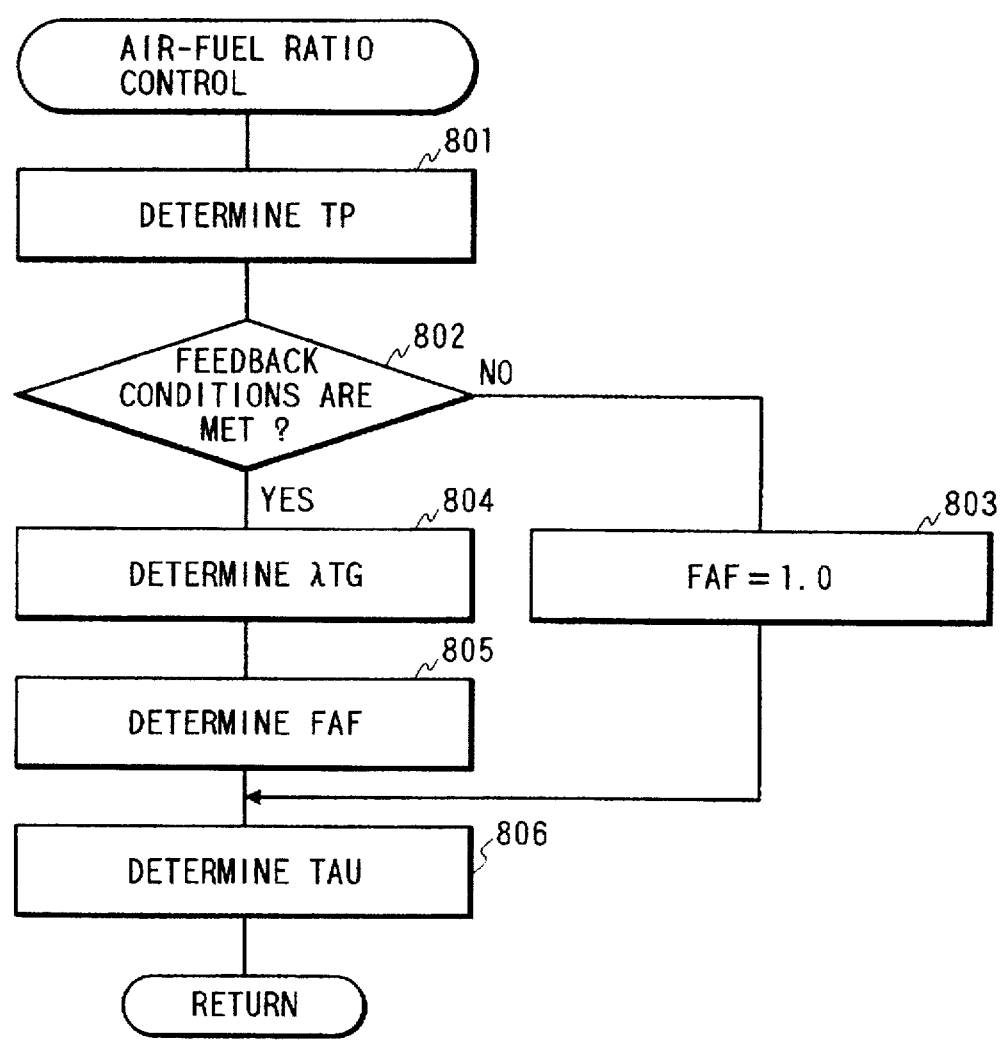
FIG. 30 is a flowchart of a program for air-fuel ratio control.
Figure 31A:
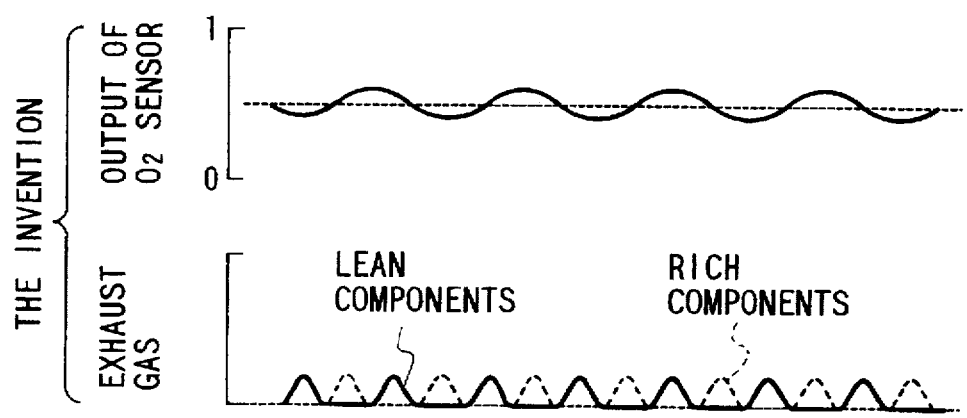
FIG. 31(a) is a time chart showing variations in output of an oxygen sensor and exhaust gas components in an air-fuel ratio control system of this invention.
Figure 31B:
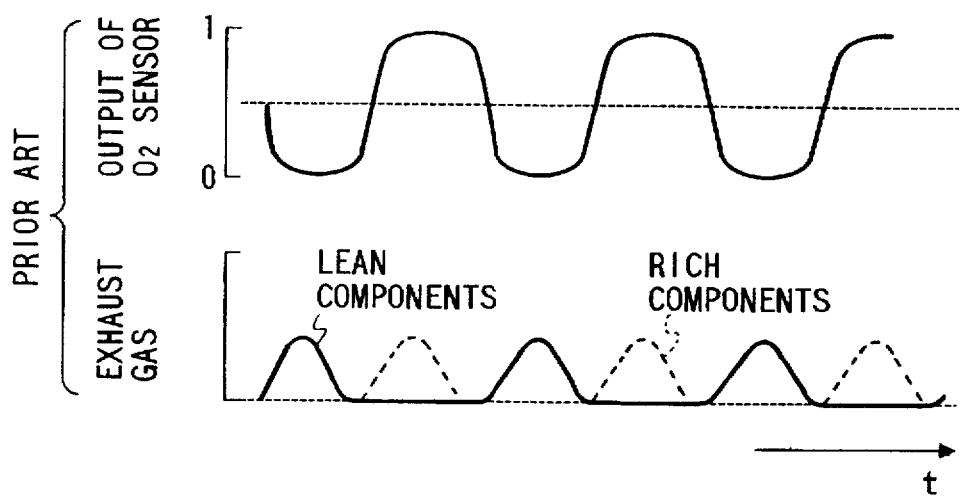
FIG. 31(b) is a time chart showing variations in output of an oxygen sensor and exhaust gas components in a conventional air-fuel ratio control system.

An air-fuel ratio is controlled to agree with the target λTG derived by the routine of FIG. 21 or 24 under air-fuel ratio control shown in FIG. 30.

First, in step 801, a basic fuel injection amount TP is determined based on engine operating parameters such as the intake pipe pressure PM and the engine speed Ne. The routine then proceeds to step 802 wherein air-fuel ratio feedback control conditions are met or not. The air-fuel ratio feedback conditions are that the coolant temperature Thw is greater than a given value and an engine operating condition is out of a high-speed high-load range. If a NO answer is obtained in step 802, then the routine proceeds to step 803 wherein an air-fuel ratio correction coefficient FAF is set to 1.0, and an open-loop control is performed.

If the air-fuel ratio feedback control conditions are all met, then the routine proceeds to step 804 wherein the target λTG is determined by the routine shown in FIG. 21 or 24. The routine then proceeds to step 805 wherein the air-fuel ratio correction coefficient FAF is determined using the target λTG. For example, the air-fuel ratio correction coefficient FAF is determined as follows:

$$FAF(i) = K_1 \lambda F(i) + K_2 \lambda F(i-1) + \ldots +$$

$$K_{11} FAF(i-1) + K_{12} FAF(i-2) + \ldots + ZI(i)$$

where $K_1, K_2, \ldots, K_{11}, K_{12}, \ldots,$ KI are given feedback gains, λF is an upstream air-fuel ratio, and ZI(i) is an integration term.

The routine then proceeds to step 806 wherein a fuel injection amount TAU is determined by the following equation.

$$TAU = TP \times FAF \times FALL$$

where FALL is a correction coefficient different from FAF.

Control Characteristic

FIGS. 32(a) and 32(b) are time charts showing the air-fuel ratio control of the present invention and conventional air-fuel ratio control, respectively. It will be appreciated that since, in the present invention, the target λ (i.e., a target air-fuel ratio) is determined so as to control the sorbed substance amount OSI estimated using the catalytic reaction model to fall within the given range, lean and rich components contained in exhaust gases are reduced greatly as compared with the conventional air-fuel ratio control, thereby improving emission control capability.

Figure 32:
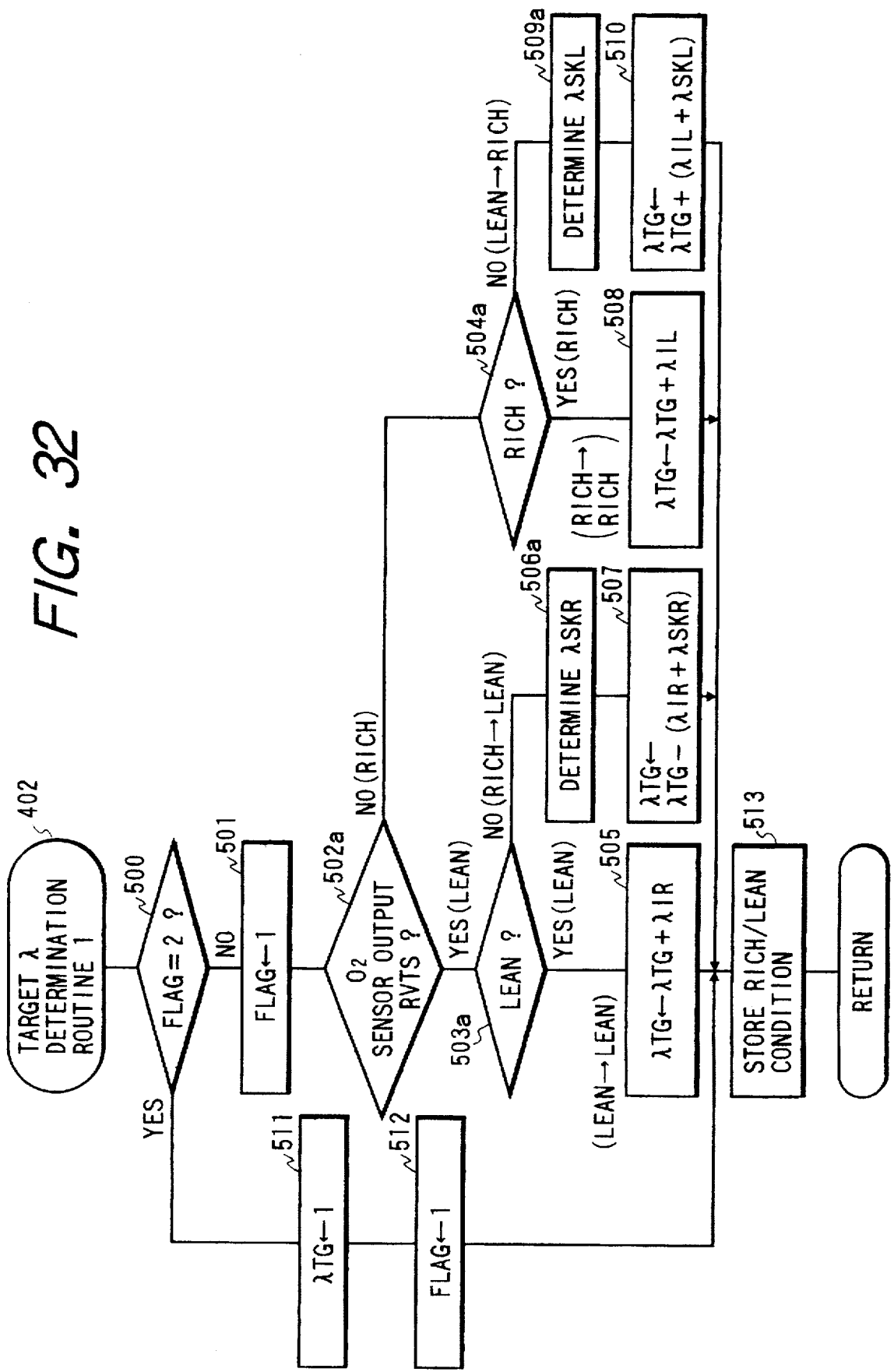
FIG. 32 is a flowchart of a program performed in step 402 in FIG. 20 for determining a target air-fuel ratio according to the second embodiment of the invention.
Figure 33A:
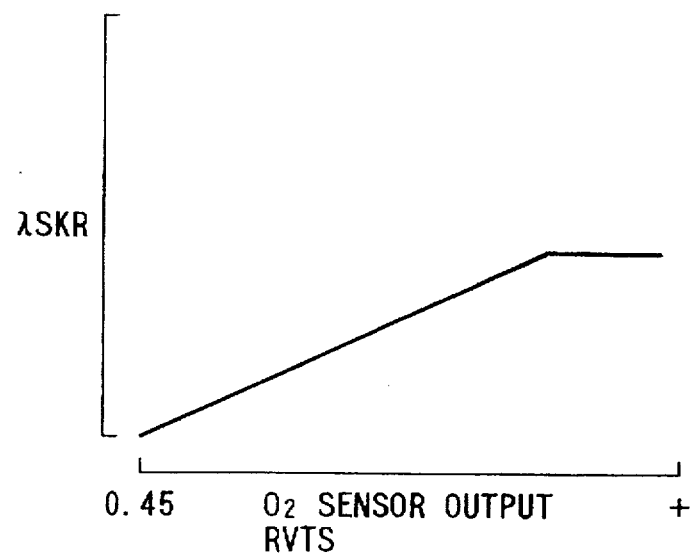
FIG. 33(a) is a graph which shows the relation between a rich skip amount for correcting a target air-fuel ratio and an output of an oxygen sensor.
Figure 33B:
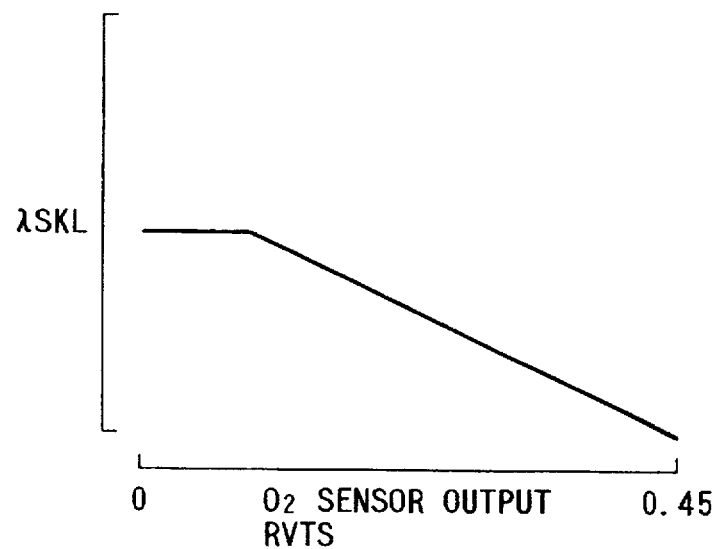
FIG. 33(b) is a graph which shows the relation between a leans skip amount for correcting a target air-fuel ratio and an output of an oxygen sensor.

FIGS. 32 and 33 show the second embodiment representing a modification of the target λ determination routine performed in step 402 of FIG. 20 which is different from that shown in FIG. 21 in steps 502a to 504a, 506a, and 509a. Other steps are identical, and explanation thereof in detail will be omitted here.

Specifically, it is determined through steps 502a to 504a whether the inside of the catalytic converter 27 is in the rich condition or the lean condition based on the output voltage RVTS of the oxygen sensor 29. In step 506a or 509a, the skip amount λSKR or λSKL for correcting the target λTG is determined by look-up using a map, as shown in FIG. 34(a) or 34(b), based on the output voltage RVTS of the oxygen sensor 29.

Figure 34:
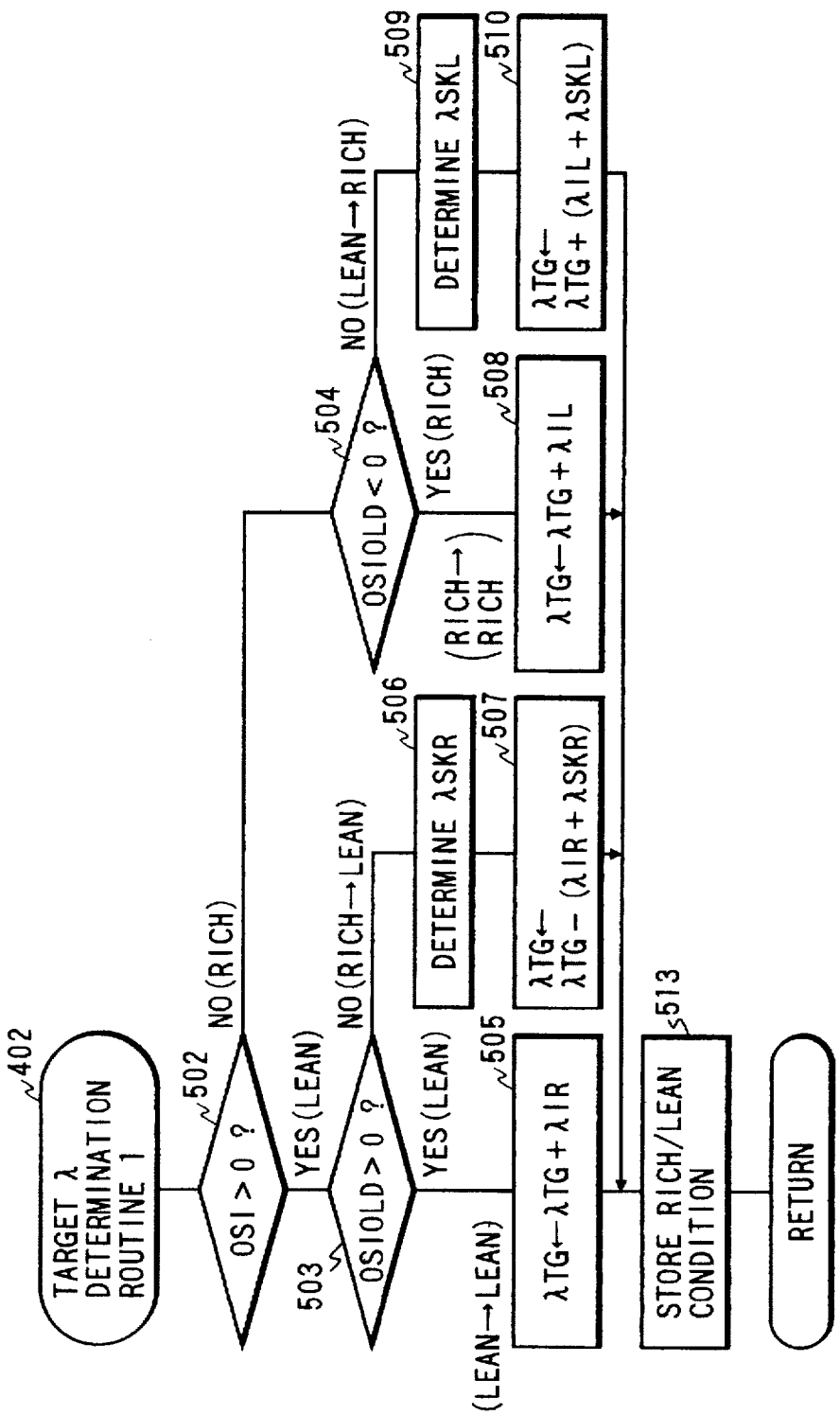
FIG. 34 is a flowchart of a program performed in step 402 in FIG. 20 for determining a target air-fuel ratio according to the third embodiment of the invention.
Figure 35:
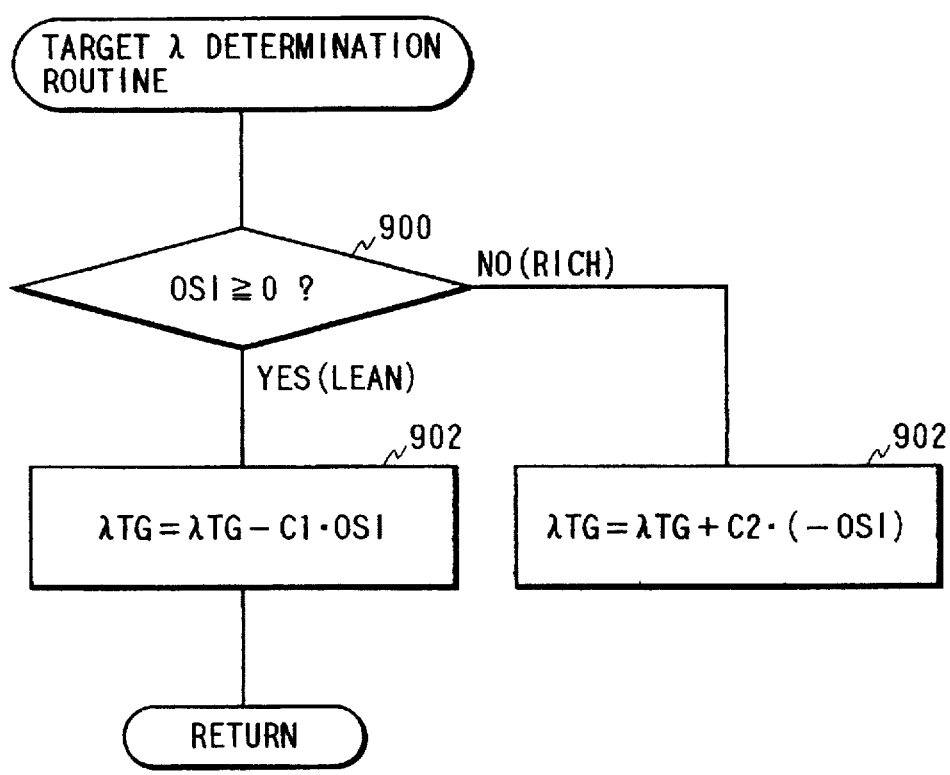
FIG. 35 is a flowchart of a program for determining a target air-fuel ratio of exhaust according to the fourth embodiment of the invention.

In the above first embodiment, as shown in FIGS. 20 and 21, when the sorbed substance amount OSI lies within the given range, the target air-fuel ratio λTG is determined according to the sorbed substance amount OSI, while when the sorbed substance amount OSI is out of the given range, the target air-fuel ratio λTG is determined according to the air volume of the engine cylinders, however, it may alternatively be determined according to the sorbed substance amount OSI in either case. This determination of the target air-fuel ratio λTG is shown in FIGS. 34 and 35 as third and fourth embodiments. In these embodiments, the catalyst condition routine in FIG. 20 needs not be performed.

The third embodiment, as shown in FIG. 34, omits steps 500, 501, 511, and 512 in FIG. 21 to determine the target air-fuel ratio λTG only based on the sorbed substance amount OSI. The same reference numbers as employed in FIG. 21 represent the same steps, and explanation thereof in detail will be omitted here.

The fourth embodiment, as shown in FIG. 35, first determines in step 900 whether the sorbed substance amount OSI is greater than or equal to zero (0) or not for determining whether the air-fuel ratio is on the rich side or the lean side. If a YES answer is obtained meaning that the air-fuel ratio is on the lean side, then the routine proceeds to step 901 wherein the target air-fuel ratio λTG is determined according to the following relation based on the sorbed substance amount OSI.

$$\lambda TG = \lambda TG - C1 \cdot OSI$$

If a NO answer is obtained in step 900 meaning that the air-fuel ratio is on the rich side, then the routine proceeds to step 902 wherein the target air-fuel ratio λTG is determined according to the following relation based on the sorbed substance amount OSI.

$$\lambda TG = \lambda TG + C2 \cdot (-OSI)$$

The above discussed embodiments use the oxygen sensor 29 disposed downstream of the catalytic converter 27 for the air-fuel ratio control, however, an air-fuel ratio (A/F) sensor may alternatively be used which functions as a linear A/F sensor designed to output a linear air-fuel ratio signal varying in level in proportion to an air-fuel ratio of exhaust gases when an operation voltage is applied thereto, while it functions as an oxygen sensor designed only to determine whether the air-fuel ratio of the exhaust gases is on the rich or lean side when the operation voltage is not applied thereto.

FIG. 36 to 43 show the fifth embodiment using the above air-fuel ratio sensor disposed downstream of the catalytic converter 27. In the following discussion, the air-fuel ratio sensor disposed downstream of the catalytic converter 27 will be referred to as a downstream air-fuel ratio sensor, and only portions different from the above first embodiment will be discussed below.

Determination of Gas Component Flowing into Downstream Air-Fuel Ratio Sensor

Figure 36:
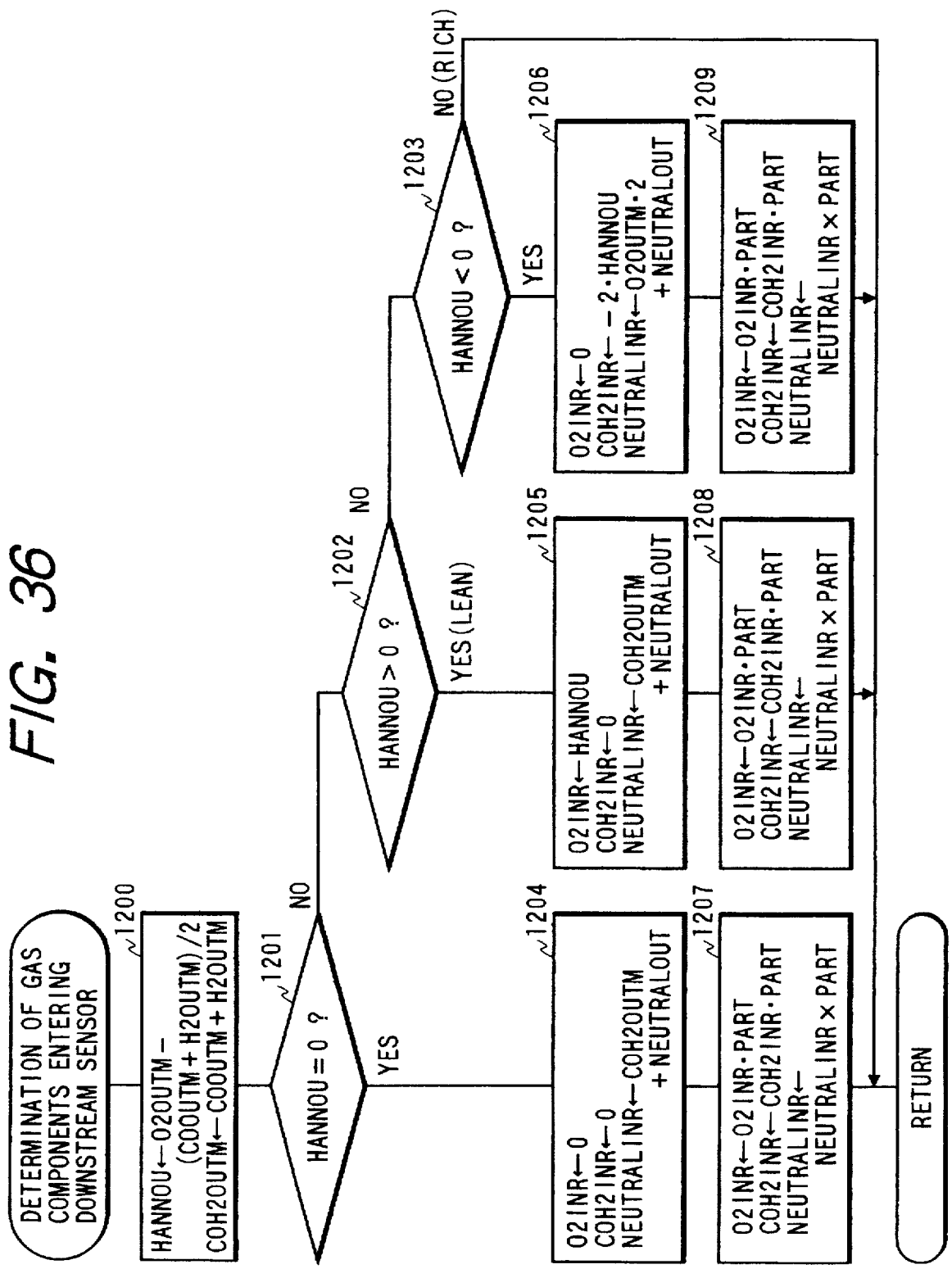
FIG. 36 is a flowchart of a program for determining gas components of exhaust gases entering an air-fuel ratio sensor disposed downstream of a catalytic converter according to the fifth embodiment.

FIG. 36 shows a flowchart of a program for determining gas components entering the downstream air-fuel ratio sensor.

First, in step 1200, the number of excess moles HANNOU of lean and rich components of exhaust gases entering the downstream air-fuel ratio sensor and the number of moles COH2OUTM of the rich components are determined for determining the balance between rich components and the lean components.

In steps 1201, 1202, and 1203, the balance between the rich and lean components of the gases flowing into the downstream air-fuel ratio sensor is determined based on the number of excess moles HANNOU. If a YES answer is obtained in step 1201 (HANNOU=0) meaning that the rich components balance with the lean components, then the routine proceeds to step 1204 and 1207 wherein the number of moles NEUTRALINR of neutral gas components is determined. If a YES answer is obtained in step 1202 (NANNOU>0) meaning that the lean components are in excess of the rich components, then the routine proceeds to step 1205 and 1208 wherein the number of moles O2INR of O$_2$ and the number of moles NEUTRALINER of the neutral gas components are determined. If a YES answer is obtained in step 1203 (NANNOU<0) meaning that the rich components are in excess of the lean components, then the routine proceeds to step 1206 and 1209 wherein the number of moles COH2INR of the rich components and the number of moles NEUTRALINER of the neutral gas components are determined. Note that PART used in step 1207 to 1209 is a constant indicating a ratio of gases flowing out of the catalytic converter 27 to gases entering the downstream air-fuel ratio sensor.

Estimate of Output of Downstream Air-Fuel Ratio Sensor

The first embodiment estimates an output of the oxygen sensor 29 disposed downstream of the catalytic converter 27 using the sensor reaction model similar in principle to the catalytic reaction model. The fifth embodiment, however, corrects through a first-order lag system the amount of gas components flowing downstream of the catalytic converter 27 determined using the catalytic reaction model for estimating an output of the downstream air-fuel ratio sensor. This is based on the fact that the output of the downstream air-fuel ratio sensor is changed according to a variation in the amount of gas components flowing downstream of the catalytic converter 27, and a variation in output of the downstream air-fuel ratio sensor caused by the variation in the amount of gas components may be approximated to the first-order lag system.

FIG. 36 shows a flowchart of a program for estimating an output of the downstream air-fuel ratio sensor.

First, in step 1300, it is determined whether the number of moles O2INR of O$_2$ derived in step 1208 of FIG. 36 is greater than zero (0) or not for determining whether gases entering the downstream air-fuel ratio sensor are on the rich or lean side. If a YES answer is obtained meaning that the incoming gases are on the lean side, then the routine proceeds to step 1301 wherein the concentration of lean components of the incoming gases is determined according to the following relation.

Lean component concentration=$O2INR/(NEUTRALINR+O2INR)$ where NEUTRALINR is the number of moles of neutral gas components derived in step 1208 of FIG. 36.

Figure 38A:
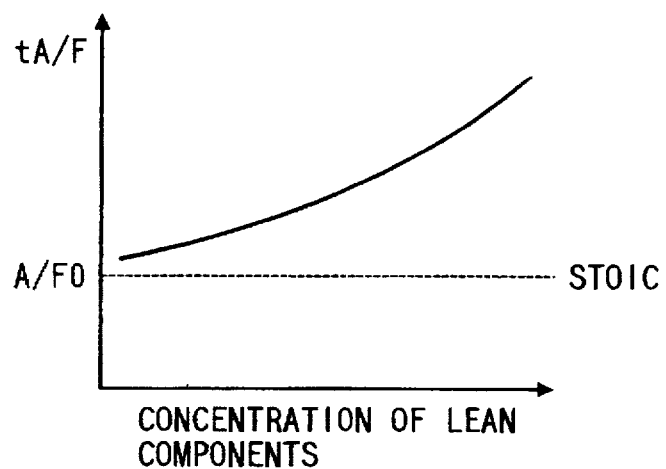
FIG. 38(a) is a map showing the relation between an air-fuel ration of exhaust gases and the concentration of lean components of the exhaust gases entering an air-fuel ratio sensor disposed downstream of a catalytic converter.

The routine then proceeds to step 1302 wherein an air-fuel ratio table value tA/F is determined by look-up using a map, as shown in FIG. 38(a), based on the concentration of the lean components derived in step 1301.

The routine then proceeds to step 1303 wherein the air-fuel ratio table value tA/F is corrected by the first-order lag system I to determine an output estimate RA/FM of the downstream air-fuel ratio sensor. The first-order lag system I may be given by either of the following relations (1) and (2).

$$RA/FM = tA/F \cdot (1 - e^{-ktimeL}) \quad (1)$$

$$RA/FM = tA/F \cdot (1 - knamasiL) + RA/FA \text{ derived one program cycle earlier} \cdot knamasiL \quad (2)$$

where ktimeL is a time constant of the first-order lag system I, and knamasiL is a blunt coefficient when the gasses entering the downstream air-fuel ratio sensor are on the lean side. The equation (2) is usually called "a blunt operation" which includes a factor of the first-order lag and derives substantially the same results as those of the equation (1).

If a NO answer is obtained (O2INR≦0) in step 1300, then the routine proceeds to step 1304 wherein it is determined whether the number of moles COH2INR of the rich components entering the downstream air-fuel ratio sensor derived in step 1209 of FIG. 36 is greater than zero (0) or not for determining whether the gases entering the downstream air-fuel ratio sensor are on the rich or lean side. If a YES answer is obtained meaning that the incoming gasses are on the rich side, then the routine proceeds to step 1305 wherein the concentration of rich components of the incoming gases is determined according to the following relation.

Rich component concentration=$COH2INR/(NEUTRALINR+COH2INR)$ where NEUTRALINR is the number of moles of neutral gas components derived in step 1209 of FIG. 36.

Figure 38B:
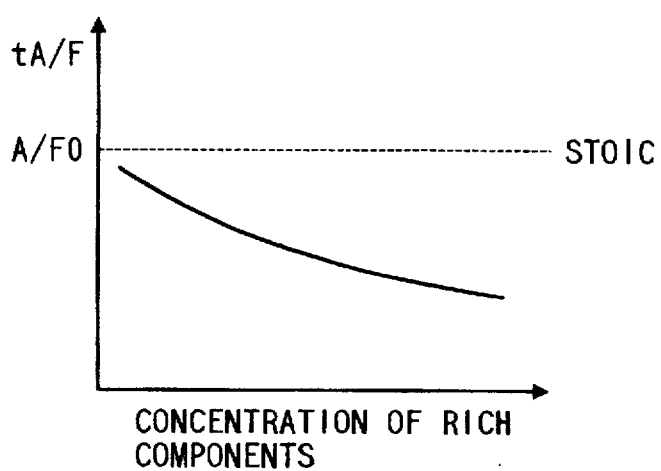
FIG. 38(b) is a map showing the relation between an air-fuel ration of exhaust gases and the concentration of rich components of the exhaust gases entering an air-fuel ratio sensor disposed downstream of a catalytic converter.

The routine then proceeds to step 1306 wherein an air-fuel ratio table value tA/F is determined by look-up using a map, as shown in FIG. 38(b), based on the concentration of the rich components derived in step 1305.

The routine then proceeds to step 1307 wherein the air-fuel ratio table value tA/F is corrected by the first-order lag system II to determine the output estimate RA/FM of the downstream air-fuel ratio sensor. The first-order lag system II may be given by either of the following relations (3) and (4).

$$RA/FM = tA/F \cdot (1 - e^{-ktimeR}) \quad (3)$$

$$RA/FM = tA/F \cdot (1 - knamasiR) + RA/FA \text{ derived one program cycle earlier} \cdot knamasiR \quad (4)$$

where ktimeR is a time constant of the first-order lag system II, and knamasiR is a blunt coefficient when the gasses entering the downstream air-fuel ratio sensor are on the rich side.

If NO answers are obtained both in steps 1300 and 1304 meaning that the incoming gases are neither on the rich side nor on the lean side, that is, they indicate a stoichiometric air-fuel ratio, then the routine proceeds to step 1308 wherein the output estimate RA/FM is set as a target air-fuel ratio A/FO. The routine then proceeds to step 1309 wherein the target air-fuel ratio A/FO is corrected by the first-order lag system III to update the output estimate RA/FM of the downstream air-fuel ratio sensor. The first-order lag system III may be given by either of the following relations (5) and (6).

$$RA/FM = A/FO \cdot (1 - e^{-ktimeN}) \quad (5)$$

$$RA/FM = A/FO \cdot (1 - knamasiN) + RA/FA \text{ derived one program cycle earlier} \cdot knamasiN \quad (6)$$

where ktimeR is a time constant of the first-order lag system III, and knamasiN is a blunt coefficient when the gasses entering the downstream air-fuel ratio sensor indicate the stoichiometric air-fuel ratio.

As can be seen from the above, switching of the time constant of the first-order lag system according to the amount of gas components entering the downstream air-fuel ratio sensor improves the accuracy in estimating the output of the downstream air-fuel ratio sensor.

Estimate of Variation in Catalyst Capacity

Figure 39:
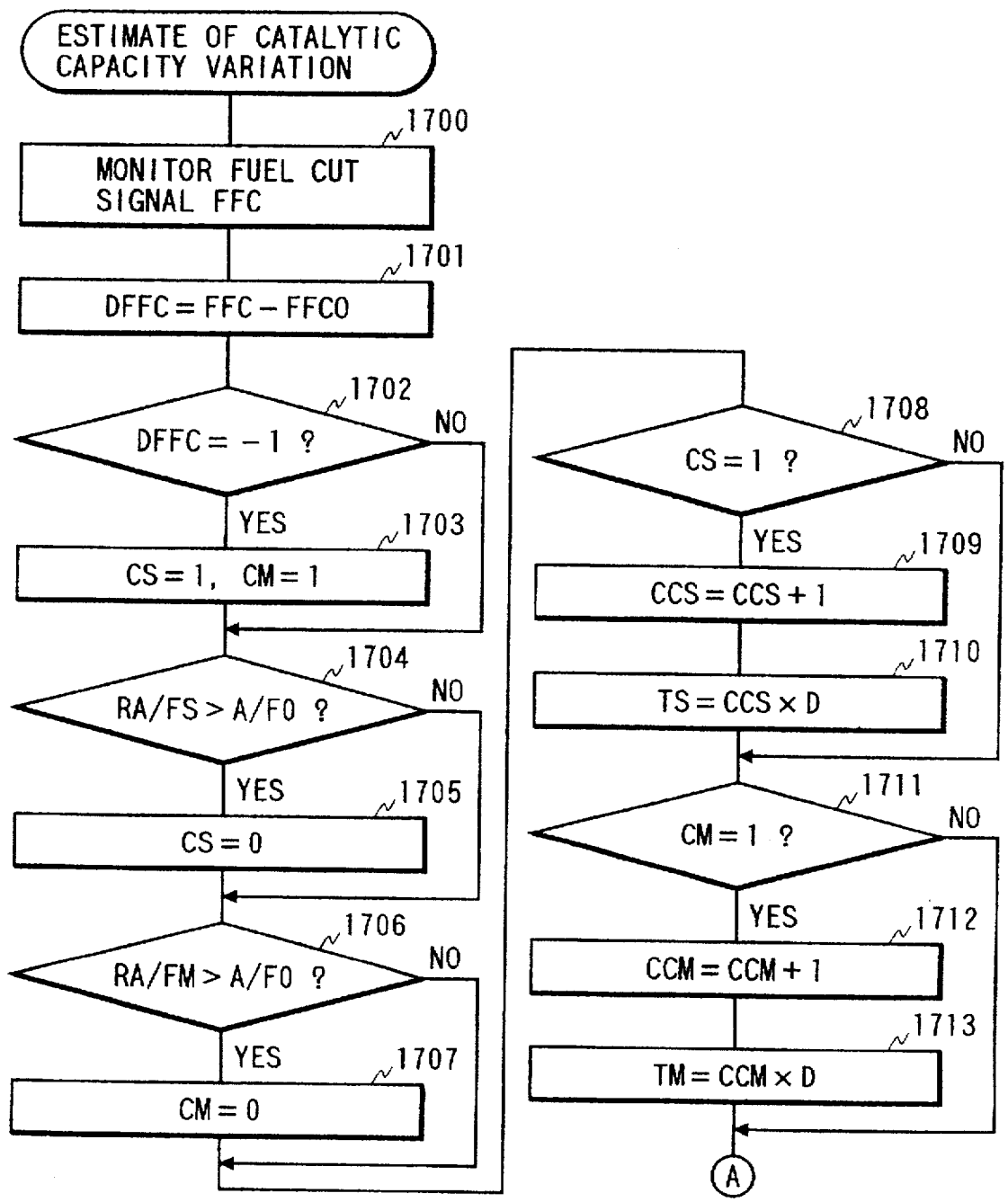
FIGS. 39 and 40 show a flowchart of a program for determining a variation in capacity of a catalytic converter.
Figure 40:
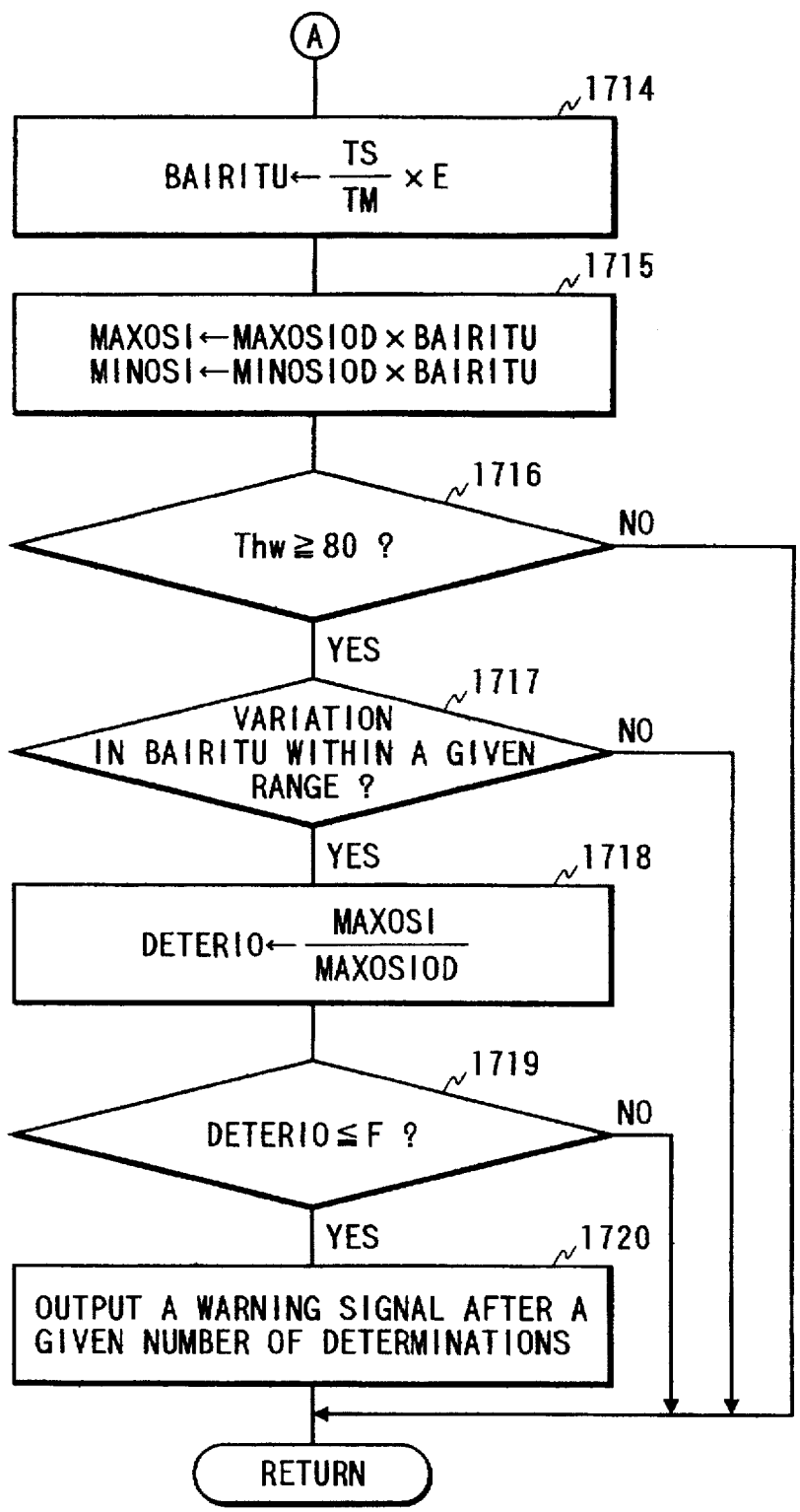

FIGS. 39 and 40 show a flowchart of a program for determining a variation in capacity and a maximum adsorption capacity of the catalytic converter 27 based on a ratio of a time TS required for the output estimate RA/FM of the downstream air-fuel ratio sensor derived in step 1303 of FIG. 37 to reach the target air-fuel ratio A/FO from the lean condition to a time TM required for an actual output RA/FS of the downstream air-fuel ratio sensor to reach the target air-fuel ratio AIFO from the lean condition after the engine 11 undergoes a fuel cut. This program is substantially identical with the one shown in FIGS. 27 and 28 in the first embodiment.

First, in step 1700, a fuel cut signal (i.e., a value FFC of a fuel cut flag) is monitored. The routine then proceeds to step 1701 wherein a difference DFFC between a current value FFC of the fuel cut flag and a last value FFCO thereof is determined. The routine then proceeds to step 1702 wherein it is determined whether the difference DFFC is minus one (−1) or not for determining whether the fuel cut is completed or not. If a YES answer is obtained meaning that the fuel cut is completed, then the routine proceeds to step 1703 wherein time count flags CS and CM are both set to one (1) indicating that the time is being counted. The routine then proceeds to step 1704 wherein it is determined whether the actual output RA/FS of the downstream air-fuel ratio sensor is greater than the target air-fuel ratio A/FO or not. If a YES answer is obtained meaning that the actual output RA/FS is on the rich side, then the routine proceeds to step 1705 wherein the time count flag CS is reset to zero (0).

The routine then proceeds to step 1706 wherein it is determined whether the output estimate RA/FS of the downstream air-fuel ratio sensor derived in step 1303 of FIG. 37 is greater than the target air-fuel ratio A/FO or not. If a YES answer is obtained meaning that the output estimate RA/FS is on the rich side, then the routine proceeds to step 1707 wherein the time count flag CM is reset to zero (0). The routine then proceeds to step 1708 wherein it is determined whether the time count flag CS is one (1) or not, that is, whether the time is being counted or not. If a YES answer is obtained, then the routine proceeds to step 1709 wherein one is added to a time count value CCS to count the time TS required for the actual output RA/FS to reach the target air-fuel ratio A/FO from the lean condition after completion of the fuel cut.

The routine then proceeds to step 1710 wherein the time TS is determined by multiplying the time count value CCS by a constant D.

The routine then proceeds to step 1711 wherein it is determined whether the time count flag CM is one (1) or not, that is, whether the time is being counted or not. If a YES answer is obtained, then the routine proceeds to step 1712 wherein one is added to a time count value CCM to count the time TM required for the output estimate RA/FM to reach the target air-fuel ratio A/FO from the lean condition after completion of the fuel cut. The routine then proceeds to step 1713 wherein the time TM is determined by multiplying the time count value CCM by the constant D.

After step 1713, the routine proceeds to step 1714 in FIG. 40 wherein a capacity change rate BAIRITU of the catalytic converter 27 is determined according to the following relation.

$$BAIRITU = TS/TM \times E$$

where E is a constant.

The capacity change rate BAIRITU determined by the above equation represents a ratio of a current adsorption capacity to a maximum adsorption capacity of the catalytic converter 27.

Subsequently, the routine proceeds to step 1715 wherein the maximum adsorption amount MAXOSI of the lean components is determined by multiplying a maximum adsorption amount MAXOSIOD by the capacity change rate BAIRITU, and the maximum adsorption amount MINOSI of the rich components is determined by multiplying a maximum adsorption amount MINOSIOD by the capacity change rate BAIRITU. The maximum adsorption amount MAXOSIOD is a maximum amount of lean components a new catalytic converter can adsorb after completion of warming up of engine operation, while the maximum adsorption amount MINOSIOD is a minimum amount of rich components a new catalytic converter can adsorb after completion of warming up of engine operation.

The routine then proceeds to step 1716 wherein it is determined whether the coolant temperature Thw is greater than or equal to 80° C. or not, that is, whether the warming up of engine operation is completed or not. If a NO answer is obtained, then the routine terminates. Alternatively, if a YES answer is obtained, then the routine proceeds to step 1717 wherein it is determined whether the capacity change rate BAIRITU falls within a given range or not. If a YES answer is obtained, then the routine proceeds to step 1718 wherein a catalyst deterioration degree DETERIO is determined by the following relation.

$$DETERIO = MAXOSI/MAXOSIOD$$

The routine then proceeds to step 1719 wherein it is determined whether the catalyst deterioration degree DETERIO is smaller than or equal to a deterioration criterion F or not. If a YES answer is obtained meaning that the catalytic converter 27 is deteriorated, then the routine proceeds to step 1720 wherein the warning lamp 37 is turned on to inform a vehicle operator of the deterioration of the catalytic converter 27 after the condition of DETERIO $\leq$ F is met a given number of times.

Correction of Catalytic Reaction Model Parameters

Figure 41:
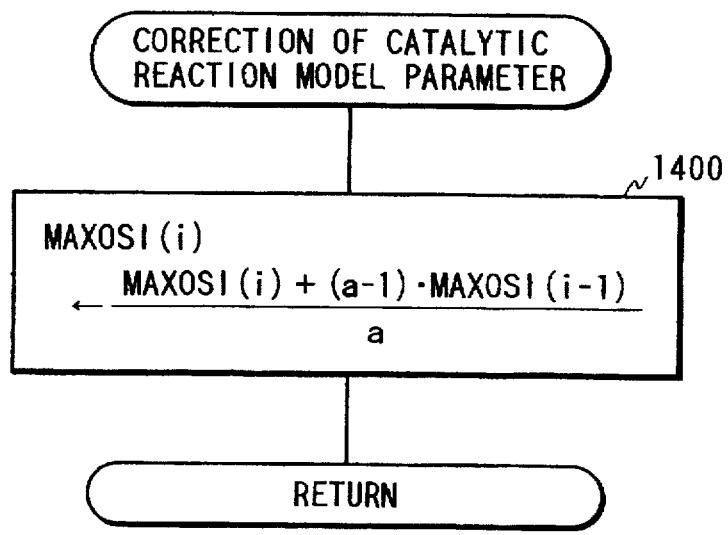
FIG. 41 is a flowchart of a program for correcting a parameter indicating a maximum amount of lean components of exhaust gases a catalytic converter can adsorb.
Figure 42:
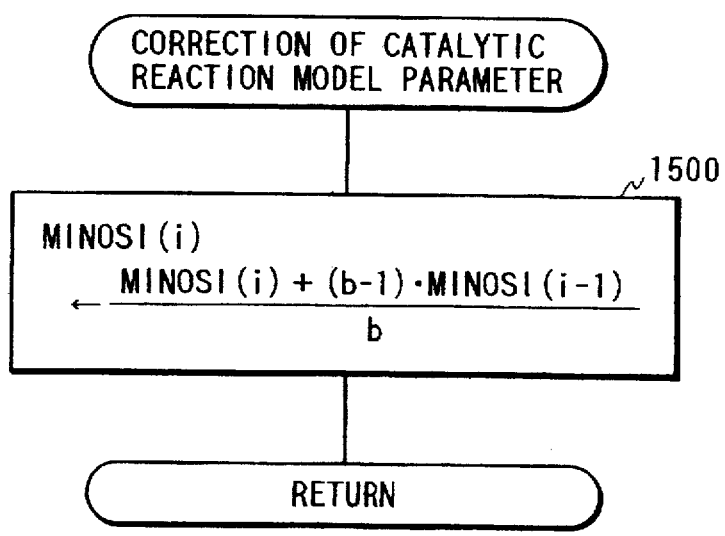
FIG. 42 is a flowchart of a program for correcting a parameter indicating a maximum amount of rich components of exhaust gases a catalytic converter can adsorb.

FIGS. 41 and 42 show flowcharts of programs for correcting parameters: the maximum adsorption amounts MAXOSI and MINOSI used in the catalytic reaction model. The program in FIG. 41 corrects the maximum adsorption amount MAXOSI of the lean components derived in step 1715 of FIG. 40 using the following equation in a blunt operation (step 1400).

$$MAXOSI(i) = \{MAXOSI(i) + (a-1) \cdot MAXOSI(i-1)\}/a$$

where a is a blunt coefficient, (i) indicates a value in this program cycle, and (i−1) indicates a value derived one program cycle before.

The maximum adsorption amount MAXOSI corrected by the above equation is used in the guard processing as shown in FIG. 8.

The program in FIG. 42 corrects the maximum adsorption amount MINOSI of the rich components derived in step 1715 of FIG. 40 using the following equation in a blunt operation (step 1500).

$$MINOSI(i) = \{MINOSI(i) + (b-1) \cdot MINOSI(i-1)\}/b$$

where b is a blunt coefficient.

The maximum adsorption amount MINOSI corrected by the above equation is used in the guard processing as shown in FIG. 11.

Air-Fuel Ratio Control

Figure 43:
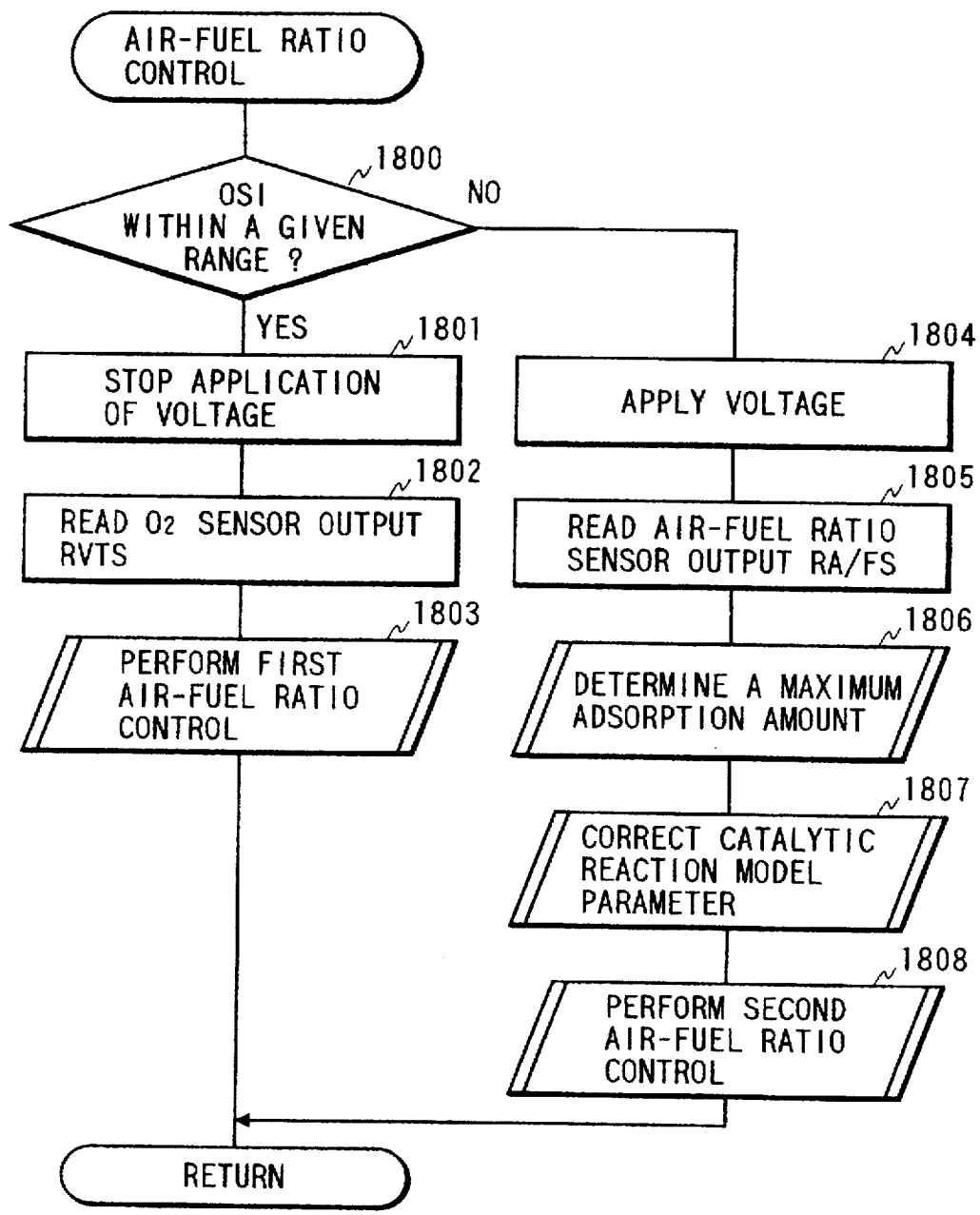
FIG. 43 is a flowchart of a program for controlling an air-fuel ratio of a mixture supplied to an engine.

FIG. 43 shows a flowchart of a program for air-fuel ratio control achieved by turning on and off the downstream air-fuel ratio sensor depending upon whether the sorbed substance amount OSI of the catalytic converter 27 determined using the catalytic reaction model falls within a given range or not.

First, in step 1800, it is determined whether the sorbed substance amount OSI lies within a given range or not. If a YES answer is obtained, then the routine proceeds to step 1801 wherein an operation voltage applied to the downstream air-fuel ratio sensor is stopped to have the downstream air-fuel ratio sensor function as an oxygen sensor which outputs a sensor signal reversed in level upon rich-lean reversal of an air-fuel ratio of exhaust gases. This is because a difference between an air-fuel ratio of exhaust gases flowing downstream of the catalytic converter 27 and a target air-fuel ratio is relatively small when the sorbed substance amount OSI lies within the given range, so that a variation in output of the oxygen sensor becomes greater than that of the air-fuel ratio sensor, resulting in ease of air-fuel ratio detection.

The routine then proceeds to step 1802 wherein the output RVTS of the downstream air-fuel ratio sensor functioning as the oxygen sensor is monitored. The routine then proceeds to step 1803 wherein first air-fuel ratio control is performed based on the output RVTS of the oxygen sensor. For example, the first air-fuel ratio control may be performed using the target $\lambda$TG which is, as shown in FIG. 32, determined based on the output RVTS of the oxygen sensor or which is, as shown in FIG. 21 or 34, determined based on the sorbed substance amount OSI estimated by the catalytic reaction models.

If a NO answer is obtained in step 1800 meaning that the sorbed substance amount OSI is out of the given range, in other words, a difference between an air-fuel ratio of exhaust gases downstream of the catalytic converter 27 and the target air-fuel ratio is relatively great, then the routine proceeds to step 1804 wherein the operation voltage is applied to the downstream air-fuel ratio sensor to have the downstream air-fuel ratio sensor function as a linear A/F sensor which outputs a linear air-fuel ratio signal in proportion to an air-fuel ratio of exhaust gases flowing downstream of the catalytic converter 27. This is because the output of the linear A/F sensor is suitable for achieving a high-accuracy detection of the air-fuel ratio of exhaust gases flowing downstream of the catalytic converter 27 when the difference between the air-fuel ratio of the exhaust gases and the target air-fuel ratio is relatively great.

The routine then proceeds to step 1805 wherein the output RA/FS of the downstream air-fuel ratio sensor is monitored. The routine then proceeds to step 1806 wherein the maximum adsorption amounts MAXOSI and MINOSI of the catalytic converter 27 are determined according to the routine, as shown in FIGS. 38 and 40. The routine then proceeds to step 1807 wherein the catalytic reaction model parameter correction is performed according to the routines, as shown in FIGS. 41 and 42, to correct the maximum adsorption amounts MAXOSI and MINOSI. The routine then proceeds to step 1808 wherein second air-fuel ratio is performed using, for example, the target $\lambda$TG determined based on the air volume in cylinders of the engine 11.

The air-fuel ratio control according to the sixth embodiment will be discussed below which uses the modem control theory to establish a model for the whole of a controlled object performing feedback control to converge an air-fuel ratio of exhaust gases flowing downstream of the catalytic converter 27 (hereinafter, referred to as a downstream air-fuel ratio $\lambda$R) and the stoichiometric air-fuel ratio $\lambda=1$. Procedures for defining elements in the modern control are as follows:

Modeling of a controlled Object

A controlled object ranging from the fuel injectors 20 to the sensor 29 is modeled. The sensor 29 used in this embodiment is an air-fuel ratio sensor (hereinafter, referred to as the downstream air-fuel ratio sensor) designed to output a linear sensor signal in proportion to an air-fuel ratio of exhaust gases flowing downstream of the catalytic converter 27.

The modeling of the whole of the controlled object ranging from the fuel injectors to the downstream air-fuel ratio sensor 29, however, causes the whole system to become too great, resulting in reduction in control accuracy. Thus, this embodiment uses the air-fuel ratio $\lambda$F of exhaust gases flowing upstream of the catalytic converter 27 detected by the air-fuel ratio sensor 28 (hereinafter, referred to as the upstream air-fuel ratio sensor) as reliable air-fuel ratio information derived by a sensor located at the center of the controlled object and divides the controlled object into a first system ranging from the fuel injectors 20 to the upstream air-fuel ratio sensor 28 and a second system ranging from the catalytic converter 27 to the downstream air-fuel ratio sensor 29 for modeling.

(1) Modeling of the First System From the Fuel Injectors 20 to the Upstream Air-Fuel Ratio Sensor 28

Figure 45:
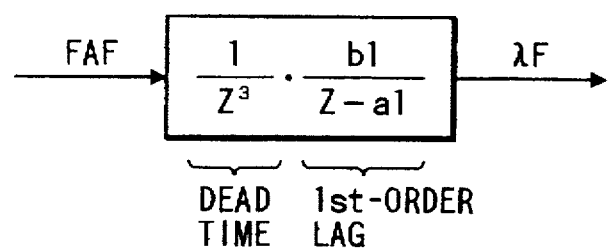
FIG. 45 is a block diagram which shows a model ranging from fuel injectors to an upstream air-fuel ratio sensor disposed upstream of a catalytic converter.

The first system is modeled using a first-order auto-regressive moving average model having a dead time P=3 which is approximated in view of the disturbance d. Specifically, the transfer function G of the first model is defined as shown in FIG. 45. In FIG. 45, a1 and b1 are constants for determining the response of the model. The dead time P may alternatively be set to a suitable value other than P=3 according to specifications of the engine 11 and peripheral equipment.

The model of the first system ranging from the fuel injectors 20 to the upstream air-fuel ratio sensor 28 using the auto-regressive moving average model may be approximated to the following equation.

$$\lambda F(i+1)=a1 \cdot \lambda F(i)+b1 \cdot FAF(i-2)$$

where $\lambda$F is an air-fuel ratio of exhaust gases flowing upstream of the catalytic converter 27, FAF is an air-fuel ratio correction coefficient for correcting of the fuel injection amount of the fuel injectors 20, and i is the number of sampling cycles.

The above equation may be rewritten in view of the disturbance d1 as follows:

$$\lambda F(i+1)=a1 \cdot \lambda F(i)+b1 \cdot FAF(i-2)+d1(i) \tag{7}$$

Note that the constant a1 and b1 (i.e., the transfer function G of the first system) are easily found by analysis of variance of the model thus approximated using a step response of a sampling cycle of 360° CA (crank angle).

(2) Modeling of the Catalytic Converter 27

The catalytic converter model is established taking into account (1) adsorption reaction of gas components (i.e., lean and rich components) flowing into the catalytic converter 27, (2) oxidization-reduction reaction of the gas components with substances sorbed in the catalytic converter 27 wherein rich components in the catalytic converter 27 are oxidized with lean components of the incoming gases and lean components in the catalytic converter 27 are reduced with rich components of the incoming gases, (3) a desorption reaction of the substances sorbed in the catalytic converter 27, and (4) the existence of non-reacted part of the incoming gases.

Figure 46:
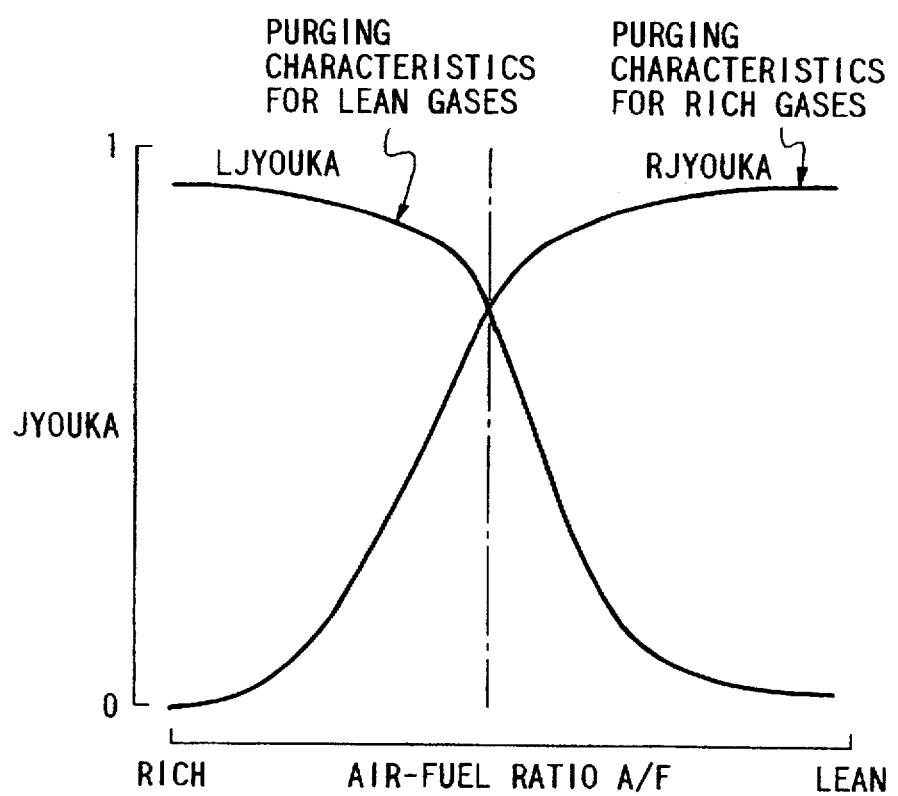
FIG. 46 is a graph which shows the relations between an air-fuel ratio of exhaust gases and a purging rate of rich components and between the air-fuel ratio of the exhaust gases and a purging rate of lean components.

The amount of reaction HANNOU in the catalytic converter 27 caused by the above (1) and (2) is $$HANNOU = \alpha 0 \cdot kkh \cdot \Delta InG \tag{8}$$

where $\alpha 0 = 1 - JYOUKA$ that is a purging ratio of the gas components entering the catalytic converter 27 to the air-fuel ratio A/F of the exhaust gasses entering the catalytic converter 27 (see FIG. 46), kkh is a ratio of the amount of gas components actually absorbed in the catalytic converter 27 or contributing to the oxidization-reduction reaction of gases to be not purged by the catalytic converter 27 determined by purging characteristics of the catalytic converter 27 to the amount of the gases to be not purged by the catalytic converter 27 determined by purging characteristics of the catalytic converter 27 (FIG. 7 shows static characteristics. Actually, the exhaust gases are purged in a ratio more than the purging ratio shown in FIG. 7. kkh represents the additional ratio), $\Delta$ is a constant different according to a form of reaction occurring in the catalytic converter 27, and InG is the amount of gases entering the catalytic converter 27. The form of reaction of the catalytic converter 27 is, as discussed in the first embodiment and shown in the table 1, classified into the four types LK, LH, RH, and RK.

The parameters JYOUKA, kkh, and $\Delta$ of the catalytic converter model are changed according to the types of reactions LK, LH, RH, and RK.

TABLE 2

| type of reaction | incoming gas | substances sorbed in a catalytic converter | JYOUKA | kkh | $\Delta$ |
|---|---|---|---|---|---|
| LK | L | L | LJYOUKA | KLK | 1 |
| LH | R | L | RJYOUKA | KLH | ½ |
| RH | L | R | LJYOUKA | KRH | 2 |
| RK | R | R | RJYOUKA | KRK | 1 |

L: leans (+) R: rich (−)

The amount of desorption DROP caused by the above (3) is expressed by the following equation.

$$DROP = k'' \cdot OSIOLD \tag{9}$$

where k" is a constant, and OSIOLD is the sorbed substance amount derived one program cycle earlier.

The amount of non-reacted components SURINUKE of the incoming gases caused by the above (4) is expressed by the following equation.

$$SURINUKE = HANNOU = \alpha 0 \cdot (1-kkh) \cdot InG \tag{10}$$

The sorbed substance amount OSI is expressed by the following equation.

$$OSI = OSIOLD + HANNOU - DROP \tag{11}$$

The amount of gases OutG discharged from the catalytic converter 27 is expressed by the following equation.

$$OutG = SURINUKE + DROP \tag{12}$$

Figure 44:
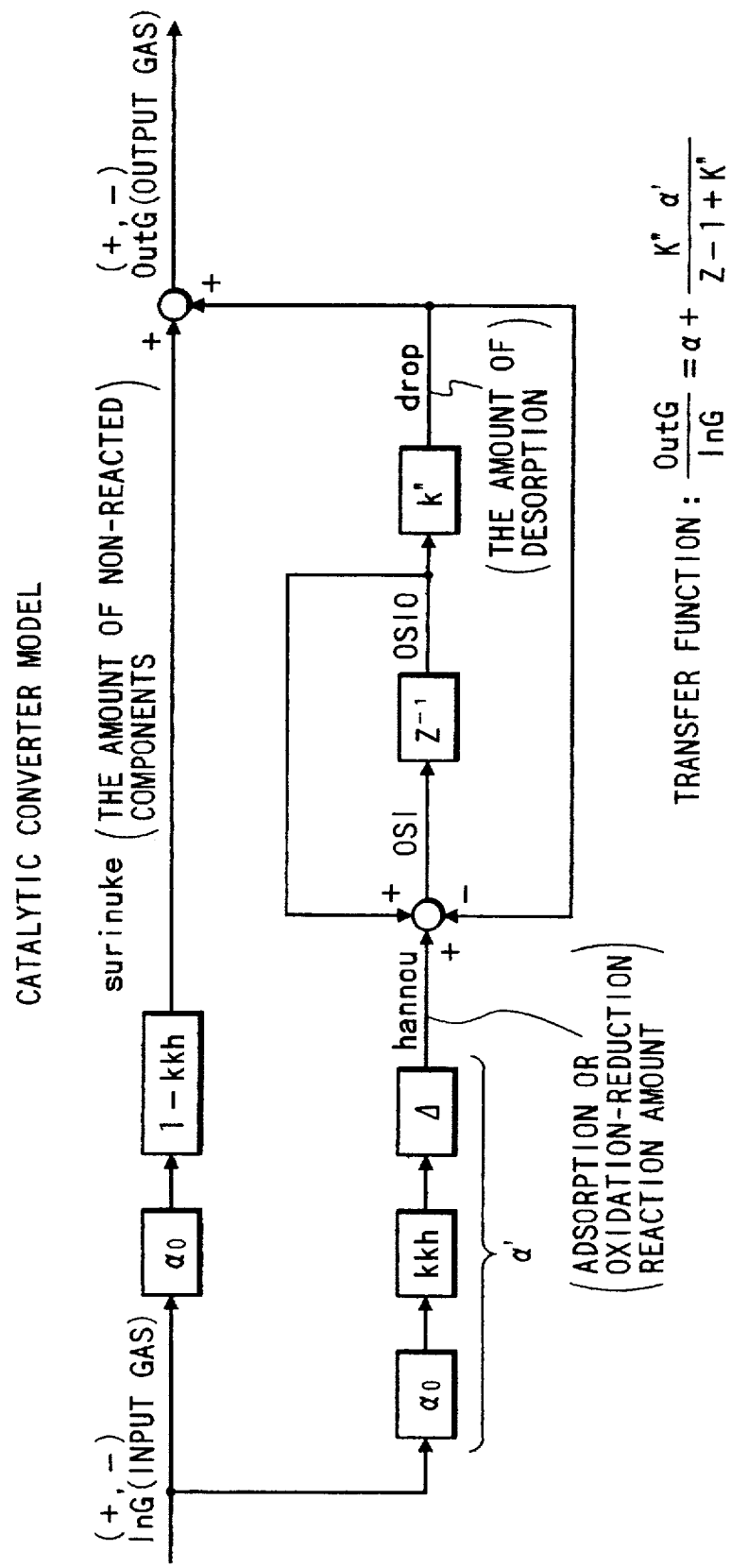
FIG. 44 is a block diagram which shows a catalytic converter model established in the sixth embodiment of the invention.

FIGS. 44 is a block diagram showing the catalytic converter model expressed by the above equations (8) to (12). If an input of the catalytic converter model is defined as the amount of incoming gases InG, and an output thereof is defined as the amount of discharged gases OutG, then the transfer function is $$\frac{OutG}{InG} = \alpha + \frac{k''\alpha'}{Z - 1 + k''} \tag{13}$$

where $\alpha' = \alpha 0 \cdot kkh \cdot \Delta$, and $\alpha = \alpha 0 \cdot (1-kkh)$.

Note that in the above equations (8) to (13), the lean components are indicated by a positive (+) value, while the rich components are indicated by a negative (−) value.

Next, the number of moles of each component of the incoming gas InG entering the catalytic converter 27 is determined in the same manner as the one shown in FIG. 2.

It is then determined whether the gas components of the incoming gases are rich components or lean components based on the number of moles O2INM of $O_2$, the number of moles H2INM of $H_2$, the number of moles COINM of CO, the number of moles CO2INM of $CO_2$, and the number of moles H2OINM of $H_2O$ derived in step 97. It is also determined whether the sorbed substance amount OSI indicates rich components (R) or lean components (L) based on the sign (±) of the sorbed substance amount OSI derived by the equation (11) for determining which of the adsorption reaction LK of the lean components, the reaction LK wherein the lean components in the catalytic converter 27 reduces with the rich components of the incoming gases, the reaction RH wherein the rich components in the catalytic converter 27 are oxidized with the lean components of the incoming gases, and the adsorption reaction RK of the lean components the form of the reaction in the catalytic converter 27 corresponds to. Based on the result of this determination, the parameters JYOUKA, kkh, and A are then chosen according to the table 2.

(3) Modeling of the Second System Ranging From the Catalytic Converter 27 to the Downstream Air-Fuel Ratio Sensor 29

Figure 47:
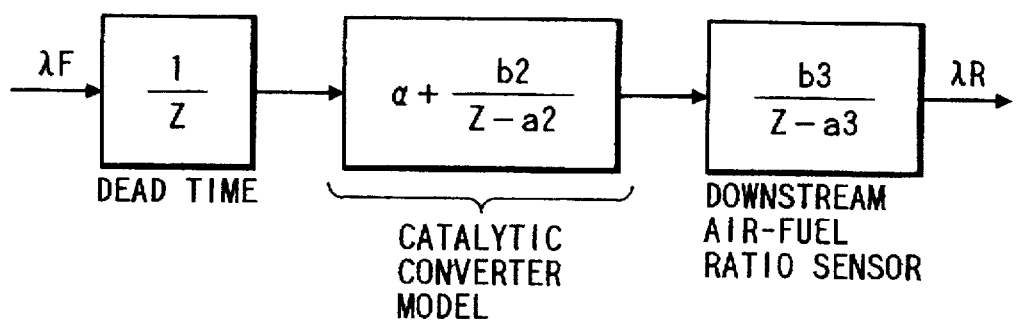
FIG. 47 is a block diagram which shows a model ranging from a catalytic converter and a downstream air-fuel ratio sensor disposed downstream of the catalytic converter.

The downstream air-fuel ratio sensor 29 is approximated to a first-order lag system. This defines the transfer function G of the second system as shown in FIG. 47.. Note that $a2 = 1-k''$, $b2 = k'' \cdot \alpha$, and a3 and b3 are constants.

In the model shown in FIG. 47, the relation between the upstream air-fuel ratio $\lambda F$ and the downstream air-fuel ratio $\lambda R$ are as follows:

$$\frac{\lambda R}{\lambda F} = \frac{1}{Z} \left( \frac{dZ - \alpha a2 + b2}{Z - a2} \right) \left( \frac{b3}{Z - a3} \right)$$

$$= \frac{1}{Z} \cdot \frac{\alpha b3Z - \alpha a2b3 + b2b3}{Z^2 - (a2 + a3)Z + a2a3}$$

$$= \frac{\alpha b3Z - \alpha a2b3 + b2b3}{Z^3 - (a2 + a3)Z^2 + a2a3Z}$$

$$= \frac{B1Z + B2}{Z^3 - A1Z^2 + A2Z}$$

where $B1 = \alpha b3$, $B2 = b2b3 - \alpha a2b3$, $A1 = a2+a3$, and $A2 = a2a3$.

Figure 48:
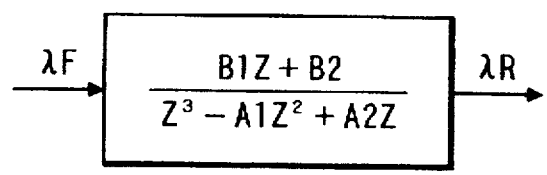
FIG. 48 is an illustration which shows a transfer function G of the model shown in FIG. 47.

Thus, the model in FIG. 47 may be expressed as shown in FIG. 48. From this model, the following relations are defined.

$$\lambda R(i+3) - A1 \lambda R(i+2) + A2 \lambda R(i+1) = B1 \lambda F(i+1) + B2 \lambda F(i)$$

From the above relation, $\lambda R(i+1)$ is determined as follows:

$$\lambda R(i+1) = A1\lambda R(i) - A2\lambda R(i-1) + B1\lambda F(i-1) + B2\lambda F(i-2) \quad (14)$$

Note that the constant A1, A2, B1, and B2 (i.e., the transfer function G of the second system) are easily found by analysis of variance of the model as approximated above using a step response of a sampling cycle of 360° CA (crank angle).

Indicating of State Variable X (X=Vector)

(1) The First System Ranging From the Fuel Injectors 20 to the Variable $Z(i) = [Z1(i), Z2(i), Z3(i), Z4(i)]^T$ As Follows:

$$\begin{bmatrix} \lambda R(i+1) \\ \lambda R(i) \\ \lambda F(i) \\ \lambda F(i-1) \end{bmatrix} = \begin{bmatrix} A1 & -A2 & B1 & B2 \\ 1 & 0 & 0 & 0 \\ 0 & 0 & 0 & 0 \\ 0 & 0 & 1 & 0 \end{bmatrix} \begin{bmatrix} \lambda R(i) \\ \lambda R(i-1) \\ \lambda F(i-1) \\ \lambda F(i-2) \end{bmatrix} + \begin{bmatrix} 0 \\ 0 \\ 1 \\ 0 \end{bmatrix} \lambda F(i)$$

$$Z(i+1) = \begin{bmatrix} A1 & -A2 & B1 & B2 \\ 1 & 0 & 0 & 0 \\ 0 & 0 & 0 & 0 \\ 0 & 0 & 1 & 0 \end{bmatrix} Z(i) + \begin{bmatrix} 0 \\ 0 \\ 1 \\ 0 \end{bmatrix} \lambda F(i)$$

$$\lambda R(i) = [1\ 0\ 0\ 0]\ Z(i)$$

From the above equations, the following relations are found.

$$Z1(i+1) = A1\ Z1(i) - A2\ Z2(i) + B1\ Z3(i) + B2\ Z4(i)$$
$$= \lambda R(i+1)$$

$Z2(i+1) = Z1(i) = \lambda R(i)$ $Z3(i+1) = \lambda R(i)$ $Z4(i+1) = Z3(i) = \lambda R(i-1)$ (3) The whole controlled object From the above equations, state variables of the whole controlled object are $$Z(i+1) = \begin{bmatrix} A1 & -A2 & B1 & B2 \\ 1 & 0 & 0 & 0 \\ 0 & 0 & 0 & 0 \\ 0 & 0 & 1 & 0 \end{bmatrix} Z(i) + \begin{bmatrix} 0 \\ 0 \\ 1 \\ 0 \end{bmatrix} \lambda F(i)$$

$\lambda R(i) = [1\ 0\ 0\ 0]\ Z(i)$

From the above equations, the following relations are found.

$$Z1(i+1) = A1\ Z1(i) - A2\ Z2(i) + B1\ Z3(i) + B2\ Z4(i)$$
$$= \lambda R(i+1)$$

$Z2(i+1) = Z1(i) = \lambda R(i)$ $Z3(i+1) = \lambda R(i)$ $Z4(i+1) = Z3(i) = \lambda R(i-1)$ (3) The whole controlled object From the above equations, state variables of the whole controlled object are $$\begin{bmatrix} \lambda F(i+1) \\ FAF(i) \\ FAF(i-1) \\ FAF(i-2) \\ \lambda R(i+1) \\ \lambda R(i) \\ \lambda F(i) \\ \lambda F(i-1) \end{bmatrix} = \begin{bmatrix} a1 & 0 & 0 & b1 & 0 & 0 & 0 & 0 \\ 0 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & A1 & -A2 & B1 & B2 \\ 0 & 0 & 0 & 0 & 1 & 0 & 0 & 0 \\ 1 & 0 & 0 & 0 & 1 & 0 & 0 & 0 \\ 0 & 0 & 0 & 0 & 0 & 0 & 1 & 0 \end{bmatrix} \begin{bmatrix} \lambda F(i) \\ FAF(i-1) \\ FAF(i-2) \\ FAF(i-3) \\ \lambda R(i) \\ \lambda R(i-1) \\ \lambda F(i-1) \\ \lambda F(i-2) \end{bmatrix} + \quad (15)$$

$$\begin{bmatrix} 0 \\ 1 \\ 0 \\ 0 \\ 0 \\ 0 \\ 0 \\ 0 \end{bmatrix} FAF(i) + \begin{bmatrix} d1 \\ 0 \\ 0 \\ 0 \\ 0 \\ 0 \\ 0 \\ 0 \end{bmatrix}$$

(3) Design of a Regulator

In designing of a regulator, a deviation $e(i)$ is defined as follows:

$$e(i) = \lambda TG - \lambda R(i)$$

where $\lambda TG$ is a target air-fuel ratio of the downstream air-fuel ratio $\lambda R$ which is set to a stoichiometric air-fuel ratio ($\lambda TG = 1$).

For designing state feedback which converges the deviation $e(i)$ on zero (0), the following augmented system is defined based on the above equation (15).

$$\begin{bmatrix} (1-q^{-1})\lambda F(i+1) \\ (1-q^{-1})FAF(i) \\ (1-q^{-1})FAF(i-1) \\ (1-q^{-1})FAF(i-2) \\ (1-q^{-1})\lambda R(i+1) \\ (1-q^{-1})\lambda R(i) \\ (1-q^{-1})\lambda F(i) \\ (1-q^{-1})\lambda F(i-1) \\ e(i+1) \end{bmatrix} =$$

-continued $$\begin{bmatrix} a1 & 0 & 0 & b1 & \vdots & 0 & 0 & 0 & 0 & \vdots & 0 \\ 0 & 0 & 0 & 0 & \vdots & 0 & 0 & 0 & 0 & \vdots & 0 \\ 0 & 1 & 0 & 0 & \vdots & 0 & 0 & 0 & 0 & \vdots & 0 \\ 0 & 0 & 1 & 0 & \vdots & 0 & 0 & 0 & 0 & \vdots & 0 \\ \hdashline 0 & 0 & 0 & 0 & \vdots & A1 & -A2 & B1 & B2 & \vdots & 0 \\ 0 & 0 & 0 & 0 & \vdots & 1 & 0 & 0 & 0 & \vdots & 0 \\ 1 & 0 & 0 & 0 & \vdots & 0 & 0 & 0 & 0 & \vdots & 0 \\ 0 & 0 & 0 & 0 & \vdots & 0 & 0 & 1 & 0 & \vdots & 0 \\ \hdashline 0 & 0 & 0 & 0 & \vdots & -A1 & A2 & -B1 & -B2 & \vdots & 1 \end{bmatrix} \times$$

$$\begin{bmatrix} (1-q^{-1})\lambda F(i) \\ (1-q^{-1})FAF(i-1) \\ (1-q^{-1})FAF(i-2) \\ (1-q^{-1})FAF(i-3) \\ \hdashline (1-q^{-1})\lambda R(i) \\ (1-q^{-1})\lambda R(i-1) \\ (1-q^{-1})\lambda F(i-1) \\ (1-q^{-1})\lambda F(i-2) \\ \hdashline e(i) \end{bmatrix} + \begin{bmatrix} 0 \\ 1 \\ 0 \\ 0 \\ \hdashline 0 \\ 0 \\ 0 \\ 0 \\ \hdashline 0 \end{bmatrix} (1-q^{-1})FAF(i)$$

where $q^{-1}$ is a time lag element.

If $X(i+1)=AX(i)+bFAF(i)$, then the state feedback is $$FAF(i) = K1\ \lambda F(i) + K2\ FAF(i-1) + K3\ FAF(i-2) + \quad (16)$$

$$K4\ FAF(i-3) + K5\ \lambda R(i) + K6\ \lambda R(i-1) +$$

$$K7\ \lambda F(i-1) + K8\ \lambda F(i-2) + ZI(i)$$

where the integration term Z1(i) is a value determined by the deviation e(i) between the target air-fuel ratio λTG (=1.0) and the downstream air-fuel ratio λR and the integration constant KI and given by the following equation.

$$ZI(i)=ZI(i-1)+KI\cdot(1.0-\lambda R(i)) \quad (17)$$

The feedback gains K1 to K8 and the integration constant KI may be determined using an optimal regulator technique and changed according to the types of reaction of the catalytic converter 27 or the parameters of the catalytic converter model since the catalytic converter model has four types of constants according to the types of reactions.

Figure 49:
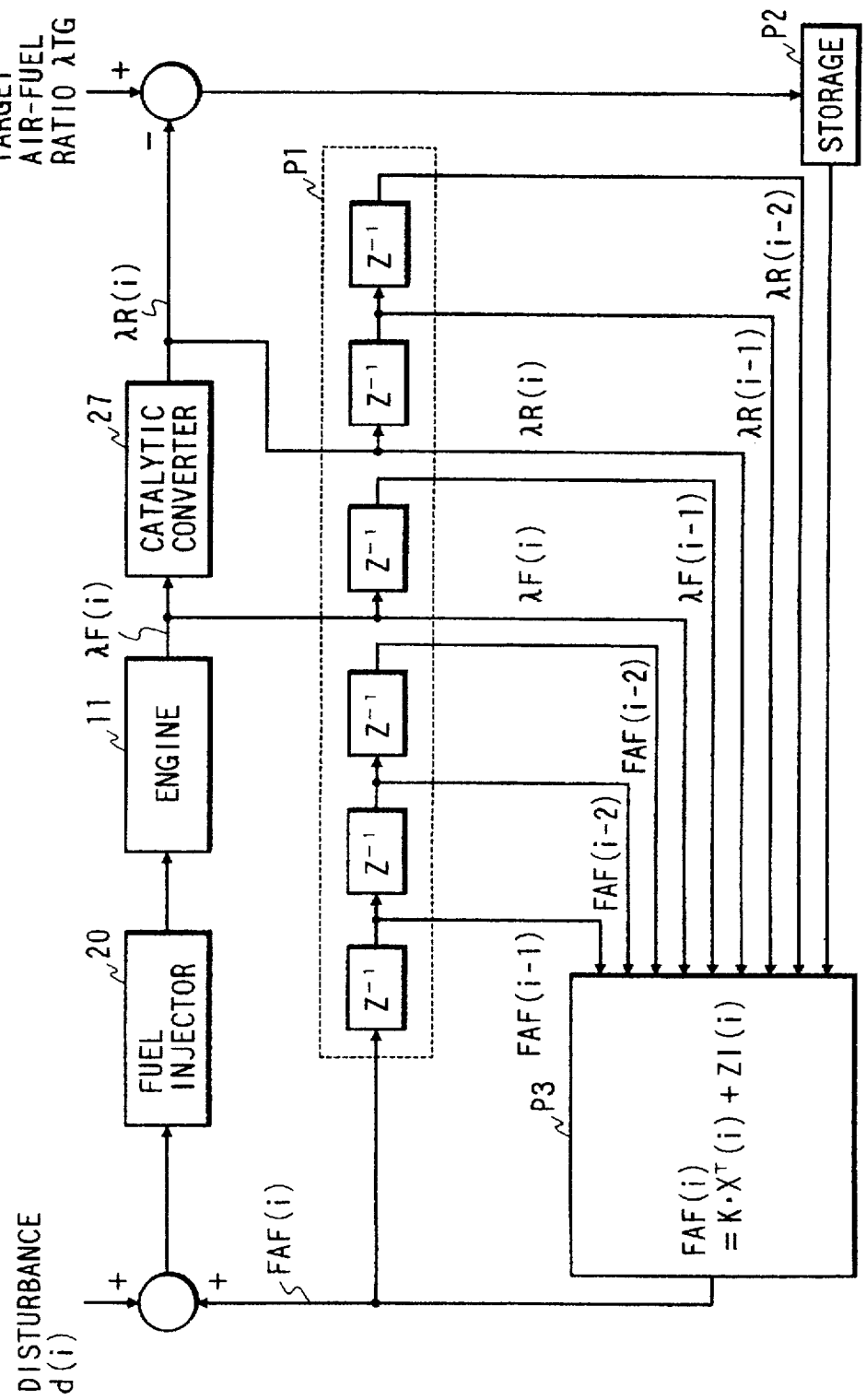
FIG. 49 is a block diagram which shows state feedback under modern control.

FIG. 49 is a block diagram showing state feedback under the modem control of the air-fuel ratio control system designed by the models, as discussed above. In the drawing, the air-fuel ratio correction coefficient FAF(i) is expressed using the $Z^{-1}$ transformation for finding it from the FAF (i−1) one sampling cycle before. This is achieved by storing an air-fuel ratio correction coefficient (i.e., FAF(i)) derived in one program cycle before as the FAF(i−1) in the RAM 34 and reading it out of the RAM 34 in a subsequent program cycle.

The block P1 enclosed by a two-dot chain line in FIG. 49 is a portion defining the state variables X(i) and Z(i) during feedback control controlling the downstream air-fuel ratio λR(i) so as to agree with the target air-fuel ratio λTG. The block P2 is a storage portion determining the integration term ZI(i). The block P3 is an arithmetic portion determining the air-fuel ratio correction coefficient FAF (i) based on the state variables X(i) and Z(i) derived in the block P1 and the integration term ZI(i) derived in the block P2.

Determination of Optional Feedback Gain K and Integration Constant KI

The optimal feedback gain K and the integration constant KI may be determined by minimizing the performance function J as expressed by the following equation.

$$J = \sum_{i=0}^{\infty} [Q\cdot\{\lambda R(i)-\lambda TG\}^2 + R\cdot\{FAF(i)-FAF(i-1)\}^2]$$

The performance function J is for minimizing the deviation e(i) between the target air-fuel ratio λTG and the actual downstream air-fuel ratio λR(i) while limiting the movement of the air-fuel ratio correction coefficient FAF(i). The weighing of the limitation on the air-fuel ratio correction coefficient FAF(i) may be changed by weighing parameters Q and R. Thus, it is desirable that the optimal feedback gain K and the integration constant KI be determined by repeating the simulation using different values of the weighing parameters Q and R until optimal control characteristics are obtained.

The optimal feedback gain K and the integration constant KI also depend upon the model constant a1, b1, A1, A2, B1, and B2. Thus, for establishing the stability (robustness) of the system withstanding a variation in control of the downstream air-fuel ratio λR (i.e., a variation in parameter), it is necessary to determine the optimal feedback gain K and the integration constant KI in view of variations in model parameters a1, b1, A1, A2, B1, and B2. It is thus advisable that values of the optimal feedback gain K and the integration constant KI which satisfy the stability of the system be determined by the simulation in view of actual variations in model parameters a1, b1, A1, A2, B1, and B2.

The above mentioned models of the controlled object, the state variables, the regulator, the optimal feedback gain K, and the integration instant KI are predetermined, and the air-fuel ratio control system of this embodiment controls an air-fuel ratio through the electronic control circuit 30 only using the above equations (16) and (17).

Air-Fuel Ratio Control

Figure 50:
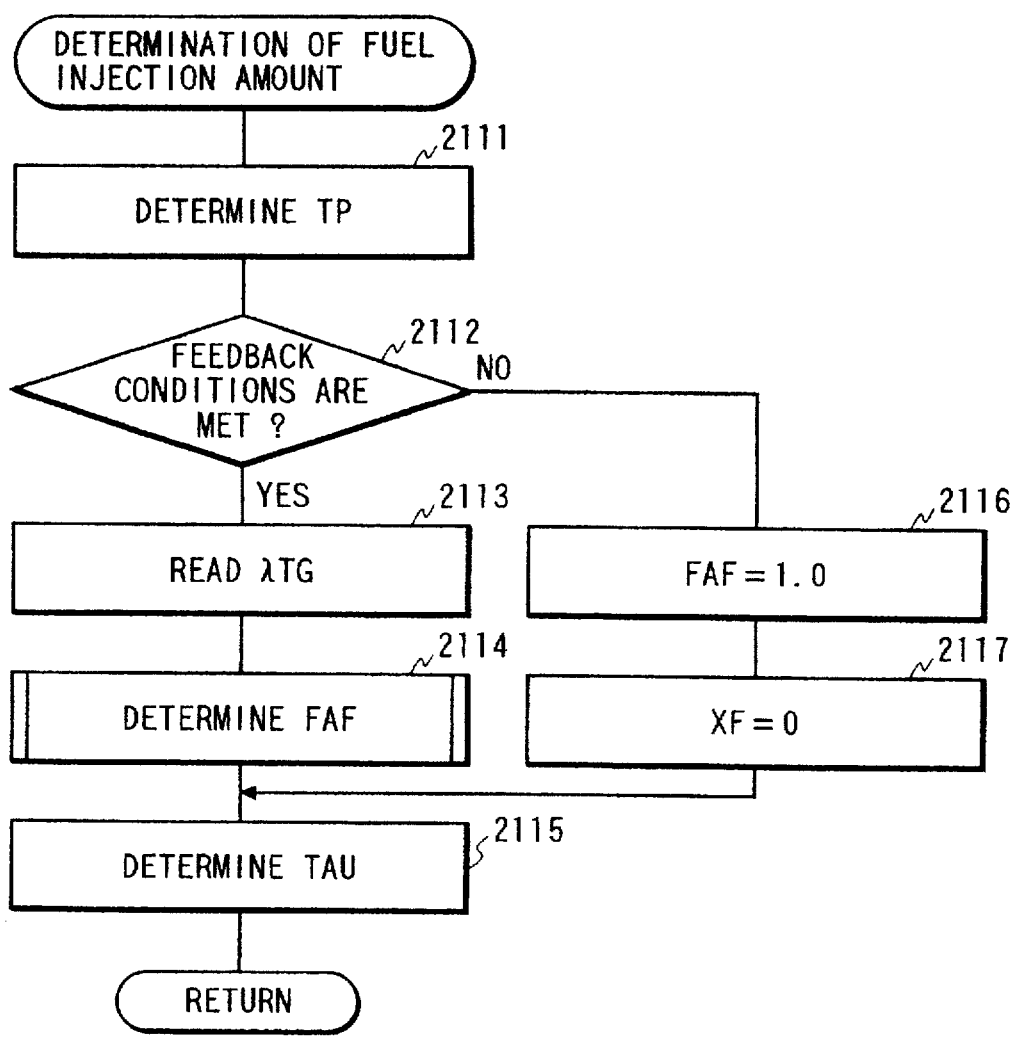
FIG. 50 is a flowchart of a program for determining a fuel injection amount.

FIG. 50 is a flowchart of a program of logical steps performed by the CPU 32 of the electronic control circuit 30 for determining the fuel injection amount TAU. This program is performed at every 360° CA in synchronization with the speed of the engine 11.

After entering the program, the routine proceeds to step 2111 wherein the basic fuel injection amount TP is determined based on the intake pipe pressure Pm and the engine speed Ne.

The routine then proceeds to step 2112 wherein it is determined whether air-fuel ratio feedback control conditions are met or not. If the coolant temperature Thw is greater than a given value, and an engine operating condition is out of a high-speed high-load range, then the routine proceeds to step 2113 wherein the target λTG (i.e., the stoichiometric air-fuel ratio=1.0 in this embodiment) is read out of the ROM 33. The routine then proceeds to step 2114 wherein the air-fuel ratio correction coefficient FAF is determined, as will be described later in detail, which corrects the downstream air-fuel ratio λR to agree with the target air-fuel ratio λTG (=1.0). Specifically, in step 2114, the air-fuel ratio correction coefficient FAF is determined according to the above equations (16) and (17) based on the target air-fuel ratio λTG and the downstream air-fuel ratio λR detected by the downstream air-fuel ratio sensor 29.

If a NO answer is obtained in step 2112, then the routine proceeds to step 2116 wherein the air-fuel ratio correction coefficient FAF is set to 1.0. The routine then proceeds to step 2117 wherein a feedback control execution flag XF indicating that the air-fuel ratio feedback control is being performed is cleared. The routine then proceeds to step 2115 wherein the fuel injection amount TAU is determined based on the basic fuel injection amount TP and the air-fuel ratio correction coefficient FAF according to the following equation.

$$TAU = TP \times FAF \times FALL$$

where FALL is a correction coefficient different from FAF.

The electronic control circuit 30 then provides a control signal indicating the fuel injection amount TAU thus determined to each of the fuel injectors 20 to control an injection period (i.e., time a valve is opened) so as to converge an actual air-fuel ratio on the target air-fuel ratio $\lambda TG$.

Determination of Air-Fuel Ratio Correction Coefficient FAF

Figure 51:
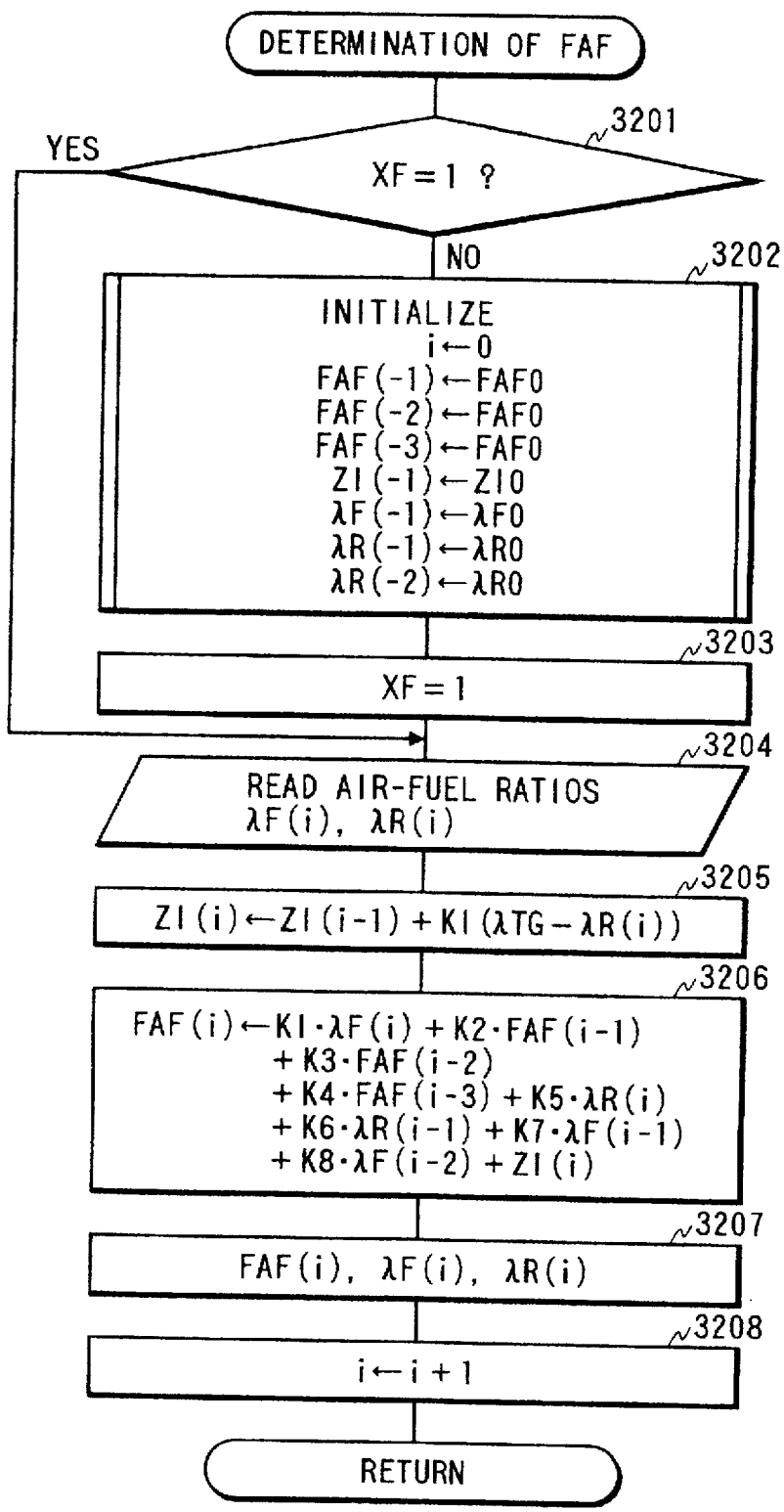
FIG. 51 is a flowchart of a program for determining an air-fuel ratio correction coefficient.

FIG. 51 is a flowchart of a program for determining the air-fuel ratio correction coefficient FAF which is performed in step 2114 of FIG. 50.

After entering step 2114, the routine proceeds to step 3201 wherein it is determined whether the feedback control execution flag XF is one (1) or not. If a NO answer is obtained meaning that this program is performed for the first time after the feedback control conditions are met during the program activity in step 2116 of FIG. 50, then the routine proceeds to step 3202 wherein an initializing operation is performed. Specifically, the variable i indicating the number of sampling cycles is reset to zero (0), initial values FAF(−1), FAF(−2), and FAF(−3) of the air-fuel ratio correction coefficient are all set to a constant FAF0, a total value ZI(−1) of the deviation between the target air-fuel ratio $\lambda TG$ and the downstream air-fuel ratio $\lambda R(i)$ is set to a constant ZI0, an initial value $\lambda F(-1)$ of the upstream air-fuel ratio is set to a constant $\lambda F0$, and initial values $\lambda R(-1)$ and $\lambda R(-2)$ of the downstream air-fuel ratio are set to a constant $\lambda R0$.

The routine then proceeds to step 3203 wherein the feedback control execution flag XF is set to one (1). This causes the routine to proceed in a subsequent cycle directly from step 3201 to step 3204 as long as the feedback control conditions are met. If the feedback control conditions are not met in a subsequent cycle, step 2116 (FAF=1.0) in FIG. 50 is performed after which the feedback control conditions are met again, and the routine proceeds to step 2114, the initializing operation in step 3202 is performed.

After step 3203, the routine proceeds to step 3204 wherein the actual air-fuel ratios $\lambda F(i)$ and $\lambda R(i)$ are read out of the upstream air-fuel ratio sensor 28 and the downstream air-fuel ratio sensor 29. The routine then proceeds to step 3205 wherein the deviation between the target air-fuel ratio $\lambda TG$ (=1.0) and the downstream air-fuel ratio $\lambda R(i)$ is determined to derive a total value thereof for determining the integration term ZI(i).

The routine then proceeds to step 3206 wherein the fir-fuel ratio correction coefficient FAF(i) is determined according to the equation (16) based on the integration term ZI(i), the optimal feedback gain K, and the state variables X and Z. The routine then proceeds to step 3207 wherein the air-fuel ratio correction coefficient FAF(i) and the air-fuel ratios $\lambda F(i)$ and $\lambda R(i)$ are stored in a given memory location of the RAM 34 as the parameters FAF(i−1), $\lambda F(i-1)$ and $\lambda R(i-1)$ for use in subsequent program activity. The routine then proceeds to step 3208 wherein the variable i is incremented by one (1) and terminates.

As will be apparent from the above discussion, the air-fuel ratio control system of this embodiment uses the model established taking into account the adsorption reaction of exhaust gases flowing into the catalytic converter 27, the oxidation-reducing reaction of the exhaust gases with substances sorbed in the catalytic converter 27, the desorption reaction of the sorbed substances, and non-reacted substances of the exhaust gases, as the catalytic converter model of the controlled models approximated to the controlled object ranging from the fuel injectors 20 to the downstream air-fuel ratio sensor 29 for controlling the fuel injection amount of each of the injectors 20 or the air-fuel ratio of a mixture supplied to the engine 11 under the feedback control so as to converge the air-fuel ratio $\lambda R$ of exhaust gasses flowing downstream of the catalytic converter 27 on the target air-fuel ratio $\lambda TG$. This achieves the air-fuel ratio feedback control with high accuracy, resulting in an optimum adsorption condition of the catalytic converter 27.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An air-fuel ratio control apparatus for an internal combustion engine comprising:

air-fuel ratio determining means for determining an air-fuel ratio of exhaust gases flowing upstream of a catalytic converter;

air-fuel ratio controlling means for controlling the air-fuel ratio determined by said air-fuel ratio determining means so as to agree with a target air-fuel ratio under feedback control;

sorbed substance amount determining means for determining the amount of substances sorbed in the catalytic converter based on the air-fuel ratio determined by said air-fuel ratio determining means using a catalytic converter model established using parameters indicating adsorption reaction of exhaust gas components entering the catalytic converter, oxidation-reducing reaction of the substances sorbed in the catalytic converter with the exhaust gas components, desorption reaction of the substances sorbed in the catalytic converter, and a non-reacted portion of the exhaust gas components; and target air-fuel ratio determining means for determining said target air-fuel ratio so that the amount of substances determined by said sorbed substance amount determining means falls within a given range.

2. An air-fuel ratio control apparatus as set forth in claim 1, wherein said target air-fuel ratio determining means determines said target air-fuel ratio based on the amount of substances determined by said sorbed substance amount determining means.

3. An air-fuel ratio control apparatus as set forth in claim 1, wherein said target air-fuel ratio determining means determines said target air-fuel ratio based on the amount of substances determined by said sorbed substance amount determining means when the amount of substances falls within the given range and based on the amount of air in a cylinder of the engine when the amount of substances is out of the given range.

4. An air-fuel ratio control apparatus as set forth in claim 1, wherein said sorbed substance amount determining means corrects the determined amount of substances sorbed in the catalytic converter to read a value smaller than or equal to a maximum amount of substances the catalytic converter can adsorb when the determined amount of substances is greater than the maximum amount of substances.

5. An air-fuel ratio control apparatus as set forth in claim 1, further comprising:

a downstream air-fuel ratio sensor disposed downstream of a catalytic converter, monitoring a given component of exhaust gases flowing downstream of the catalytic converter to output a sensor signal indicative thereof, said downstream air-fuel ratio sensor being designed to cause adsorption reaction of exhaust gas components entering said downstream air-fuel ratio sensor, oxidation-reducing reaction of substances sorbed in said downstream air-fuel ratio sensor with the exhaust gas components, desorption reaction of the substances sorbed in said downstream air-fuel ratio sensor, and a portion of the exhaust gas components not reacted in said downstream air-fuel ratio sensor;

sensor output estimating means for estimating an output of said downstream air-fuel ratio sensor based on the concentrations of lean components and rich components of the exhaust gases flowing downstream of the catalytic converter determined by using a sensor reaction model established using parameters indicating the adsorption reaction, the oxidation-reducing reaction, the desorption reaction, and the portion of the non-reacted exhaust gas components caused by said downstream air-fuel ratio sensor; and model parameter correcting means for correcting a given parameter of said catalytic converter model based on a comparison between the output of the downstream air-fuel ratio sensor estimated by said downstream air-fuel ratio sensor output estimating means and the sensor signal outputted by the downstream air-fuel ratio sensor.

6. An air-fuel ratio control apparatus as set forth in claim 5, wherein said sensor output estimating means estimates the output of said downstream air-fuel ratio sensor without use of the parameter indicating the non-reacted exhaust gas components.

7. An air-fuel ratio control apparatus as set forth in claim 1, further comprising:

a downstream air-fuel ratio sensor disposed downstream of a catalytic converter, monitoring a given component of exhaust gases flowing downstream of the catalytic converter to output a sensor signal indicative thereof;

sensor output estimating means for estimating an output of said downstream air-fuel ratio sensor by processing through a first-order lag system the amount of the exhaust gas components flowing downstream of the catalytic converter determined by the catalytic converter model;

maximum catalytic converter capacity determining means for determining a maximum capacity of the catalytic converter based on the output of said downstream air-fuel ratio estimated by said sensor output estimating means and the sensor signal outputted by said downstream air-fuel ratio sensor; and model parameter correcting means for correcting a given parameter of said catalytic converter model based on the maximum capacity of the catalytic converter determined by said maximum catalytic converter capacity determining means.

8. An air-fuel ratio control apparatus as set forth in claim 7, wherein said sensor output estimating means estimates the output of said downstream air-fuel ratio sensor by changing a time constant of the first-order lag system according to the amount of the exhaust gas components flowing downstream of the catalytic converter.

9. An air-fuel ratio control apparatus as set forth in claim 7, wherein said downstream air-fuel ratio sensor is designed to operate in a first operation mode and a second operation mode, the first operation mode being such that the sensor signal of said downstream air-fuel ratio sensor is changed linearly according to an air-fuel ratio of the exhaust gases flowing downstream of the catalytic converter, the second operation mode being such that the sensor signal of said downstream air-fuel ratio sensor is reversed in level upon reversal of the air-fuel ratio of the exhaust gases between rich and lean sides, and further comprising sensor operation mode switching means for switching an operation mode of said downstream air-fuel ratio sensor between the first operation mode and the second operation mode, said sensor operation mode switching means selecting the second operation mode when the amount of substances sorbed in the catalytic converter determined by said sorbed substance amount determining means lies within a given range and the first operation mode when the amount of substances determined by said sorbed substance amount determining means is out of the given range.

10. An air-fuel ratio control apparatus as set forth in claim 9, further comprising first air-fuel ratio controlling means for performing first air-fuel ratio control by controlling said downstream air-fuel ratio sensor to operate in the second operation mode when the amount of substances sorbed in the catalytic converter determined by said sorbed substance amount determining means lies within the given range and second air-fuel ratio controlling means for performing second air-fuel ratio control by controlling said downstream air-fuel ratio sensor to operate in the first operation mode when the amount of substances sorbed in the catalytic converter determined by said sorbed substance amount determining means is out of the given range.

11. An air-fuel ratio control apparatus as set forth in claim 9, wherein said maximum catalytic converter capacity determining means and said model parameter correcting means are activated when the amount of substances sorbed in the catalytic converter determined by said sorbed substance amount determining means is out of the given range.

12. An air-fuel ratio control apparatus for an internal combustion engine comprising:

fuel injection means for injecting fuel into the engine;

a catalytic converter disposed in an exhaust passage of the engine for purging exhaust gases;

downstream air-fuel ratio determining means for determining an air-fuel ratio of exhaust gases flowing downstream of said catalytic converter; and fuel injection amount determining means for determining a fuel injection amount of said fuel injection means to control the air-fuel ratio determined by said downstream air-fuel ratio determining means to agree with a target air-fuel ratio under feedback control using a controlled model approximated to a system ranging from said fuel injection means to said downstream air-fuel ratio determining means with state variables defined by inputs to and outputs from the controlled model in a previous feedback control cycle and a current feedback control cycle, wherein said fuel injection amount determining means establishes a catalytic converter model in the controlled mode using parameters indicating adsorption reaction of exhaust gas components entering the catalytic converter, oxidation-reducing reaction of the substances sorbed in the catalytic converter with the exhaust gas components, desorption reaction of the substances sorbed in the catalytic converter, and a non-reacted portion of the exhaust gas components.

13. An air-fuel ration control apparatus as set forth in claim 12, wherein said fuel injection amount determining means determines the fuel injection amount of said fuel injection means using the state variables defined by the inputs to and outputs from the controlled model associated with the air-fuel ratio determined by said downstream air-fuel ratio determining means.

14. An air-fuel ratio control apparatus as set forth in claim 12, wherein said fuel injection amount determining means determines the fuel injection amount through said catalytic converter model which uses parameters indicating with positive or negative values whether the amount of exhaust gas components flowing into the catalytic converter, the amount of exhaust gas components flowing out of the catalytic converter, the amount of substances desorbing from the catalytic converter, and the amount of the non-reacted portion of the exhaust gas components are rich or lean side, respectively.

15. An air-fuel ratio control apparatus as set forth in claim 14, further comprising:

reaction type determining means for determining a type of reaction occurring in the catalytic converter based on whether the exhaust gas components flowing into the catalytic converter and the substances sorbed in the catalytic converter are rich or lean; and parameter changing means for changing the parameters used in the catalytic converter model according to the type of the reaction determined by said reaction type determining means.

16. An air-fuel ratio control apparatus as set forth in claim 15, further comprising feedback gain changing means for changing a feedback gain of the feedback control according to the type of reaction determined by said reaction type determining means or upon the changing of the parameters by said parameter changing means.

17. An air-fuel ratio control apparatus for an internal combustion engine comprising:

a downstream air-fuel ratio sensor disposed downstream of a catalytic converter, monitoring a given component of exhaust gases flowing downstream of the catalytic converter to output a sensor signal indicative thereof, said downstream air-fuel ratio sensor being designed to cause adsorption reaction of exhaust gas components entering said downstream air-fuel ratio sensor, oxidation-reducing reaction of substances sorbed in said downstream air-fuel ratio sensor with the exhaust gas components, desorption reaction of the substances sorbed in said downstream air-fuel ratio sensor, and a portion of the exhaust gas components not reacted in said downstream air-fuel ratio sensor;

sensor output estimating means for estimating an output of said downstream air-fuel ratio sensor based on the concentrations of lean components and rich components of the exhaust gases flowing downstream of the catalytic converter determined by using a sensor reaction model established using parameters indicating the adsorption reaction, the oxidation-reducing reaction, the desorption reaction, and the portion of the non-reacted exhaust gas components caused by said downstream air-fuel ratio sensor;

maximum adsorption amount determining means for determining a maximum adsorption amount of substances the catalytic converter can adsorb based on a time required for the sensor signal of said downstream air-fuel ratio sensor to change from a value indicating the exhaust gases on a lean side to a value indicating the exhaust gases on a rich side after completion of a fuel cut the engine undergoes and a time required for the output of said downstream air-fuel ratio sensor estimated by said sensor output estimating means to change a value indicating the exhaust gases on the lean side to a value indicating the exhaust gases on the rich side after completion of the fuel cut; and deterioration determining means for determining deterioration of the catalytic converter based on a comparison between a maximum adsorption amount of substances a new catalytic converter can adsorb and the maximum adsorption amount determined by said maximum adsorption amount determining means.

* * * * *